(12) United States Patent
Kato

(10) Patent No.: US 9,319,628 B2
(45) Date of Patent: Apr. 19, 2016

(54) ELECTRONIC DEVICE AND NON-TRANSITORY COMPUTER READABLE RECORDING MEDIUM STORING PROGRAM FOR CONTROLLING ELECTRONIC DEVICE

(71) Applicant: Yoshinaga Kato, Kanagawa (JP)

(72) Inventor: Yoshinaga Kato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/362,547

(22) PCT Filed: Dec. 17, 2012

(86) PCT No.: PCT/JP2012/083178
§ 371 (c)(1),
(2) Date: Jun. 3, 2014

(87) PCT Pub. No.: WO2013/094714
PCT Pub. Date: Jun. 27, 2013

(65) Prior Publication Data
US 2014/0313283 A1    Oct. 23, 2014

(30) Foreign Application Priority Data

Dec. 22, 2011  (JP) ................................ 2011-281949

(51) Int. Cl.
*H04N 7/14* (2006.01)
*G06T 1/00* (2006.01)
(Continued)

(52) U.S. Cl.
CPC .............. *H04N 7/147* (2013.01); *G06F 3/1454* (2013.01); *G06T 1/00* (2013.01); *G09G 5/003* (2013.01);
(Continued)

(58) Field of Classification Search
CPC .................. G09G 5/391; G09G 5/003; G09G 2340/0407; G09G 2340/0442; G09G 2370/04; G09G 2370/047; G09G 2370/00; G06F 4/1454; G06T 1/00; H04N 7/147

USPC ................. 345/698; 348/14.01, 14.08, 14.09, 348/14.12, 14.07, 14.13, 143, 169, 731; 358/1.15; 375/240.03; 382/240, 286; 725/109

See application file for complete search history.

(56) References Cited

U.S. PATENT DOCUMENTS 5,353,065 A    10/1994 Katsumata et al.
5,481,312 A *  1/1996 Cash .................... H04L 12/6418
                                              348/465

(Continued)

FOREIGN PATENT DOCUMENTS

JP    2005-109703    4/2005
JP    2009-151172    7/2009

(Continued)

OTHER PUBLICATIONS

International Search Report Issued on Mar. 19, 2013 in PCT/JP2012/083178 filed on Dec. 17, 2012.

(Continued)

*Primary Examiner* — Gerald Gauthier
(74) *Attorney, Agent, or Firm* — Oblon, McClelland, Maier & Neustadt, L.L.P

(57) ABSTRACT

Disclosed is an electronic device that is connected to a display device and outputs image data to the display device, the electronic device including a resolution retrieval unit that retrieves a recommended resolution; a resolution determination unit that determines whether the recommended resolution is greater than or equal to a priority resolution; a resolution selecting unit that selects a first resolution; and a resolution changing unit that changes a resolution of the display device to be the first resolution. When the resolution determination unit determines that the retrieved recommended resolution is greater than or equal to the priority resolution, the resolution selecting unit selects the priority resolution as the first resolution. When the resolution determination unit determines that the retrieved recommended resolution is less than the priority resolution, the resolution selecting unit selects a standard resolution as the first resolution.

10 Claims, 34 Drawing Sheets

(51) Int. Cl.
*G09G 5/391* (2006.01)
*G06F 3/14* (2006.01)
*G09G 5/00* (2006.01)

(52) U.S. Cl.
CPC ........ *G09G 5/391* (2013.01); *G09G 2340/0407* (2013.01); *G09G 2340/0442* (2013.01); *G09G 2350/00* (2013.01); *G09G 2370/00* (2013.01); *G09G 2370/04* (2013.01); *G09G 2370/047* (2013.01)

(56) References Cited

U.S. PATENT DOCUMENTS

| | | | |
|---|---|---|---|
| 6,037,991 A * | 3/2000 | Thro et al. | 725/116 |
| 6,108,451 A * | 8/2000 | Kondo et al. | 382/240 |
| 6,956,623 B1 * | 10/2005 | Staller | H04N 5/50 348/731 |
| 7,145,594 B2 * | 12/2006 | Seo | 348/14.09 |
| 7,551,190 B2 * | 6/2009 | Shiomi et al. | 345/698 |
| 7,683,929 B2 * | 3/2010 | Elazar | G01S 3/7864 348/169 |
| 8,004,540 B1 | 8/2011 | Munter et al. | |
| 8,134,587 B2 * | 3/2012 | Niu et al. | 348/14.12 |
| 8,208,001 B2 * | 6/2012 | Tucker et al. | 348/14.08 |
| 8,619,112 B2 * | 12/2013 | Kristiansen et al. | 348/14.01 |
| 8,731,331 B2 * | 5/2014 | Tanaka et al. | 382/286 |
| 8,804,821 B2 * | 8/2014 | Ali | 375/240.03 |
| 8,947,711 B2 * | 2/2015 | Kato et al. | 358/1.15 |
| 9,032,461 B2 * | 5/2015 | Tucker et al. | 725/109 |
| 2004/0223054 A1 * | 11/2004 | Rotholtz | G08B 13/19613 348/143 |
| 2004/0257434 A1 * | 12/2004 | Davis | H04N 7/147 348/14.13 |
| 2005/0068346 A1 | 3/2005 | Ogawa et al. | |
| 2005/0259144 A1 | 11/2005 | Eshkoli | |
| 2008/0303889 A1 * | 12/2008 | Barry et al. | 348/14.08 |
| 2009/0160883 A1 | 6/2009 | Sonobe | |
| 2009/0278871 A1 | 11/2009 | Lewis et al. | |
| 2012/0140021 A1 | 6/2012 | Tanaka et al. | |
| 2012/0140022 A1 | 6/2012 | Kato et al. | |
| 2012/0274729 A1 * | 11/2012 | Eisenberg | H04N 7/152 348/14.07 |
| 2014/0043431 A1 * | 2/2014 | Kato | 348/14.12 |
| 2014/0253676 A1 * | 9/2014 | Nagase et al. | 348/14.12 |
| 2014/0313283 A1 * | 10/2014 | Kato | 348/14.12 |

FOREIGN PATENT DOCUMENTS

| | | |
|---|---|---|
| JP | 2010-014979 | 1/2010 |
| JP | 2010-256794 | 11/2010 |
| JP | 2012-237964 | 12/2012 |
| WO | WO 2009/112547 A1 | 9/2009 |

OTHER PUBLICATIONS

Extended European Search Report issued Apr. 20, 2015 in Patent Application No. 12861002.9.

Written Opinion issued Dec. 22, 2015, in SG Patent Application No. 11201402636R.

Office Action issued on Feb. 24, 2015 in Australian Patent Application No. 2012354743.

* cited by examiner

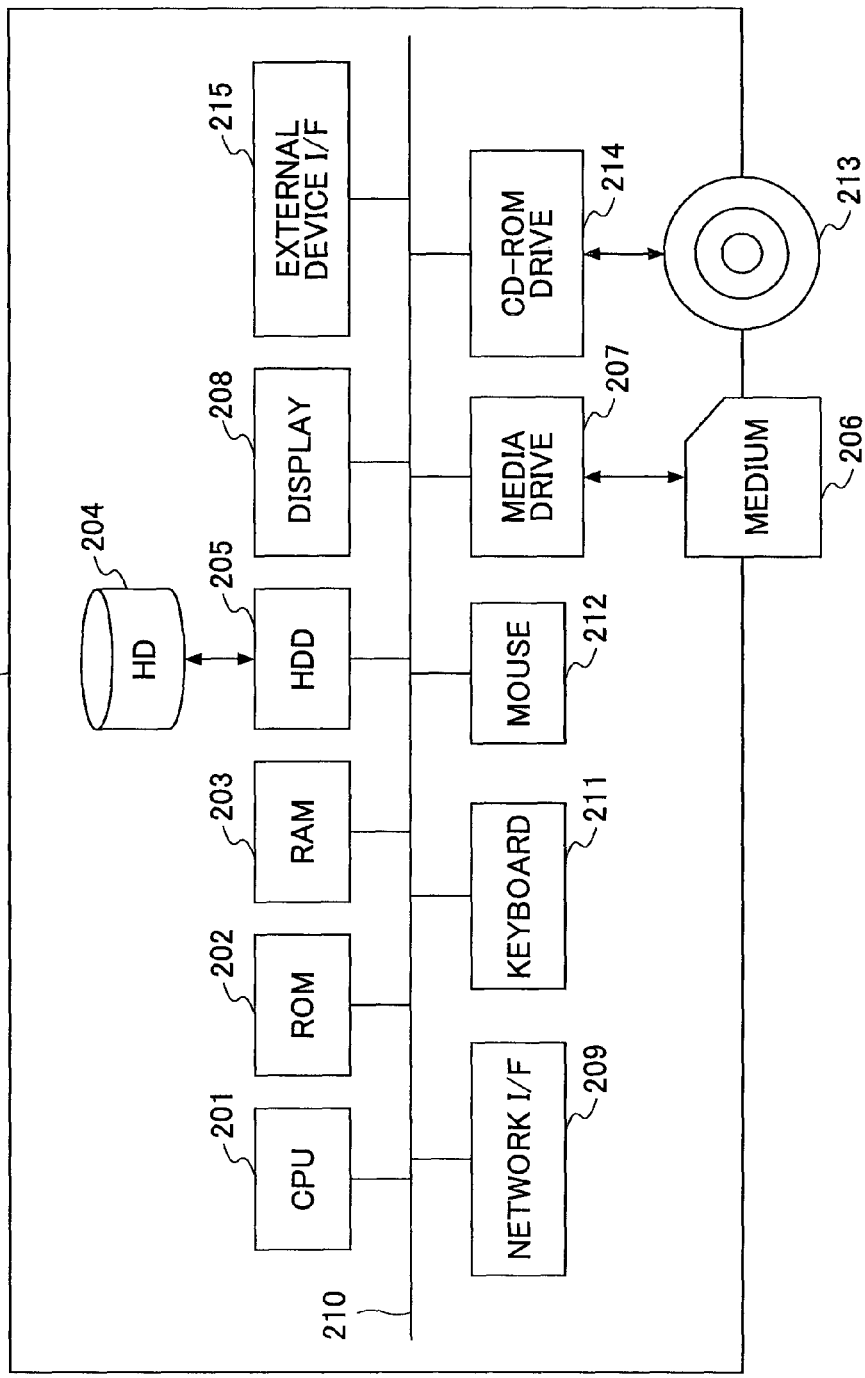

FIG.7

CHANGE QUALITY MANAGEMENT TABLE

| IP ADDRESS OF DESTINATION TERMINAL DEVICE | IMAGE QUALITY OF RELAYED IMAGE DATA (QUALITY OF IMAGE) |
|---|---|
| 1.3.2.4 | HIGH QUALITY |
| 1.3.1.3 | LOW QUALITY |
| 1.3.4.3 | MIDDLE QUALITY |
| ... | ... |

FIG.8

RELAYING APPARATUS MANAGEMENT TABLE

| RELAYING APPARATUS ID | OPERATING STATE | DATE AND TIME OF RECEIVING | IP ADDRESS OF RELAYING APPARATUS | MAXIMUM DATA TRANSMISSION RATE (Mbps) |
|---|---|---|---|---|
| 111a | ONLINE STATE | 2009.11.10.13:00 | 1.2.1.2 | 100 |
| 111b | ONLINE STATE | 2009.11.10.13:10 | 1.2.2.2 | 1000 |
| 111c | OFFLINE STATE | 2009.11.10.13:20 | 1.3.1.2 | 100 |
| 111d | ONLINE STATE | 2009.11.10.13:30 | 1.3.2.2 | 10 |

FIG.9

TERMINAL DEVICE AUTHENTICATION
MANAGEMENT TABLE

| TERMINAL DEVICE ID | PASSWORD |
|---|---|
| 01aa | aaaa |
| 01ab | abab |
| 01ba | baba |
| ... | ... |

FIG.10

TERMINAL DEVICE MANAGEMENT TABLE

| TERMINAL DEVICE ID | OPERATING STATE | DATE AND TIME OF RECEIVING | IP ADDRESS OF TERMINAL DEVICE |
|---|---|---|---|
| 01aa | ONLINE STATE | 2009.11.10.13:40 | 1.2.1.3 |
| 01ab | OFFLINE STATE | 2009.11.09.12:00 | 1.2.1.4 |
| 01ba | ONLINE STATE | 2009.11.10.13:45 | 1.2.2.3 |
| ... | ... | ... | ... |
| 01db | ONLINE STATE | 2009.11.10.13:50 | 1.3.2.4 |

FIG.11

DESTINATION LIST MANAGEMENT TABLE

| REQUESTING TERMINAL DEVICE ID | DESTINATION TERMINAL DEVICE ID |
|---|---|
| 01aa | 01ab,01ba,01db |
| 01ab | 01aa,01ba,01ca |
| 01ba | 01aa,01ab,01cb,01da |
| ... | ... |
| 01db | 01aa,01ab,01da |

FIG.12

SESSION MANAGEMENT TABLE

| SELECTION SESSION ID | RELAYING APPARATUS ID | REQUESTING TERMINAL DEVICE ID | DESTINATION TERMINAL DEVICE ID | DELAY TIME PERIOD (ms) | DATE AND TIME OF RECEIVING DELAY INFORMATION |
|---|---|---|---|---|---|
| se1 | 111a | 01aa | 01db | 200 | 2009.11.10.14:00 |
| se2 | 111b | 01ba | 01ca | 50 | 2009.11.10.14:10 |
| se3 | 111d | 01bb | 01da | 400 | 2009.11.10.14:20 |
| ... | ... | ... | ... | ... | ... |

FIG.13

ADDRESS PRIORITY MANAGEMENT TABLE

| SAME OR DIFFERENT PORTIONS OF DOT ADDRESS | PRIORITY OF ADDRESS |
|---|---|
| SAME. SAME. SAME. DIFFERENT | 5 |
| SAME. SAME. DIFFERENT. - | 3 |
| SAME. DIFFERENT. -. - | 1 |
| DIFFERENT. -. -. - | 0 |

FIG.14

TRANSMISSION RATE PRIORITY MANAGEMENT TABLE

| MAXIMUM DATA TRANSMISSION RATE OF RELAYING APPARATUS (Mbps) | PRIORITY OF TRANSMISSION RATE |
|---|---|
| 1000 ~ | 5 |
| 100 ~ 1000 | 3 |
| 10 ~ 100 | 1 |
| ~ 10 | 0 |

FIG.15

QUALITY MANAGEMENT TABLE

| DELAY TIME (ms) | IMAGE QUALITY OF IMAGE DATA (QUALITY OF IMAGE) |
|---|---|
| 0 ~ 100 | HIGH IMAGE QUALITY |
| 100 ~ 300 | MIDDLE IMAGE QUALITY |
| 300 ~ 500 | LOW IMAGE QUALITY |
| 500 ~ | (INTERRUPTION) |

FIG.20

| RELAYING APPARATUS ID | PRIORITY OF IP ADDRESS | | VALUE INDICATING PRIORITY OF TRANSMISSION RATE | TOTAL VALUE |
|---|---|---|---|---|
| | VALUE WITH RESPECT TO TERMINAL DEVICE 10aa | VALUE WITH RESPECT TO TERMINAL DEVICE 10db | | |
| 111a | 5 | 1 | 3 | 8 |
| 111b | 3 | 1 | 5 | 8 |
| 111c | – | – | – | – |
| 111d | 1 | 5 | 1 | 6 |

FIG.30

| | |
|---|---|
| CURRENT DISPLAY RESOLUTION | : width:1280 height:720 |
| RECOMMENDED RESOLUTION | : width:1920 height:1080 |
| DISPLAYABLE RESOLUTION | : width: 640 height:480 |
| | width: 800 height:600 |
| | width:1024 height:768 |
| | width:1280 height:768 |
| | width:1280 height:800 |
| BLOCK #1 | : NULL |
| BLOCK #2 | : NULL |
| ... | ... |

FIG.33

| ITEM NAME | RESOLUTION |
|---|---|
| resolution1 | width:1280, height:800 |
| resolution2 | width:1280, height:720 |
| resolution3 | width:1024, height:768 |

ELECTRONIC DEVICE AND NON-TRANSITORY COMPUTER READABLE RECORDING MEDIUM STORING PROGRAM FOR CONTROLLING ELECTRONIC DEVICE

TECHNICAL FIELD

Embodiments of the present invention relate to an electronic device and a program for controlling the electronic device. Specifically, the electronic device is represented by a transmission terminal device that transmits and receives screen data being shared with another transmission terminal device. The transmission terminal device outputs image data to a display device and causes the display device to display the image data.

BACKGROUND ART

Recently, videoconference systems have been widely adopted. These videoconference systems are for videoconferencing between remote locations through a communication network such as the Internet.

Such a videoconference system enables a conference to be conducted between remote locations in an environment which is close to an actual conference environment. During videoconferencing, one of parties (participants) participating in the videoconference is located in one of conference rooms, and the other party is located in the other conference room. A transmission terminal device (a terminal device) of the videoconference system located in the one of the conference rooms photographs images of the conference room and the participants, and the transmission terminal device collects audio data. The transmission terminal device converts the collected data into digital data and transmits the digital data to the other party's transmission terminal device. The other party's transmission terminal device causes a display (display device) disposed in the other conference room to display the images, and outputs sound through a speaker.

Such a transmission terminal device of the videoconference system has been sold with a display as a videoconference set. However, cases have been increasing where only a single transmission terminal device is sold. Therefore, recently, there are many transmission terminal devices that can be connected to various types of displays having different types of resolution.

Further, cases have been increasing where a transmission terminal device can be connected to a display through an interface conforming to a High-Definition Multimedia Interface (HDMI), which is for an audio-visual (AV) appliance such as a digital television, besides a conventional RGB interface (an interface for the Red-Green-Blue color model) and a digital visual interface-digital (DVI-D). A display of a digital television conforming to the HDMI standard is capable of displaying at a high resolution such as a resolution of 1280 pixels (width) by 720 pixels (height) (hereinafter, denoted as 1280×720).

Even if a transmission terminal device does not include an interface conforming to the HDMI standard, an image can be displayed at a high resolution by connecting the transmission terminal device to a display by using a conversion cable that converts a HDMI signal into a DVI-D signal, provided that the transmission terminal device includes an interface conforming to the DVI-D standard.

Whereas, the Video Electronics Standards Association (VESA) discloses the Extended Display Identification (EDID) as a data structure standard for transmitting capability information indicating a capability of a display to a transmission terminal device. Based on this standard, a display usually stores unique EDID information in a memory included in the display. The EDID information includes data such as information regarding displaying timing of the display and information regarding resolution of the display. The transmission terminal device sets the resolution of the connected display by using a value based on the EDID information.

In the latest version of the EDID, in addition to defining data in conventional basic data fields, extended data fields have been developed so that the standard is compatible with a new standard such as the HDMI.

However, when the conversion cable is utilized, only the basic data fields are transmitted to the transmission terminal device. The extended fields are not transmitted. Therefore, the transmission terminal device is not able to control all the range of the resolution within which the display can display an image.

However, since recommended resolution of the display has been described in the basic data fields of the EDID, it is possible to utilize the recommended resolution.

In general, the recommended resolution defines the maximum (native) resolution at which the display is capable of displaying an image.

Since the transmission terminal device can only refer to the basic fields of the EDID, the transmission terminal device is not able to select the resolution defined in fields other than the basic fields. For example, when the transmission terminal device is connected to a display that is capable of displaying at a resolution of 1920×1080, and when it is described in the extended fields that the display is capable of displaying at a resolution of 1280×720, the transmission terminal is not able to select the resolution of 1280×720 nor change the resolution into the resolution of 1280×720.

When a sufficient memory is ensured in the transmission terminal device, the transmission terminal device may display an image at the resolution of 1920×1080 by selecting the recommended resolution. However, when the transmission terminal device is not capable of displaying an image at the resolution of 1920×1080, which requires a large display memory, due to a cost problem, the transmission terminal device has no choice but to display the image at default resolution of 1024×768, which is lower than the resolution of 1280×720.

Whereas, Patent Document 1 (Japanese Patent Laid-Open Application No. 2010-256794) discloses an electronic device that is capable of setting desired customized resolution depending individually on a displaying device, without introducing special hardware. Specifically, the electronic device includes a retrieval means for retrieving EDID information stored in a display; a determination means for determining a piece of customized EDID information corresponding to the retrieved EDID information retrieved by the retrieval means among plural pieces of customized EDID information corresponding to various types of displays, wherein the plural pieces of customized EDID information have been stored; and a providing means for providing the determined customized EDID information that has been determined by the determination means to a display control means for controlling an indication on the display based on the EDID information.

However, since the above-described electronic device can only refer to the basic data fields of the EDID, the device is not able to display an image at resolution other than the resolution defined in the basic data fields. Namely, the above-described problem is not resolved by the electronic device.

Hereinabove, the case has been explained for the transmission terminal device. However, the explanation is also applied, in general, to an electronic device that outputs image data to an external display.

DISCLOSURE OF THE INVENTION

Embodiments of the present invention, have been developed while considering the above-described problem. An objective of the embodiments of the present invention is to provide an electronic device such that, even if the electronic device is able to obtain only a portion of EDID information of a display which is connected to the electronic device, the electronic device can display an image at resolution that is suitable for the display.

In one aspect of the present invention, there is provided an electronic device configured to be connected to a display device, the electronic device being configured to output image data to the display device, the electronic device including a resolution retrieval unit configured to retrieve a recommended resolution of the display device;

a resolution determination unit configured to determine whether the retrieved recommended resolution is greater than or equal to a priority resolution of the electronic device, the priority resolution being a reference aspect ratio of the electronic device;

a resolution selecting unit configured to select a first resolution; and a resolution changing unit configured to change a resolution of the display device to be the first resolution that has been selected by the resolution selecting unit, wherein, when the resolution determination unit determines that the retrieved recommended resolution is greater than or equal to the priority resolution, the resolution selecting unit selects the priority resolution as the first resolution, and wherein, when the resolution determination unit determines that the retrieved recommended resolution is less than the priority resolution, the resolution selecting unit selects a standard resolution as the first resolution.

In another aspect of the present invention, there is provided an electronic device configured to be connected to a display device, the electronic device being configured to output image data to the display device, the electronic device including a first resolution retrieval unit configured to retrieve a displayable resolution, the displayable resolution being displayable by the display device;

a resolution management table reading unit configured to sequentially read one or more data lines included in a resolution management table, wherein each of the data lines includes a second resolution as an element;

a second resolution retrieval unit configured to obtain the second resolution from the read data line;

a first resolution determination unit configured to determine whether the displayable resolution obtained by the first resolution retrieval unit includes the second resolution obtained by the second resolution retrieval unit;

a first resolution changing unit configured to change, when the first resolution determination unit determines that the displayable resolution includes the second resolution, a resolution of the display device to be the second resolution obtained by the second resolution retrieval unit;

a third resolution retrieval unit configured to retrieve a recommended resolution of the display device, wherein the third resolution retrieval unit operates when the first resolution determination unit determines that the displayable resolution does not include the second resolution obtained from each of the read data lines by the second resolution retrieval unit;

a second resolution determination unit configured to determine whether the retrieved recommended resolution is greater than or equal to a priority resolution of the electronic device, the priority resolution being a reference aspect ratio of the electronic device;

a resolution selecting unit configured to select a first resolution; and a second resolution changing unit configured to change the resolution of the display device to be the first resolution that has been selected by the resolution selecting unit, wherein, when the second resolution determination unit determines that the recommended resolution is greater than or equal to the priority resolution, the resolution selecting unit selects the priority resolution as the first resolution, and wherein, when the second resolution determination unit determines that the recommended resolution is less than the priority resolution, the resolution selecting unit selects a standard resolution as the first resolution.

In another aspect of the present invention, there is provided a program for controlling an electronic device, the electronic device being configured to be connected to a display device and configured to output image data to the display device, the program causing a computer included in the electronic device to function as:

a resolution retrieval unit configured to retrieve a recommended resolution of the display device;

a resolution determination unit configured to determine whether the retrieved recommended resolution is greater than or equal to a priority resolution of the electronic device, the priority resolution being a reference aspect ratio of the electronic device;

a resolution selecting unit configured to select a first resolution; and a resolution changing unit configured to change a resolution of the display device to be the first resolution that has been selected by the resolution selecting unit, wherein, when the resolution determination unit determines that the retrieved recommended resolution is greater than or equal to the priority resolution, the resolution selecting unit selects the priority resolution as the first resolution, and wherein, when the resolution determination unit determines that the retrieved recommended resolution is less than the priority resolution, the resolution selecting unit selects a standard resolution as the first resolution.

In another aspect of the present invention, there is provided a program for controlling an electronic device, the electronic device being configured to be connected to a display device and configured to output image data to the display device, the program causing a computer included in the electronic device to function as:

a first resolution retrieval unit configured to retrieve a displayable resolution, the displayable resolution being displayable by the display device;

a resolution management table reading unit configured to sequentially read one or more data lines included in a resolution management table, wherein each of the data lines includes a second resolution as an element;

a second resolution retrieval unit configured to obtain the second resolution from the read data line;

a first resolution determination unit configured to determine whether the displayable resolution obtained by the first resolution retrieval unit includes the second resolution obtained by the second resolution retrieval unit;

a first resolution changing unit configured to change, when the first resolution determination unit determines that the displayable resolution includes the second resolution, a resolution of the display device to be the second resolution obtained by the second resolution retrieval unit;

a third resolution retrieval unit configured to retrieve a recommended resolution of the display device, wherein the third resolution retrieval unit operates when the first resolution determination unit determines that the displayable resolution does not include the second resolution obtained from each of the read data lines by the second resolution retrieval unit;

a second resolution determination unit configured to determine whether the retrieved recommended resolution is greater than or equal to a priority resolution of the electronic device, the priority resolution being a reference aspect ratio of the electronic device;

a resolution selecting unit configured to select a first resolution; and a second resolution changing unit configured to change the resolution of the display device to be the first resolution that has been selected by the resolution selecting unit, wherein, when the second resolution determination unit determines that the recommended resolution is greater than or equal to the priority resolution, the resolution selecting unit selects the priority resolution as the first resolution, and wherein, when the second resolution determination unit determines that the recommended resolution is less than the priority resolution, the resolution selecting unit selects a standard resolution as the first resolution.

With the electronic device according to the aspect of the present invention, it is possible to display an image at the suitable resolution for the display device, even if the electronic device is able to retrieve only the portion of the EDID information of the display device that is connected to the electronic device.

BRIEF DESCRIPTION OF THE DRAWINGS

FIG. 4 is a diagram showing any one of a hardware configuration of a transmission management system, a relay apparatus, a program providing server, and an external input apparatus according to the embodiment;

FIG. 7 is a conceptual diagram showing a change quality management table;

FIG. 8 is a conceptual diagram showing relaying apparatus management table;

FIG. 9 is a conceptual diagram showing a terminal device authentication management table;

FIG. 10 is a conceptual diagram showing a terminal device management table;

FIG. 11 is a conceptual diagram showing a destination list management table;

FIG. 12 is a conceptual diagram showing a session management table;

FIG. 13 is a conceptual diagram showing an address priority management table;

FIG. 14 is a conceptual diagram showing a transmission rate priority management table;

FIG. 15 is a conceptual diagram showing a quality management table;

FIG. 20 is a diagram showing calculated priority points for narrowing down the relay apparatuses;

FIG. 30 is a diagram showing an example of data to be used for display control;

FIG. 33 is a diagram showing an example of a resolution management table; and

DESCRIPTION OF THE REFERENCE NUMERALS

Figure 1:
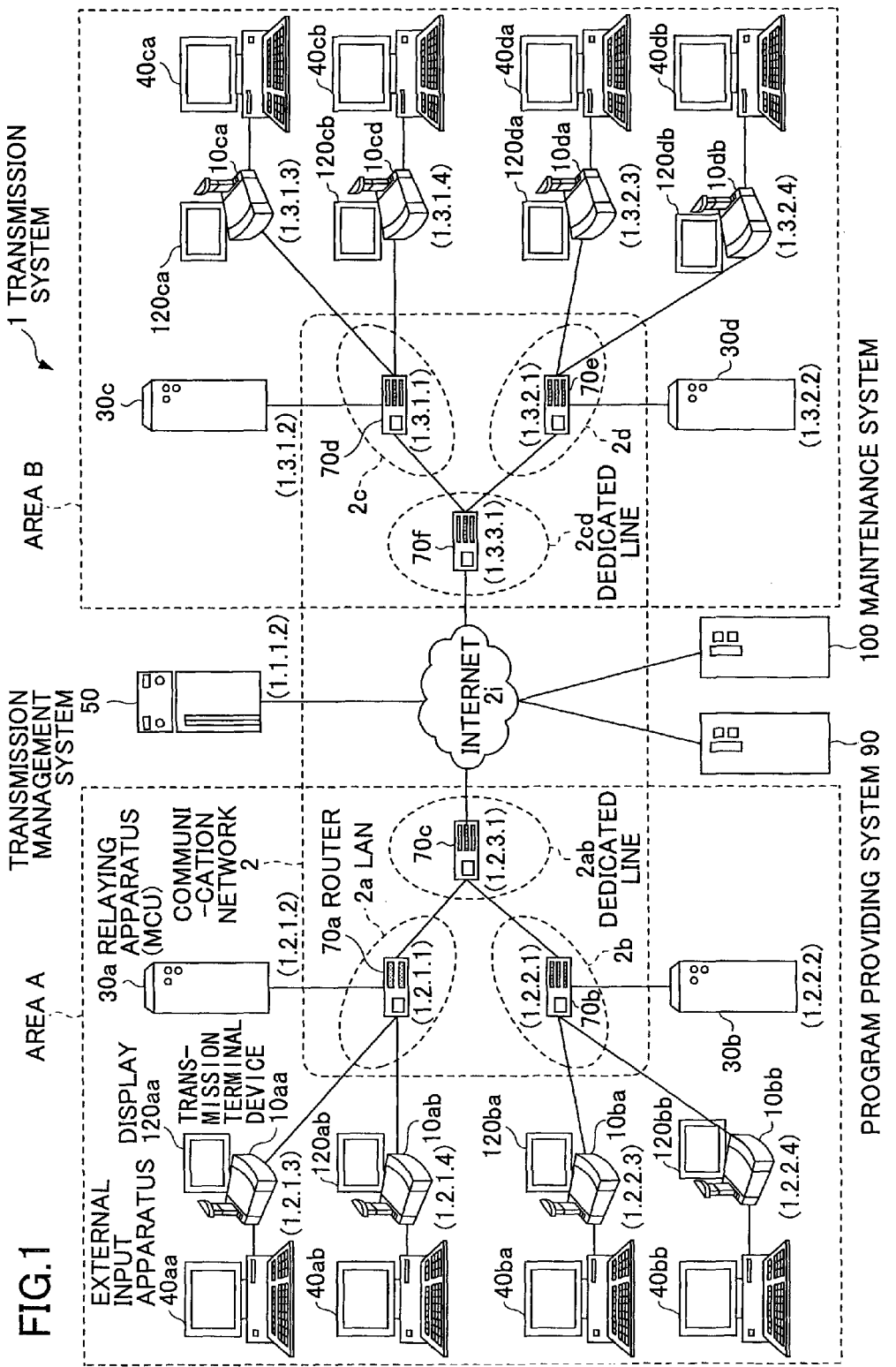
FIG. 1 is a schematic diagram of a transmission system according to an embodiment of the present invention.

1: Transmission system
10: Transmission terminal device
11: Transmitting and receiving unit
12: Operation input receiving unit
13: Log-in requesting unit
14a: Photographing unit
14b: Image display control unit
14b10: Resolution retrieval unit
14b11: Resolution determination unit 14*b*12: Resolution selecting unit
14*b*15: Resolution changing unit
14*b*16: Resolution management table reading unit
15*a*: Audio input unit
15*b*: Audio output unit
16: Selection processing unit
16*a*: Measuring unit
16*b*: Calculation unit
16*c*: Selecting unit
17: Delay detection unit
18: External information transmitting and receiving unit
19: Storing and reading unit
20: Detection unit
30: Relaying apparatus
31: Transmitting and receiving unit
32: State detection unit
33: Data quality confirming unit
34: Change-quality management unit
35: Data quality changing unit
40: External input apparatus
41: Transmitting and receiving unit
42: Connection detecting unit
43: Install determination unit
44: Program acquisition unit
451: Display data acquisition unit
452: Display data transmitting unit
46: Operation input receiving unit
47: Display control unit
48: Mount unit
49: Storing and reading unit
50: Transmission management system
51: Transmitting and receiving unit
52: Terminal device authentication unit
53: State management unit
54: Terminal extracting unit
55: Terminal state acquisition unit
56: Narrowing unit
56*a*: Selection session ID generating unit
56*b*: Terminal device IP address extracting unit
56*c*: Primary selecting unit
56*d*: Priority determination unit
57: Session management unit
58: Quality determination unit
60: Delay time management unit
100: Maintenance system
120: Display
400: Display device
1000: Storing unit
3000: Storing unit
3001: Change quality management DB
4001: Document management DB
5000: Storing unit
5001: Relaying apparatus management DB
5002: Terminal device authentication management DB
5003: Terminal device management DB
5004: Destination list management DB
5005: Session management DB
5006: Priority management DB
5007: Quality management DB

BEST MODE FOR CARRYING OUT THE INVENTION

Overall Configuration of Embodiments

Hereinafter, there will be explained an embodiment of the present invention by referring to FIGS. 1-34. FIG. 1 is a schematic diagram of a transmission system 1 according to the embodiment of the present invention. An outline of the embodiment will be explained by referring to FIG. 1.

The transmission system 1 includes a data providing system in which a transmission terminal device unilaterally transmits content data to another transmission terminal device through a transmission management system 50, and a communication system in which plural transmission terminal devices mutually transmit information and impressions through the transmission management system 50. The communication system is for plural communication terminal devices (corresponding to the transmission terminal devices) to mutually communicate information and impressions through a communication management system (corresponding to the transmission management system 50). Examples of the communication system include a video conference system, a videophone system, an audio conferencing system, a voice telephone system, and a personal computer (PC) screen sharing system.

In the embodiment, a video conference system is assumed to be an example of the communication system, a video conference management system is assumed to be an example of the communication management system, and a video conference terminal device is assumed to be an example of the communication terminal device. Based on these assumptions, there will be explained the transmission system 1, the transmission management system 50, and the transmission terminal devices. Namely, the transmission terminal devices and the transmission management system according to the embodiment of the present invention can be applied to the video conference system as well as the communication system and a transmission system.

The transmission system 1 shown in FIG. 1 includes plural transmission terminal devices (10*aa*, 10*ab*, . . . , 10*db*); displays (120*aa*, 120*ab*, . . . , and 120*db*) for the corresponding transmission terminal devices (10*aa*, 10*ab*, . . . , and 10*db*); plural relaying apparatuses (30*a*, 30*b*, 30*c*, and 30*d*); a transmission management system 50; a program providing system 90; and a maintenance system 100.

In the embodiment, "the transmission terminal device 10" represents an arbitrary one of the transmission terminal devices (10*aa*, 10*ab*, . . . , and 10*db*); "the display 120" represents an arbitrary one of the displays (120*aa*, 120*ab*, . . . , and 120*db*), and "the relaying apparatus 30" represents an arbitrary one of the relaying apparatus (30*a*, 30*b*, 30*c*, and 30*d*).

The transmission terminal device 10 transmits image data, audio data, and the like to another transmission terminal device 10. The transmission terminal device 10 receives image data, audio data, and the like from another transmission terminal device 10. In the embodiment, a case will be explained where the image of the image data is a moving image. However, the image of the image data is not limited to the moving image. The image of the image data may be a still image. Further, the image of the image data may include both a moving image and a still image. The relaying apparatus 30 relays the image data and the audio data among the plural transmission terminal devices 10. The transmission management system 50 centrally manages the transmission terminal devices 10 and the relaying apparatus 30.

External input apparatuses (40*aa*, 40*ab*, and 40*db*) are connected to the corresponding transmission terminal devices (10*aa*, 10*ab*, . . . , and 10*db*). In the embodiment, "the external input apparatus 40" represents an arbitrary one of the external input apparatuses (40*aa*, 40*ab*, . . . , and 40*db*). The external input apparatus 40 transmits display data for displaying document data to the transmission terminal device 10.

Here, the document data represents, for example, data that can be utilized by using document creation software, spreadsheet software, and presentation software.

Further, plural routers (70a, 70b, . . . , and 70f) shown in FIG. 1 select optimum routes for the image data and the audio data. In the embodiment, "the router 70" represents an arbitrary one of the routers (70a, 70b, . . . , and 70f). The program providing system 90 includes a hard disk drive (not shown), which stores a transmission terminal program. The transmission terminal program is for causing the transmission terminal 10 to realize various functions and/or various steps. The program providing system 90 can transmit the transmission terminal program to the transmission terminal device 10. The hard disk drive of the program providing system 90 also stores a relaying apparatus program. The relaying apparatus program is for causing the relaying apparatus 30 to realize various functions and/or various steps. The program providing system 90 can transmit the relaying apparatus program to the relaying apparatus 30. The hard disk drive of the program providing system 90 also stores a transmission management program. The transmission management program is for causing the transmission management system 50 to realize various functions and/or various steps. The program providing system 90 can transmit the transmission management program to the transmission management system 50.

The transmission terminal device 10aa, the transmission terminal device 10ab, the relaying apparatus 30a, and the router 70a are connected to a LAN 2a. The transmission terminal device 10aa, the transmission terminal device 10ab, the relaying apparatus 30a, and the router 70a can communicate with each other through the LAN 2a. The transmission terminal device 10ba, the transmission terminal device 10bb, the relaying apparatus 30b, and the router 70b are connected to a LAN 2b. The transmission terminal device 10ba, the transmission terminal device 10bb, the relaying apparatus 30b, and the router 70b can communicate with each other through the LAN 2b. The LAN 2a and the LAN 2b are connected to each other through a dedicated line 2ab, which includes the router 70c. The LAN 2a and the LAN 2b can communicate with each other through the dedicated line 2ab. The LAN 2a and the LAN 2b are located within a predetermined area A. For example, the area A is Japan, the LAN 2a is located in an office in Tokyo, and the LAN 2b is located in an office in Osaka.

The transmission terminal device 10ca, the transmission terminal device 10cb, the relaying apparatus 30c, and the router 70d are connected to a LAN 2c. The transmission terminal device 10ca, the transmission terminal device 10cb, the relaying apparatus 30c, and the router 70d can communicate with each other through the LAN 2c. The transmission terminal device 10da, the transmission terminal device 10db, the relaying apparatus 30d, and the router 70e are connected to a LAN 2d. The transmission terminal device 10da, the transmission terminal device 10db, the relaying apparatus 30d, and the router 70e can communicate with each other through the LAN 2d. The LAN 2c and the LAN 2d are connected to each other through a dedicated line 2cd, which includes the router 70f. The LAN 2c and the LAN 2d can communicate with each other through the dedicated line 2cd. The LAN 2c and the LAN 2d are located within a predetermined area B. For example, the area B is the United States of America, the LAN 2c is located in an office in New York, and the LAN 2d is located in an office in Washington, D.C., in the United States of America. The router 70c in the area A and the router 70f in the area B are connected to each other through the Internet 2i. The router 70c and the router 70f can communicate with each other through the Internet 2i.

The transmission management system 50 and the program providing system 90 are connected to the transmission terminal devices 10 and the relaying apparatuses 30 through the Internet 2i. The transmission management system 50 and the program providing system 90 can communicate with the transmission terminal devices 10 and the relaying apparatuses 30 through the Internet 2i. The transmission management system 50 may be located in the area A, the area B, or an area other than the areas A and B. Similarly, the program providing system 90 may be located in the area A, the area B, or an area other than the areas A and B.

The communication network 2 according to the embodiment includes the LAN 2a; the LAN 2b; the dedicated line 2ab; the Internet 2i; the dedicated line 2cd; the LAN 2c; and the LAN 2d.

In FIG. 1, the sets of four numbers indicated in the vicinities of the transmission terminal devices 10, the relaying apparatuses 30, the transmission management system 50, the routers 70, and the program providing system 90, respectively, simply show IPv4 IP addresses. For example, the IP address of the transmission terminal device 10aa is (1. 2. 1. 3). Alternatively to the IPv4 IP addresses, IPv6 IP addresses may be used. However, for the sake of simplicity, the embodiment is explained using the IPv4 IP addresses.

<<Hardware Configurations According to the Embodiment>>

Next, there will be explained hardware configurations according to the embodiment.

Figure 2:
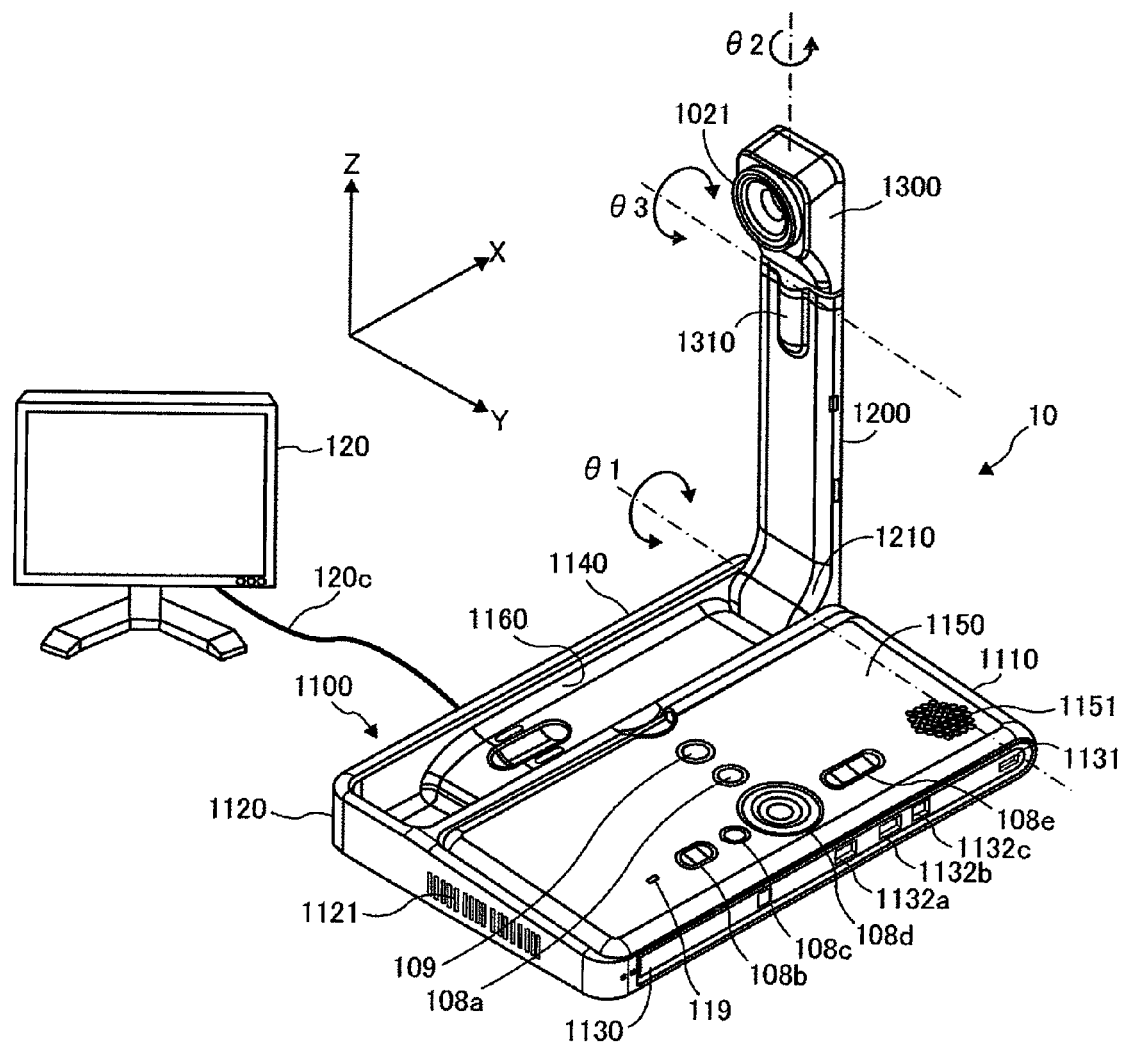
FIG. 2 is an external view of a transmission terminal device according to the embodiment.

FIG. 2 is an external view of the transmission terminal device 10 according to the embodiment. Hereinafter, the hardware configuration of the transmission terminal device 10 will be explained while assuming that a longitudinal direction of the transmission terminal device 10 is an X-axis direction, a direction in a horizontal plane that is perpendicular to the X-axis direction is a Y-axis direction, and a direction perpendicular to the X-axis direction and the Y-axis direction (a vertical direction) is a Z-axis direction.

As shown in FIG. 2, the transmission terminal device 10 includes a chassis 1100; an arm 1200; and a camera housing 1300. A suction surface (not shown) is formed in a front wall surface 1110 of the chassis 1100. The suction surface is formed of plural suction holes. An exhaust plane 1121 is formed in a rear wall surface 1120 of the chassis 1100. The exhaust plane 1121 is formed of plural exhaust holes. With this configuration, the air at the front side of the transmission terminal device 10 is ingested into the chassis 1100 through the suction surface (not shown) by driving of a cooling fan included in the chassis 1100. Then, the air is exhausted to the rear side of the transmission terminal device 10 through the exhaust plane 1121. A sound pickup hole 1131 is formed at a right wall surface 1130 of the chassis 1100. Voices, sounds, and noise can be picked up by a built-in microphone 114 (described later).

An operations panel 1150 is formed in the chassis 1100 at a side of the right wall surface 1130. The operations panel 1150 includes plural operation buttons (108a-108e), a power switch 109 (described later), and an alarm lamp 119 (described later). Further, the operations panel 1150 includes a sound output plane 1151. The sound output plane 1151 is formed of plural sound output holes. An output sound from the built-in speaker 115 passes through the sound output holes. Further, an accommodating portion 1160 is formed in the chassis 1100 at a side of a left wall surface 1140 as a concave portion for accommodating the arm 1200 and the camera housing 1300. Further, plural connecting ports 1132a-1132c are formed in the right wall surface 1130 of the chassis 1100. The connecting ports 1132a-1132c are for electrically connecting corresponding cables to an external device connecting I/F 118 (described later). On the other hand, a connecting port (not shown) for electrically connecting a cable 120c for a display 120 to the external device connecting I/F 118 is formed in the left wall surface 1140 of the chassis 1100.

In the explanation below, "the operation button 108" represents an arbitrary one of the operation buttons 108a-108e, and "the connecting port 1132" represents an arbitrary one of the connecting ports 1132a-1132c.

The arm 1200 is attached to the chassis 1100 through a torque hinge 1210. The arm 1200 can be pivoted in the vertical direction within a range of a tilt angle θ1 from 0 degree to 135 degrees with respect to the chassis 1100. FIG. 2 shows a state where the tilt angle θ1 is 90 degrees.

The camera housing 1300 includes a built-in camera 1021. For example, a user, a document, and a room can be photographed. Additionally, the camera housing 1300 includes a torque hinge 1310. The camera housing 1300 is attached to the arm 1200 through the torque hinge 1310. The camera housing 1300 can be pivoted in the horizontal direction and in the vertical direction with respect to the arm 1200. The camera housing 1300 can be pivoted in the horizontal direction within a range of a pan angle θ2 from −180 degrees to +180 degrees. FIG. 2 shows the state where the pan angle θ2 is 0 degrees. Further, the camera housing 1300 can be pivoted in the vertical direction within a range of a tilt angle θ3 from −45 degrees to +45 degrees. FIG. 2 shows the state where the tilt angle θ3 is 0 degrees.

Since external appearances of the relaying apparatus 30, the management system 50, and the program providing system 90 are the same as that of a usual server computer, explanations of the external appearances of the relaying apparatus 30, the management system 50, and the program providing system 90 are omitted.

Figure 3:
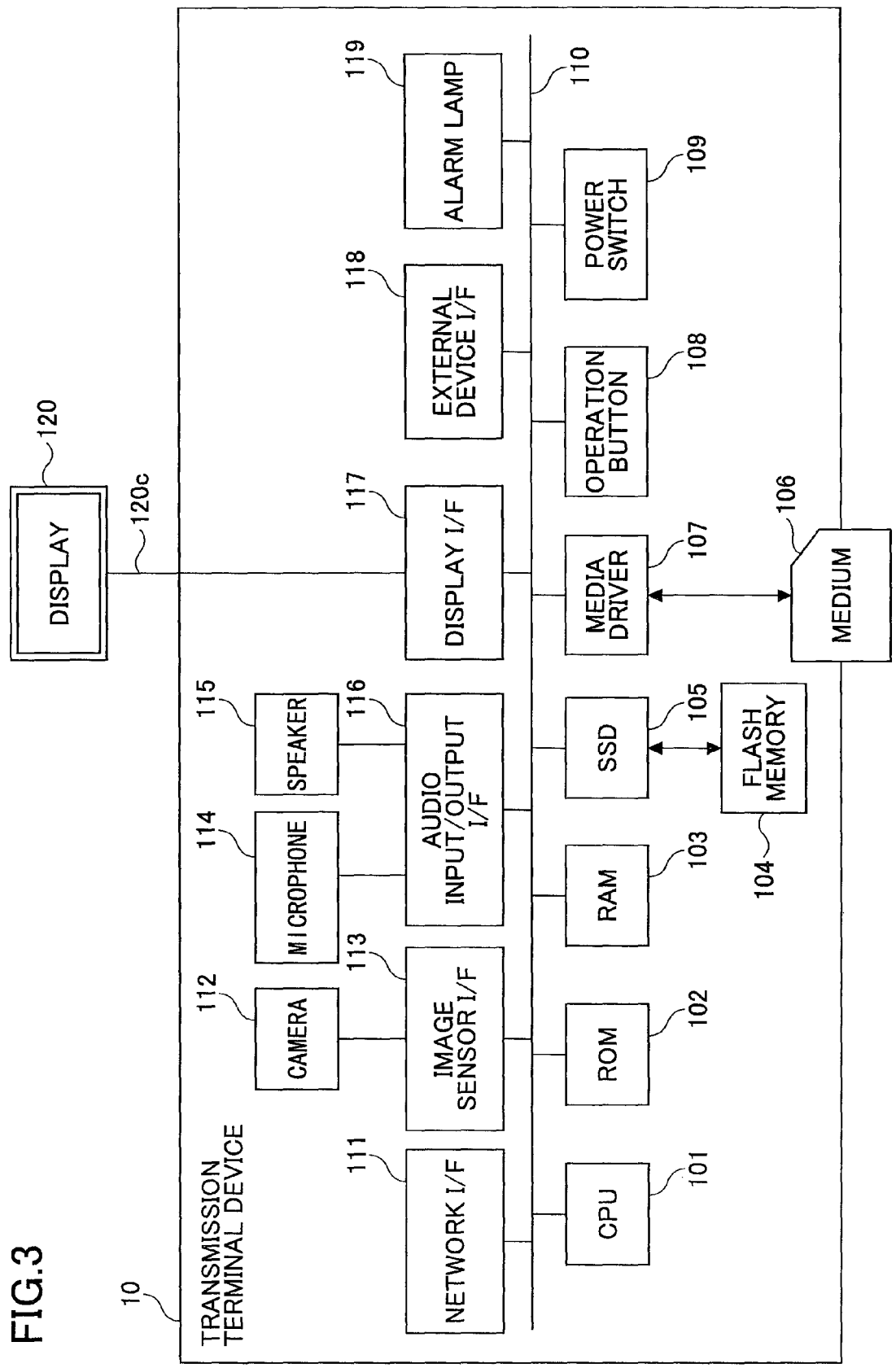
FIG. 3 is a diagram showing a hardware configuration of the transmission terminal device according to the embodiment.

FIG. 3 is a diagram showing a hardware configuration of the transmission terminal device 10 according to the embodiment of the present invention. As shown in FIG. 3, the transmission terminal device 10 according to the embodiment includes a central processing unit (CPU) 101; a read only memory (ROM) 102; a random access memory (RAM) 103; a flash memory 104; a solid state drive (SSD) 105; a media drive 107; the operation button 108; the power switch 109; a network I/F 111; a camera (a charge coupled device (CCD)) 112; an image sensor I/F 113; the microphone 114; the speaker 115; an audio input/output I/F 116; a display I/F 117; the external device connecting I/F 118; the alarm lamp 119; and a bus line 110. The CPU 101 controls the whole transmission terminal device 10. The ROM 102 stores the transmission terminal program. The RAM 103 is used by the CPU 101 as a work area. The flash memory 104 stores various types of data such as image data and audio data. The SSD 105 controls reading out of the various types of data from the flash memory 104 and writing the various types of data into the flash memory 104 in accordance with the control of the CPU 101. The media drive 107 controls reading out of data from a recording medium 106 such as a flash memory and writing (recording) of data into the recording medium 106. The operation button 108 is operated, for example, for selecting a destination of the transmission terminal device 10. The power switch 109 is for turning on and off a power supply of the transmission terminal device 10. The network I/F 111 is for transmitting data by using the communication network 2 (described later). The camera 112 photographs an object and obtains image data in accordance with the control of the CPU 101. The image sensor I/F 113 controls driving of the camera 112. The microphone 114 is for inputting sounds. The speaker 115 is for outputting sounds. The audio input/output I/F 116 processes the input and output of audio signals between the microphone 114 and the speaker 115 in accordance with the control of the CPU 101. The display I/F 117 transmits image data to the external display 120 in accordance with the control of the CPU 101. The external device connecting I/F 118 transmits various types of data to an external device and receives various types of data from an external device. The alarm lamp 119 reports an abnormal state of a function of the transmission terminal device 10. The bus line 110 is an address bus and/or a data bus for electrically connecting the above-described components as shown in FIG. 3.

The display 120 is a display screen that includes liquid crystal or organic light-emitting diodes for displaying, for example, an image of an object and/or an operational icon. The display 120 is connected to the display I/F 117 through the cable 120c. The cable 120c may be a cable for analog RGB (VGA) signals, a cable for the component video, or a cable for High-Definition Multimedia Interface (HDMI) signals or Digital VideoInteractive (DVI) signals.

The camera 112 includes, for example, a lens and a solid state image sensor which converts an image (picture) of an object into electronic data by converting light into charges. As the solid state image sensor, a complementary metal oxide semiconductor (CMOS) or a charge coupled device (CCD) is used, for example.

An external device such as an external camera, an external microphone, and an external speaker can be electrically connected to the external device connecting I/F 118 through a universal serial bus (USB) cable that is connected to the connecting port 1132 of the chassis 1100 shown in FIG. 2. When the external camera is connected to the transmission terminal device 10, the external camera is preferentially driven over the built-in camera 112 in accordance with the control of the CPU 101. Similarly, when the external microphone is connected to the transmission terminal device 10, the external microphone is preferentially driven over the built-in microphone 114 in accordance with the control of the CPU 101. Further, when the external speaker is connected to the transmission terminal device 10, the external speaker is preferentially driven over the built-in speaker 115 in accordance with the control of the CPU 101.

The recording medium 106 is detachably attached to the transmission terminal device 10. Alternatively to the flash memory 104, an electrically erasable and programmable ROM (EEPROM) may be utilized as a non-volatile memory into which data can be written and from which data can be read out in accordance with the control of the CPU 101. Further, the solid state image sensor included in the camera 112 is an image sensor that converts an image (picture) of an object into electronic data by converting light into charges. The solid state image sensor is not limited to the CCD, provided that the solid state image sensor can photograph the object. For example, the CMOS may be used as the solid state image sensor. Further, the display 120 includes the liquid crystal or the organic light-emitting diodes for displaying, for example, an image of an object and/or an operational icon.

Further, the above-described transmission terminal program may be stored in a computer readable recording medium such as the recording medium 106 as a file in a format that can be installed or in a format that can be executed. In this case, the computer readable recording medium storing the transmission terminal program may be distributed.

FIG. 4 is a diagram showing a hardware configuration of the transmission management system 50 according to the embodiment of the present invention. The transmission management system 50 includes a CPU 201; a ROM 202; a RAM 203; a hard disk (HD) 204; a hard disk drive (HDD) 205; a media drive 207; a display 208; a network I/F 209; a keyboard 211; a mouse 212; a CD-ROM drive 214; an external device I/F 215; and a bus line 210. The CPU 201 controls whole the transmission management system 50. The ROM 202 stores the transmission management program. The RAM 203 is used by the CPU 201 as a work area. The HD 204 stores various types of data. The HDD 205 controls reading out of the various types of data from the HD 204 and writing of the various types of data into the HD 204 in accordance with the control of the CPU 201. The media drive 207 controls reading out of data from a recording medium 206 such as a flash memory and writing (recording) of data into the recording medium 206. The display 208 displays various types of information such as a cursor, a menu, a window, a character, and an image. The network I/F 209 is for transmitting data by using the communication network 2 (described later). The keyboard 211 includes plural keys for inputting characters, numbers, and various instructions. The mouse 212 is used for selecting and executing various instructions, selecting an object to be processed, and moving the cursor, for example. The CD-ROM drive 214 controls reading out of data from a compact disc read only memory (CD-ROM) 213 as an example of a removable recording medium and/or writing of data into the CD-ROM 213. The external device I/F 215 transmits information to an external device, and receives information from an external device. The bus line 210 is an address bus and/or a data bus for electrically connecting the above-described components as shown in FIG. 4.

The above-described transmission management program may be stored in a computer readable recording medium such as the recording medium 206 or the CD-ROM 213 as a file in a format that can be installed or in a format that can be executed. In this case, the computer readable recording medium storing the transmission management program may be distributed.

Since the external input apparatus 40 has a hardware configuration similar to that of the transmission management system 50, the explanation of the hardware configuration of the external input apparatus 40 is omitted. However, for the case of the external input apparatus 40, the ROM 202 stores a program for the external input apparatus, which is for controlling the external input apparatus 40. In this case, the program for the external input apparatus may be stored in a computer readable recording medium such as the recording medium 206 or the CD-ROM 213 as a file in a format that can be installed or in a format that can be executed, and the computer readable recording medium storing the program may be distributed.

Since a hardware configuration of the relaying apparatus 30 is the same as that of the transmission management system 50, the explanation of the hardware configuration of the relaying apparatus 30 is omitted. However, for the case of the relaying apparatus 30, the ROM 202 stores a program for the relaying apparatus, which is for controlling the relaying apparatus 30. In this case, the program for the relaying apparatus may also be stored in a computer readable recording medium such as the recording medium 206 or the CD-ROM 213 as a file in a format that can be installed or in a format that can be executed, and the computer readable recording medium storing the program may be distributed.

Since a hardware configuration of the program providing system 90 is the same as that of the transmission management system 50, the explanation of the hardware configuration of the program providing system 90 is omitted. However, for the case of the program providing system 90, the ROM 202 stores a program for the program providing system 90, which is for controlling the program providing system 90. In this case, the program for the program providing system 90 may also be stored in a computer readable recording medium such as the recording medium 206 or the CD-ROM 213 as a file in a format that can be installed or in a format that can be executed, and the computer readable recording medium storing the program may be distributed.

Further, the maintenance system 100 is a computer that maintains, manages, and/or repairs at least one of the transmission terminal device 10, the relaying apparatus 30, the transmission management system 50, and the program providing system 90. For example, when the maintenance system 100 is located within a country and the transmission terminal device 10, the relaying apparatus 30, the transmission management system 50, or the program providing system 90 is located outside the country, the maintenance system 100 remotely performs maintenance (maintains, manages, and/or repairs) of at least one of the transmission terminal device 10, the relaying apparatus 30, the transmission management system 50, and the program providing system 90 through the communication network 2.

The maintenance system 100 also performs maintenance, such as management of a model number, a serial number, a purchaser, maintenance and inspection, or a failure history, of at least one of the transmission terminal device 10, the relaying apparatus 30, the transmission management system 50, and the program providing system 90 without using the communication network 2.

Since a hardware configuration of the maintenance system 100 is the same as that of the transmission management system 50, the explanation of the hardware configuration of the maintenance system 100 are omitted. However, for the case of the maintenance system 100, the HD 204 stores a program for maintenance system, which is for controlling the maintenance system 100. In this case, the program for the maintenance system may also be stored in a computer readable recording medium such as the recording medium 206 or the CD-ROM 213 as a file in a format that can be installed or in a format that can be executed, and the computer readable recording medium storing the program may be distributed. Further, the program for the maintenance system may be stored in the ROM 202 instead of the HD 204.

Further, computer readable recording media such as a compact disc recordable (CD-R), a digital versatile disk (DVD), and a Blu-ray Disk (BD) can be considered as examples of the removable recording medium. Therefore, each of the above-described programs may be recorded in the CD-R, the DVD, or the BD, and the CD-R, the DVD, or the BD storing the corresponding program may be distributed.

<<Functional Configuration of the Transmission System>>

Figure 5A:
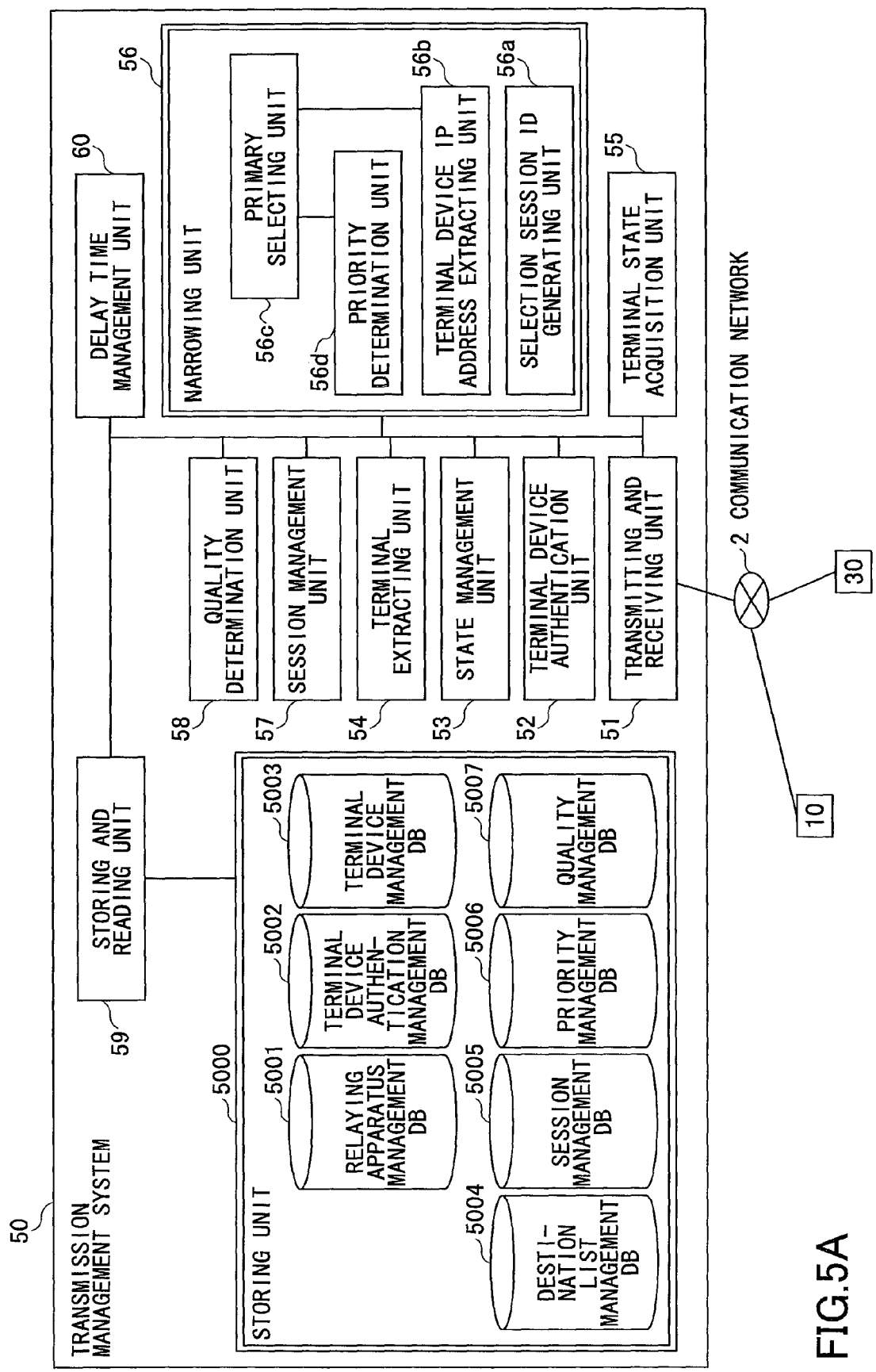
FIGS. 5A and 5B are functional block diagrams of the transmission terminal device, the relaying device, and the transmission management system included in the transmission system according to the embodiment.
Figure 5B:
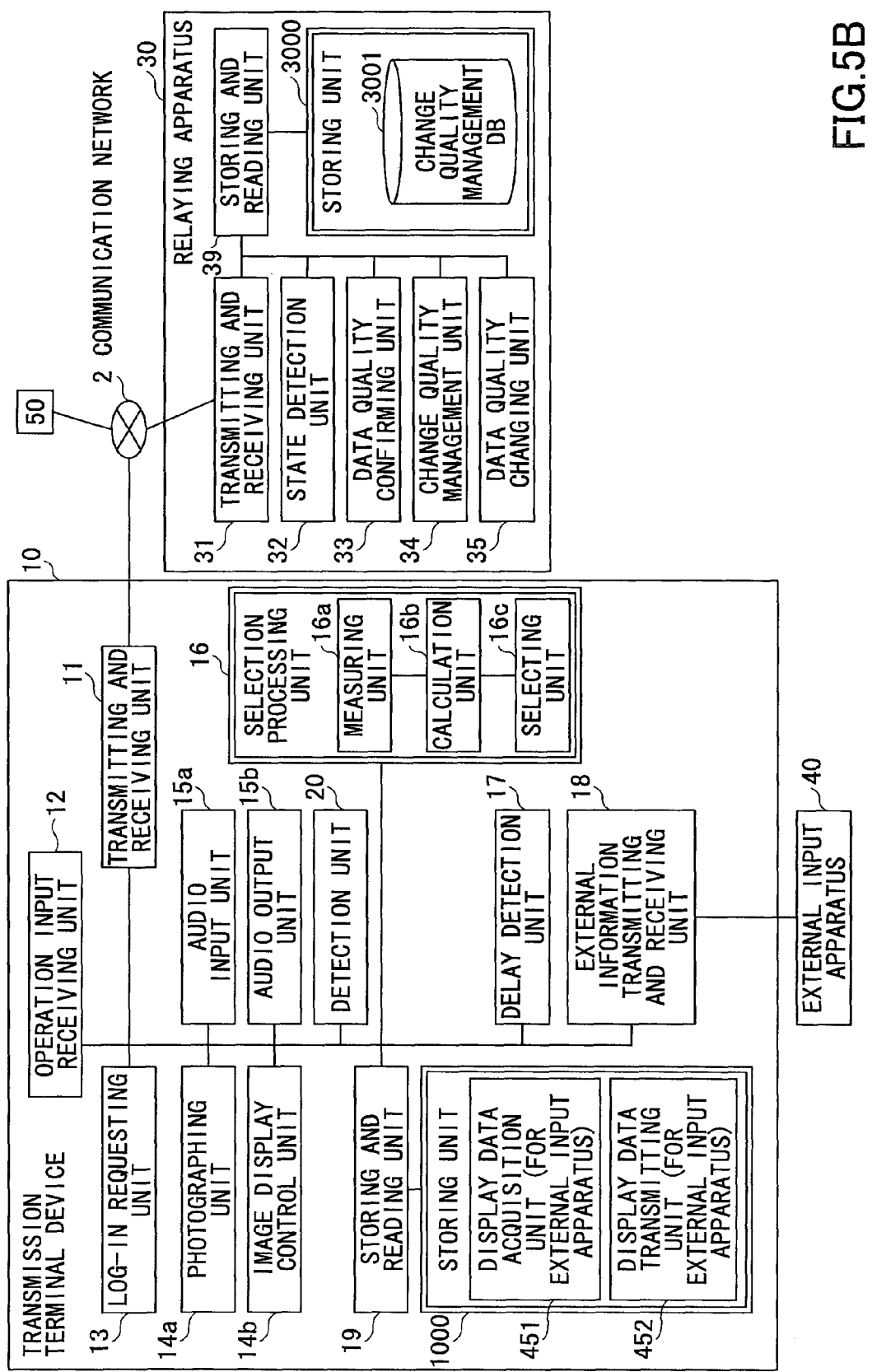
Figure 24:
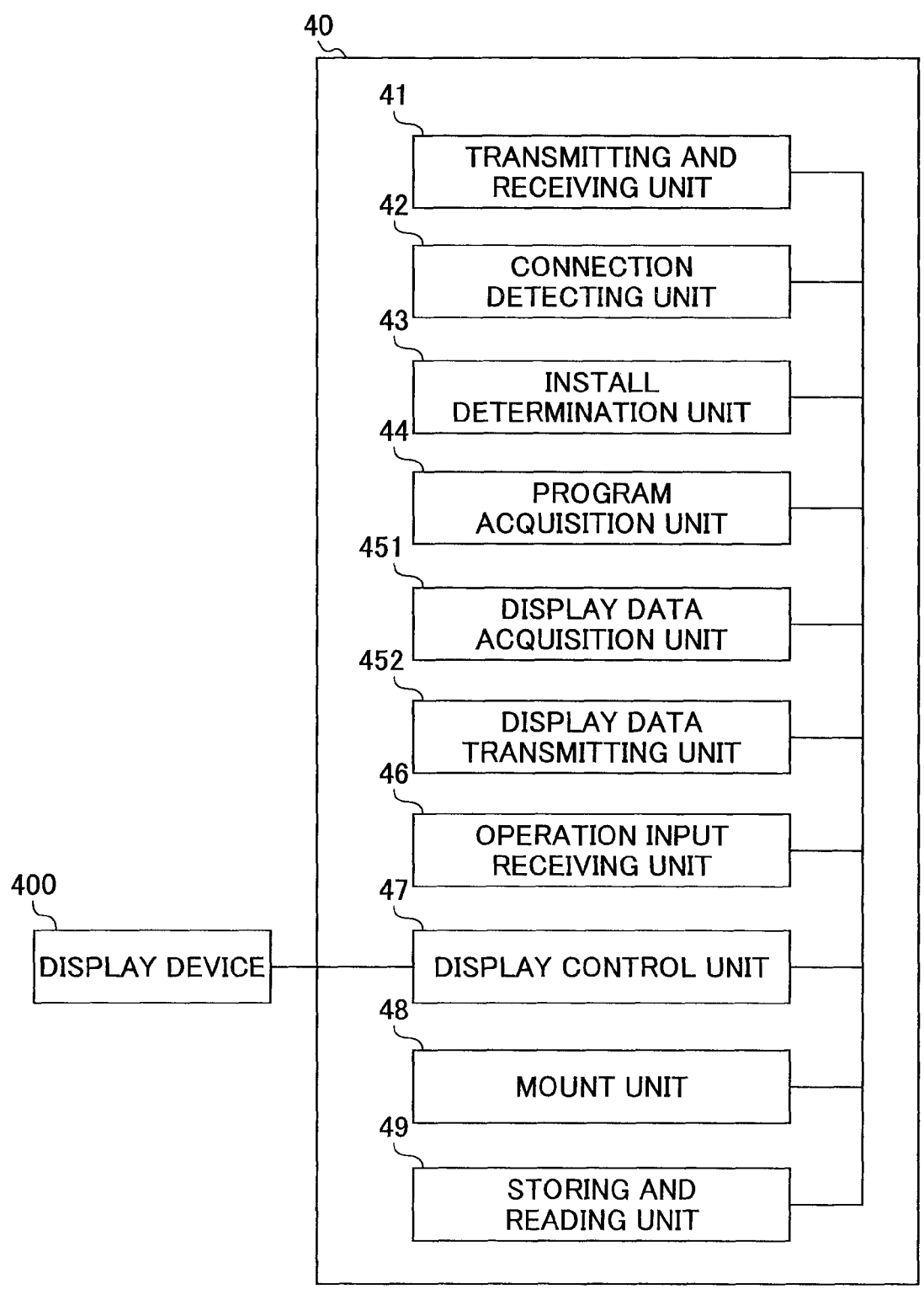
FIG. 24 is a functional block diagram of the external input apparatus.

Next, there will be explained a functional configuration of the transmission system 1 according to the embodiment. FIGS. 5A and 5B are functional block diagrams of the transmission terminal device 10, the relaying apparatus 30, and the transmission management system 50 included in the transmission system 1 according to the embodiment. In FIGS. 5A and 5B, the transmission terminal device 10, the relaying apparatus 30, and the transmission management system 50 are connected to each other through the communication network 2, so that data communications can be performed among the transmission terminal device 10, the relaying apparatus 30, and the transmission management system 50. The external input apparatus 40 is connected to the transmission terminal device 10, so that the external input apparatus 40 can transmit data to and receive data from the transmission terminal device 10. Further, FIG. 24 is a functional block diagram of the external input apparatus 40 that is included in the transmission system 1 according to the embodiment. Since the program providing system 90 shown in FIG. 1 is not directly related to communications for video conferencing, the program providing system 90 is omitted in FIGS. 5A and 5B.

<Functional Configuration of the Transmission Terminal Device>

The transmission terminal device 10 includes a transmitting and receiving unit 11; an operation input receiving unit 12; a log-in requesting unit 13; a photographing unit 14a; an image display control unit 14b; an audio input unit 15a; an audio output unit 15b; a selection processing unit 16; a delay detection unit 17; an external information transmitting and receiving unit 18; and a storing and reading unit 19. These functional elements or steps are realized when the corresponding elements shown in FIG. 3 operate in accordance with instructions from the CPU 201. Here, the instructions from the CPU 201 are in accordance with the program stored in the ROM 202. Further, the transmission terminal device 10 includes a storing unit 1000. The storing unit 1000 is formed of the combination of the SSD 105 and the flash memory 104 shown in FIG. 3, for example.

(Functional Elements of the Transmission Terminal Device)

Next, the functional elements of the transmission terminal device 10 will be explained in detail. The transmitting and receiving unit 11 of the transmission terminal device 10 is realized by the network I/F 111 shown in FIG. 3. The transmitting and receiving unit 11 transmits various types of data (information) to and receives various types of data (information) from another device, another apparatus, or another system through the communication network 2. The operation input receiving unit 12 is realized by the operation button 108 and the power switch 109 shown in FIG. 3. The operation input receiving unit 12 receives various inputs from an operator. For example, when the operator turns on the power switch 109 shown in FIG. 3, the operation input receiving unit 12 shown in FIG. 5B receives the input for turning on the power supply, and the operation input receiving unit 12 turns on the power supply. The log-in requesting unit 13 is realized by an instruction from the CPU 101 shown in FIG. 3. Triggered by the reception of the input for turning on the power supply, the log-in requesting unit 13 automatically transmits log-in request information for requesting a log-in and the current IP address of the transmission terminal device 10ab from the transmitting and receiving unit 11 to the transmission management system 50 through the communication network 2.

The photographing unit 14a is realized by the camera 112, and the image sensor I/F 113 shown in FIG. 3. The photographing unit 14a photographs an object, and outputs image data that is obtained by the photographing.

The image display control unit 14b is realized by the display I/F 117. The image display control unit 14b controls transmission of image data to the external display 120. The image display control unit 14b suitably controls the resolution of the image data to be output depending on the resolution of the display (display device) 120 being connected.

Figure 29:
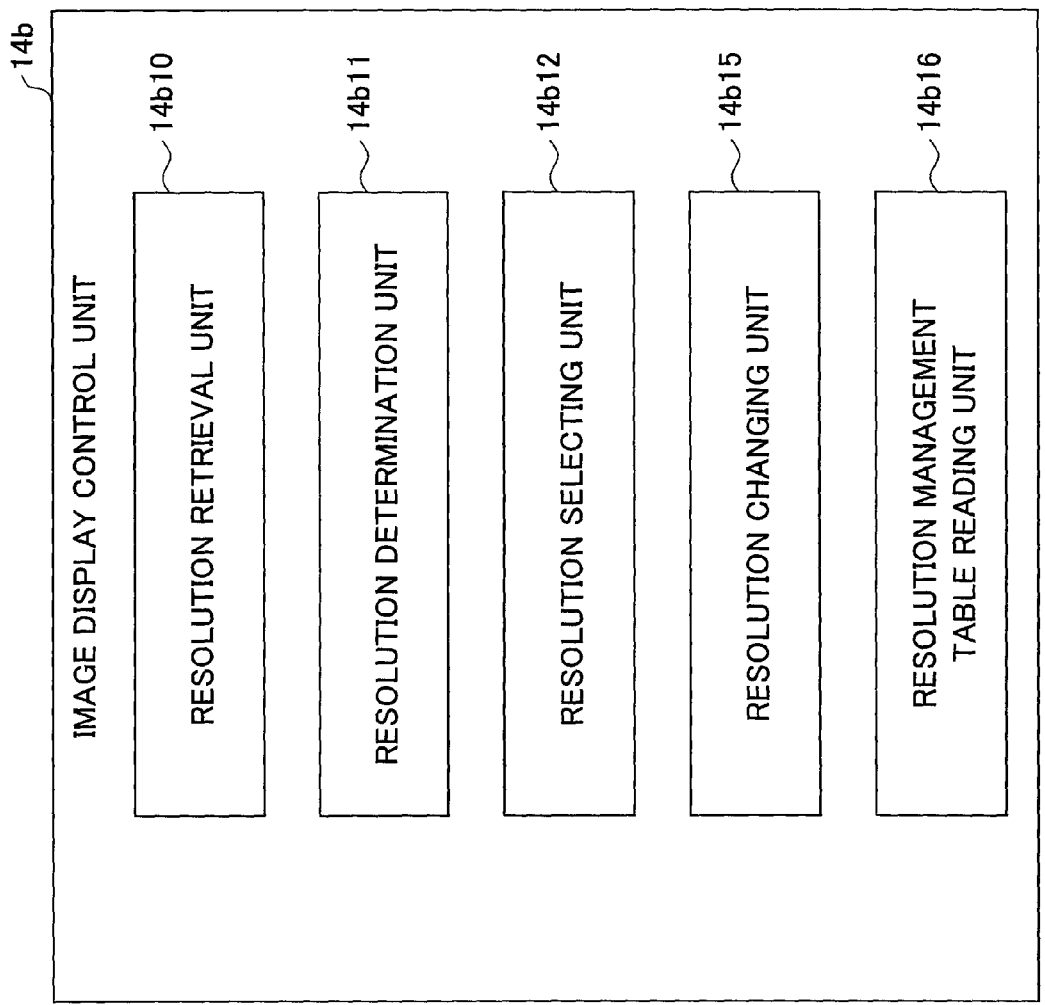
FIG. 29 is a diagram showing an example of a configuration of an image display control unit.

As shown in FIG. 29, the image display control unit 14b includes a resolution retrieval unit 14b10; a resolution determination unit 14b11; a resolution selecting unit 14b12; a resolution changing unit 14b15; and a resolution management table reading unit 14b16. The resolution retrieval unit 14b10 obtains recommended resolution and available resolution from information (FIG. 30) that is retrieved from the display 120. When a resolution management table is provided, the resolution retrieval unit 14b10 obtains the resolution from the data that has been read out from the resolution management table. The resolution determination unit 14b11 determines whether the resolution satisfies a predetermined condition. The resolution selecting unit 14b12 selects a resolution among plural types of resolutions based on a predetermined condition. The resolution changing unit 14b15 changes the resolution to the selected resolution which has been selected by the resolution selecting unit 14b12. The resolution management table reading unit 14b16 reads out a data line from the resolution management table.

FIG. 30 shows an example of data that is used for control by the image display control unit 14b. The data includes items such as "current display resolution," "recommended resolution," "displayable resolution," "block #1," and "block #2." Here, the "current display resolution," the "recommended resolution," and the "displayable resolution" correspond to information in the basic data fields of the EDID, and the "block #1" and the "block #2" correspond to information in the extended data fields of the EDID.

As for the "current display resolution," the resolution (width and height) which has been obtained from the display 120 by the resolution retrieval unit 14b10 and which is currently set for displaying is temporarily retained. The "recommended resolution" is the resolution that is recommended by the display 120. The "recommended resolution" is obtained from the display 120. In many cases, the recommended resolution is defined to be the maximum displayable resolution (native resolution). As for the "displayable resolution," single resolution (width and height) or plural types of resolutions (width and height) which have been obtained by the resolution retrieval unit 14b10 from the display 120 and which can be displayed by the display 120 are retained. Some items which may be defined at the display 120 may be allocated to the "block #1" and the "block #2." For example, 1280×720 has been allocated to the "block #1" as the displayable resolution. However, here, it is assumed that the contents of the "block #1" and the "block #2" have not been obtained due to a conversion cable. Therefore, invalid values (NULL) are indicated as the contents of the "block #1" and the "block #2."

Further, the image display control unit 14b utilizes a reference aspect ratio (e.g., 16:9) that is utilized for transmitting image data between the transmission terminal device 10 and the relaying apparatus 30; priority resolution (e.g., 1280×720 for a high-definition television) that may be utilized if possible; standard resolution (e.g., 1024×768) that is the default resolution; resolution that is higher than or equal to the priority resolution in the reference aspect ratio (e.g., 1920×1080 and 1280×720); wide resolution other than the reference aspect ratio (e.g., 1280×800, 1280×768, and 1366×768); and a standard aspect ratio for the standard resolution (e.g., 4:3) as predefined data. In general, the resolution of 1366×768 is classified as the aspect ratio of 16:9. However, this aspect ratio is not exactly equal to 16:9. Therefore, the resolution of 1366×768 is excluded from the aspect ratio of 16:9.

The audio input unit 15a is realized by the microphone 114 and the audio input/output I/F 116 shown in FIG. 3. When sound is input to the audio input unit 15a, the audio input unit 15a converts the sound into an audio signal and outputs audio data including the audio signal. The audio output unit 15b is realized by the speaker 115 and the audio input/output I/F 116 shown in FIG. 3. The audio output unit 15b converts the audio data including the audio signal into sound and outputs the sound.

The selection processing unit 16 includes a measuring unit 16a; a calculation unit 16b; and a selecting unit 16c, which are realized by instructions from the CPU 101 shown in FIG. 3.

This configuration is for the selection processing unit 16 to perform a narrowing process where eventually one relaying apparatus 30 is selected among the plural relaying apparatuses 30. The measuring unit 16a measures date and time of receiving advance transmission information by the transmitting and receiving unit 11 for each advance transmission information piece (described later) that has been received by the transmitting and receiving unit 11. The calculation unit 16b calculates, for each advance transmission information piece for which the reception date and time has been measured by the measuring unit 16a, the time period spent from transmitting the advance transmission information piece to receiving the advance transmission information piece based on a difference between the measured reception time and the transmission data and time included in the advance transmission information. The selecting unit 16c eventually selects one relaying apparatus 30 by selecting the relaying apparatus 30 which has relayed the advance transmission information piece for which the shortest time period has been spent, among the time periods that have been calculated by the calculation unit 16b.

The delay detection unit 17 is realized by instructions from the CPU 101 shown in FIG. 3. The delay detection unit 17 detects a delay time period (ms) of image data or audio data that has been transmitted from another transmission terminal device 10 through the relaying apparatus 30. Further, the external information transmitting and receiving unit 18 transmits data to and receives data from an external device through the external device I/F 118. Further, the storing and reading unit 19 is realized by the SSD 105 shown in FIG. 3. The storing and reading unit 19 stores various types of data in the storing unit 1000, and reads out various types of data stored in the storing unit 1000. The storing unit 1000 stores, for example, a terminal device identification (ID) and a password for identifying the transmission terminal device 10; a relaying apparatus ID for identifying the relaying apparatus 30 that transmits image data, audio data, and other types of data; and an IP address of a destination terminal device. Further, the storing unit 1000 stores a display data acquisition unit 451 and a display data transmitting unit 452. The display data acquisition unit 451 and the display data transmitting unit 452 are transmitted to the external input apparatus 40, and operate on the external input apparatus 40. The display data acquisition unit 451 is for the external input apparatus 40 to obtain display data. The display data transmitting unit 452 is for transmitting the display data that has been obtained by the display data acquisition unit 451 to the transmission terminal device 10. The display data is, for example, image data which is formed by converting an image displayed on a screen of a display device into a Joint Photographic Experts Group (JPEG) format or into a Bitmap format, or drawing commands which are formed by converting the image displayed on the screen of the display device into a Graphics Device Interface (GDI) format.

The terminal device ID according to the embodiment is, for example, identifying information such as descriptions, characters, symbols, or various types of marks that are used for uniquely identifying the transmission terminal device 10. Similarly, the relaying apparatus ID (described later) is, for example, identifying information such as descriptions, characters, symbols, or various types of marks that are used for uniquely identifying the relaying apparatus 30. Further, the terminal device ID and the relaying apparatus ID may be identifying information in which at least two of the above-described descriptions, characters, symbols, and various types of marks are combined. Hereinafter, in the explanation, the transmission terminal device 10 which requests to start a video conference is referred to as a "requesting terminal device 10A," and the transmission terminal device 10 which is requested to start the video conference is referred to as a "destination terminal device 10B."

<Functional Configuration of the External Input Apparatus>

As shown in FIG. 24, the external input apparatus 40 includes a transmitting and receiving unit 41; a connection detection unit 42; an install determination unit 43; a program acquisition unit 44; an operation input receiving unit 46; a display control unit 47; a mount unit 48; and a storing and reading unit 49. These functional elements or steps are realized when the corresponding elements shown in FIG. 4 operate in accordance with instructions from the CPU 201. Here, the instructions from the CPU 201 are in accordance with the program stored in the ROM 202. Further, the external input apparatus 40 includes a storing unit 4000. The storing unit 4000 is formed of the HDD 205 shown in FIG. 4. Further, an operating system (OS) such as Windows (registered trademark) has been installed in the external input apparatus 40. Therefore, the external input apparatus 40 has a capability to execute a program when the external input apparatus 40 is connected to another device.

<Functional Elements of the External Input Apparatus>

The transmitting and receiving unit 41 of the external input apparatus 40 is realized by the network I/F 209 shown in FIG. 4. The transmitting and receiving unit 41 transmits various types of data (information) to and receives various types of data (information) from the transmission terminal device 10. The connection detection unit 42 detects that transmission and reception of data between an external device and the external input apparatus 40 are enabled by the external device I/F 215. The install determination unit 43 determines whether the display data acquisition unit 451 and the display data transmitting unit 452 have been installed in the external input apparatus 40. The program acquisition unit 44 obtains the display data acquisition unit 451 and the display data transmitting unit 452 from the storing unit 1000 of the transmission terminal device 10 that has been connected to the external input apparatus 40 through the transmitting and receiving unit 41, and the program acquisition unit 44 installs the display data acquisition unit 451 and the display data transmitting unit 452 in the external input apparatus 40. The operation input receiving unit 46 accepts an input through an operation of an operator. The display control unit 47 causes the display device 400 to display an image which has been read out by the storing and reading unit 49 (described later). The mount unit 48 causes storing units of various devices connected to the external input apparatus 40 to be available. The storing and reading unit 49 is realized by the HDD 205 shown in FIG. 4. The storing and reading unit 49 stores various types of data in the storing unit 4000, and reads out various types of data stored in the storing unit 4000. The storing unit 4000 stores document data, for example.

<Functional Configuration of the Relaying Apparatus>

Next, functions and/or steps of the relaying apparatus 30 will be explained. The relaying apparatus 30 includes a transmitting and receiving unit 31; a state detection unit 32; a data quality confirming unit 33; a change quality management unit 34; a data quality changing unit 35; and a storing and reading unit 39. These functional elements or steps are realized when the corresponding elements shown in FIG. 4 operate in accordance with instructions from the CPU 201. Here, the instructions from the CPU 201 are in accordance with the program stored in the ROM 202. Further, the relaying apparatus 30 includes a storing unit 3000. The storing unit 3000 is formed of the HD 204 shown in FIG. 4.

(Change Quality Management Table)

The storing unit 3000 includes a change quality management DB 3001 that includes a change quality management table as shown in FIG. 7. The change quality management table manages an IP address of the transmission terminal device 10 as a relay destination of image data; and image quality of the image data that is relayed by the relaying apparatus 30 to the relay destination. In the change quality management table, the image quality of the image data is associated with the IP address of the transmission terminal device 10, as shown in FIG. 7, for example.

Figure 6C:
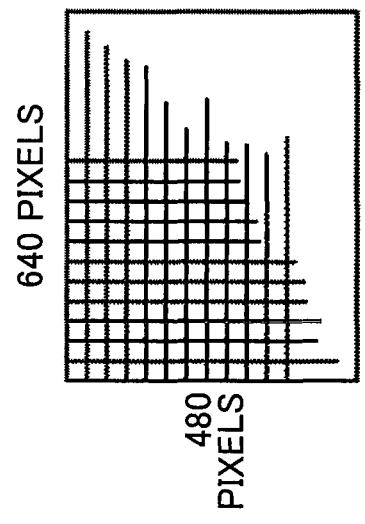
FIGS. 6A-6C are conceptual diagrams illustrating image quality of image data.
Figure 6B:
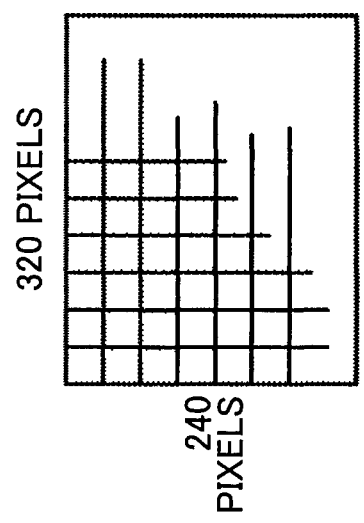
Figure 6A:
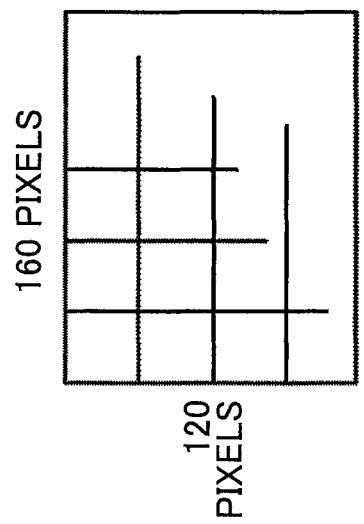

Hereinafter, there will be explained resolution of an image of image data according to the embodiment. Three types of images are considered here. The first one is a low resolution image such as shown in FIG. 6A. The low resolution image is formed of 160 pixels in the horizontal direction and 120 pixels in the vertical direction. The low resolution image is to be a base image. The second one is a middle resolution image such as shown in FIG. 6B. The middle resolution image is formed of 320 pixels in the horizontal direction and 240 pixels in the vertical direction. The third one is a high resolution image such as shown in FIG. 6C. The high resolution image is formed of 640 pixels in the horizontal direction and 480 pixels in the vertical direction. When the data travels through a narrow bandwidth path, low quality image data is relayed. Here, the low quality image data is formed only of the low resolution image data, which is to be the base image. When the bandwidth is relatively broad, middle quality image data is relayed. The middle quality image data is formed of the low resolution image data, which is to be the base image, and the middle resolution image data. Further, when the bandwidth is very broad, high quality image data is relayed. The high quality image data is formed of the low resolution image data, which is to be the base image, the middle resolution image data, and the high resolution image data. For example, as shown in the change quality management table of FIG. 7, when the relaying apparatus 30 relays image data to the destination terminal device 10db having the IP address of (1.3.2.4), image quality of the image data (quality of the image) to be relayed is "high quality."

<Functional Elements of the Relaying Apparatus>

Next, the functional elements of the relaying apparatus 30 will be explained in detail. In the explanation below, while explaining the functional elements of the relaying apparatus 30, there will be also explained relationships between the functional elements and the major components (among the components shown in FIG. 4) for realizing the functional elements.

The transmitting and receiving unit 31 of the relaying apparatus 30 shown in FIG. 5B is realized by the network I/F 209 shown in FIG. 4. The transmitting and receiving unit 31 transmits various data (information) to and receives various data (information) from another terminal device, another apparatus, or another system through the communication network 2. The state detection unit 32 is realized by instructions from the CPU 201 shown in FIG. 4. The state detection unit 32 detects an operating state of the relaying apparatus 30 having the state detection unit 32. The operation states of the relaying apparatus 30 include an online state, an offline state, and a failure state.

The data quality confirming unit 33 is realized by instructions from the CPU 201 shown in FIG. 4. The data quality confirming unit 33 searches the change quality management table (cf. FIG. 7) for image quality of image data to be relayed, by using the IP address of the destination terminal device 10B as a search key. The data quality confirming unit 33 confirms the image quality of the image data to be relayed by extracting the image quality corresponding to the IP address of the destination terminal device 10B. The change quality management unit 34 is realized by instructions from the CPU 201 shown in FIG. 4. The change quality management unit 34 changes contents of the change quality management DB 3001 based on quality information (described later) transmitted from the transmission management system 50. For example, during a video conference that is performed by transmitting and receiving high quality image data between the requesting terminal device 10aa having a terminal device ID of "01aa" and the destination terminal device 10db having a terminal device ID of "01db," when a delay in receiving image data with the destination terminal device 10db is caused, for example, by starting of another video conference between the requesting terminal device 10bb and the destination terminal device 10ca through the communication network 2, the relay apparatus 30 may be required to lower the image quality of the image data that has been relayed so far from the high quality to the middle quality. In such a case, the contents of the change quality management DB 3001 is changed based on the quality information indicating the middle quality, so that the image quality of the image data relayed by the relaying apparatus 30 is lowered from the high quality to the middle quality.

The data quality changing unit 35 is realized by instructions from the CPU 201 shown in FIG. 4. The data quality changing unit 35 changes the image quality of the image data that has been transmitted from a transmission source terminal device 10 based on the contents of the change quality management DB 3001 that have been changed. The storing and reading unit 39 is realized by the HDD 205 shown in FIG. 4. The storing and reading unit 39 stores various types of data in the storing unit 3000, and the storing and reading unit 39 reads out various types of data stored in the storing unit 3000.

<Functional Configuration of the Transmission Management System>

Next, functions and/or steps of the transmission management system 50 will be explained. The transmission management system 50 includes a transmitting and receiving unit 51; a terminal device authentication unit 52; a state management unit 53; a terminal extracting unit 54; a terminal state acquisition unit 55; a narrowing unit 56; a session management unit 57; a quality determination unit 58; a storing and reading unit 59; and a delay time management unit 60. These functional elements or the steps are realized when the corresponding elements shown in FIG. 4 operate in accordance with instructions from the CPU 201. Here, the instructions from the CPU 201 are in accordance with the program stored in the ROM 202. Further, the transmission management system 50 includes a storing unit 5000 formed of the HD 204 shown in FIG. 4.

(Relaying Apparatus Management Table)

The storing unit 5000 includes a relaying apparatus management DB 5001 that includes a relaying apparatus management table shown in FIG. 8. The relaying apparatus management table manages, for each relaying apparatus ID of the corresponding relaying apparatus 30, an operating state of the corresponding relaying apparatus 30; date and time of receiving state information indicating the operating state by the transmission management system 50; an IP address of the corresponding relaying apparatus 30; and the maximum transmission rate (Mbps) of the corresponding relaying apparatus 30. In the relaying apparatus management table, each of the relaying apparatus IDs is associated with the operating state of the corresponding relaying apparatus 30; the date and time of receiving the state information indicating the operating state by the transmission management system 50; the IP address of the corresponding relaying apparatus 30; and the maximum transmission rate (Mbps) of the corresponding relaying apparatus 30. For example, the relaying apparatus management table shown in FIG. 8 indicates that, for the relaying apparatus 30*a* having the relaying apparatus ID of "111a," the operating state is the online state, the date and time of receiving the state information by the transmission management system 50 is "13:00, Nov. 10, 2009," the IP address of the relaying apparatus 30*a* is (1. 2. 1. 2), and the maximum data transmission rate of the relaying apparatus 30*a* is 100 Mbps.

(Terminal Device Authentication Management Table)

Further, the storing unit 5000 includes a terminal device authentication management DB 5002 that includes a terminal device authentication management table such as shown in FIG. 9. The terminal device authentication management table manages the terminal device IDs of all the transmission terminal devices that are managed by the transmission management system 50. In the terminal device authentication management table, the terminal device IDs are associated with the corresponding passwords. For example, the terminal device authentication management table shown in FIG. 9 indicates that the terminal device ID of the transmission terminal device 10*aa* is "01aa" and the password is, "aaaa."

(Terminal Device Management Table)

Further, the storing unit 5000 includes a terminal device management DB 5003 that includes a terminal device management table such as shown in FIG. 10. The terminal device management table manages, for each of the terminal device IDs of the transmission terminal devices 10, an operating state of the corresponding transmission terminal device 10; date and time of receiving the log-in request information (described later) by the transmission management system 50; and an IP address of the corresponding transmission terminal device 10. In the terminal device management table, each of the terminal device IDs of the transmission terminal devices 10 is associated with the operating state of the corresponding transmission terminal device 10; the date and time of receiving the log-in request information by the transmission management system 50; and the IP address of the corresponding transmission terminal device 10. For example, the terminal device management table shown in FIG. 10 indicates that, for the transmission terminal device 10*aa* having the terminal device ID of "01aa," the operating state is the online state, the date and time of receiving the log-in request information by the transmission management system 50 is "13:40, Nov. 10, 2009," and the IP address of the transmission terminal device 10*aa* is (1. 2. 1. 3).

(Destination List Management Table)

Further, the storing unit 5000 includes a destination list management DB 5004 that includes a destination list management table such as shown in FIG. 11. The destination list management table manages, for the terminal device ID of the requesting terminal device 10A that requests to start a video conference, the terminal device IDs of the transmission terminal devices 10 that have been registered as candidates for the destination terminal device 10B. In the destination list management table, the terminal device ID of the requesting terminal device 10A is associated with the terminal device IDs of the transmission terminal devices 10 that have been registered as the candidates for the destination terminal device 10B. For example, the destination list management table shown in FIG. 11 indicates that the transmission terminal device 10*ab* having the terminal device ID of "01ab," the transmission terminal device 10*ab* having the terminal device ID of "01ba," and the transmission terminal device 10*db* having the terminal device ID of "01db" are the candidates for the destination terminal device 10B that can be requested to start a video conference from the requesting terminal device 10*aa* having the terminal device ID of "01aa." A candidate for the destination terminal device 10B may be added or removed in accordance with a request for adding or removing from the requesting terminal device 10A to the transmission management system 50.

(Session Management Table)

Further, the storing unit 5000 includes a session management DB 5005 that includes a session management table such as shown in FIG. 12. The session management table manages, for each of selection session IDs that is used for executing a corresponding session for selecting the corresponding relaying apparatus 30, a relaying apparatus ID of the relaying apparatus 30 that is used for relaying image data and audio data; the terminal device ID of the requesting terminal device 10A; the terminal device ID of the destination terminal device 10B; a delay time period (ms) for receiving image data at the destination terminal device; and date and time of receiving delay information, which is transmitted from the destination terminal device 10B and which indicates the delay time period, by the transmission management system 50. In the session management table, each of the selection session IDs is associated with the relaying apparatus ID of the relaying apparatus 30 that is used for relaying image data and audio data; the terminal device ID of the requesting terminal device 10A; the terminal device ID of the destination terminal device 10B; the delay time period (ms) for receiving image data at the destination terminal device; and the date and time of receiving delay information by the transmission management system 50. For example, the session management table shown in FIG. 12 indicates that the relaying apparatus 30*a* having the relaying apparatus ID of "111a" that has been selected in a session that has been executed while using the selection session ID of "se1" is relaying image data and audio data between the requesting terminal device 10*aa* having the terminal device ID of "01aa" and the destination terminal device 10*db* having the terminal device ID of "01db," and that a delay time period for receiving the image data by the destination terminal device 10*db* at "14:00, Nov. 10, 2009" is 200 ms. When the video conference is performed between two transmission terminal devices 10, the date and time of receiving the delay information may be managed based on the delay information that has been transmitted from the requesting terminal device 10A, instead of the destination terminal device 10B. However, when the video conference is performed among three or more transmission terminal devices 10, the date and time of receiving the delay information is managed based on the delay information that has been transmitted from one of the transmission terminal devices 10 that is receiving the image data and the audio data.

(Address Priority Management Table)

Further, the storing unit 5000 includes a priority management DB 5006 that includes an address priority management table such as shown in FIG. 13. The address priority management table manages values indicating priority of an IP address. In the address priority management table, degrees of similarity between the IP address and another IP address are associated with the corresponding values indicating the priority of the IP address. A usual IPv4 IP address includes a set of four dot address portions. In the address priority management table, the priority of the IP address is managed such that, as a number of dot address portions of the IP address having common values with the corresponding dot address portions of the other IP address increases, the value indicating the priority of the IP address increases. For example, in the address priority management table shown in FIG. 13, when three dot address portions from a higher order position to a lower order position (namely, from left to right) of the IP address have common values with corresponding dot address portions of the other IP address, the value of the priority of the IP address is 5. When two dot address portions from the higher order position to the lower order position of the IP address have common values with the corresponding dot address portions of the other IP address, the value of the priority of the IP address is 3. In this case, whether the dot address portion at the lowest order position of the IP address has a common value with the corresponding dot address portion of the other IP address has nothing to do with the priority of the IP address. When the dot address portion at the highest order position of the IP address has a common value with the corresponding dot address portion of the other IP address, but the dot address portion at the position next to the highest order position of the IP address has a value that is different from a value of the corresponding dot address portion of the other IP address, the value of the priority of the IP address is 1. In this case, whether the dot address portion at the third position from the highest order position of the IP address has a common value with the corresponding dot address portion of the other IP address has nothing to do with the priority of the IP address. Similarly, whether the dot address portion at the lowest order position of the IP address has a common value with the corresponding dot address portion of the other IP address has nothing to do with the priority of the IP address. When a value of the dot address portion at the highest order position of the IP address is different from that of the other IP address, the value of the priority of the IP address is 0. In this case, whether the dot address portion at the second position from the highest order position of the IP address has a common value with the corresponding dot address portion of the other IP address has nothing to do with the priority of the IP address. Similarly, whether the dot address portion at the third position from the highest order position of the IP address has a common value with the corresponding dot address portion of the other IP address has nothing to do with the priority of the IP address, and whether the dot address portion at the lowest order position of the IP address has a common value with the corresponding dot address portion of the other IP address has nothing to do with the priority of the IP address.

(Transmission Rate Priority Management Table)

Further, the priority management DB 5006 included in the storing unit 5000 includes a transmission rate priority management table such as shown in FIG. 14. The transmission rate priority management table manages values indicating priority of a data transmission rate. In the transmission rate priority management table, values of the maximum data transmission rate (Mbps) are associated with the corresponding values indicating the priority of the data transmission rate. In the transmission rate priority management table, the priority of the transmission rate is managed such that, as the value of the maximum data transmission rate (Mbps) at the relaying apparatus 30 increases, the value indicating the priority of the data transmission rate increases. For example, in the transmission rate priority management table shown in FIG. 14, when the maximum data transmission rate at the relaying apparatus 30 is greater than or equal to 1000 Mbps, the value indicating the priority of the data transmission rate is 5. When the maximum data transmission rate at the relaying apparatus 30 is greater than or equal to 100 Mbps and less than 1000 Mbps, the value indicating the priority of the data transmission rate is 3. When the maximum data transmission rate at the relaying apparatus 30 is greater than or equal to 10 Mbps and less than 100 Mbps, the value indicating the priority of the data transmission rate is 1. When the maximum data transmission rate at the relaying apparatus 30 is less than 10 Mbps, the value indicating the priority of the data transmission rate is 0.

(Quality Management Table)

Further, the storing unit 5000 includes a quality management DB 5007 that includes a quality management table such as shown in FIG. 15. The quality management table manages image quality of image data (quality of the image) that is relayed by the relaying apparatus 30. In the quality management table, delay time periods (ms) of the image data at the requesting terminal device 10A or at the destination terminal device 10B are associated with the corresponding types of the image quality.

(Functional Elements of the Transmission Management System)

Next, functional elements of the transmission management system 50 will be explained in detail. In the explanation below, while explaining the functional elements of the transmission management system 50, there will be explained relationships between the functional elements and the major components (among the components shown in FIG. 4) for realizing the functional elements.

The transmitting and receiving unit 51 is realized by the network I/F 209 shown in FIG. 4. The transmitting and receiving unit 51 transmits various types of data (information) to and receives various types of data (information) from another terminal device, another apparatus, or another system through the communication network 2. The terminal device authentication unit 52 searches the terminal device authentication DB 5002 of the storage unit 5000 for the terminal device ID and the password by using the terminal device ID and the password included in the log-in request information that has been received through the transmitting and receiving unit 51 as a search key. The terminal device authentication unit 52 authenticates the transmission terminal device 10 by determining whether the terminal device ID and the password that are the same as the terminal device ID and the password included in the log-in request information have been managed by the terminal device authentication management DB. In order to manage an operating state of the requesting terminal device 10A that has requested to log-in, the state management unit 53 associates the terminal device ID of the requesting terminal device 10A with the an operating state of the requesting terminal device 10A, date and time of receiving the log-in request information by the transmission management system 50, and the IP address of the requesting terminal device 10A. The state management unit 53 stores the terminal device ID of the requesting terminal device 10A, the operating state of the requesting terminal device 10A, the date and time of receiving the log-in request information by the transmission management system 50, and the IP address of the requesting terminal device 10A in the terminal device management table (cf. FIG. 11), and thereby the state management unit 53 manages the operating state of the requesting terminal device 10A.

The terminal extracting unit 54 searches the destination list management table (cf. FIG. 11) for the terminal device ID by using the terminal device ID of the requesting terminal device 10A that has requested to log-in as a key, and the terminal extracting unit 54 extracts the terminal device ID by reading out the terminal device IDs of the candidates for the destination terminal device 10B that can communicate with the requesting terminal device 10A. Further, the terminal extracting unit 54 searches the destination list management table (cf. FIG. 11) for the terminal device ID by using the terminal device ID of the requesting terminal device 10A that has requested to log-in as the key, and the terminal extracting unit 54 extracts a terminal device ID of another requesting terminal device 10A that has registered the terminal device ID of the requesting terminal device 10A as a candidate for the destination terminal device 10B.

The terminal state acquisition unit 55 searches the terminal device management table (cf. FIG. 10) for the operating states of the candidates for the destination terminal device 10B by using the corresponding terminal device IDs of the candidates for the destination terminal device 10B that have been extracted by the terminal extracting unit 54, and the terminal state acquisition unit 55 reads out, for each of the terminal device IDs that has been extracted by the terminal extracting unit 54, the corresponding operating state. In this manner, the terminal state acquisition unit 55 can obtain the operating states of the candidates for the destination terminal device 10B that can communicate with the requesting terminal device 10A that has requested to log-in. Further, the terminal state acquisition unit 55 searches the terminal device management table (cf. FIG. 10) for the operating state of the requesting terminal device 10A by using the terminal device ID of the requesting terminal device 10A as the key, and thereby the terminal state acquisition unit 55 extracts the operating state of the requesting terminal device 10A that has requested to log-in.

In order to facilitate a final narrowing process for eventually selecting one relaying apparatus 30 from the plural relaying apparatuses 30, the narrowing unit 56 performs a primary narrowing process prior to the final narrowing process. Therefore, the narrowing unit 56 includes a selection session ID generating unit 56a; a terminal device ID address extracting unit 56b; a primary selecting unit 56c; and a priority determination unit 56d. The selection session ID generating unit 56a generates a selection session ID that is used for executing a session for selecting the relaying apparatus 30. The terminal device IP address extracting unit 56b searches the terminal device management table (cf. FIG. 10) for the IP address of the requesting terminal device 10A and the IP address of the destination terminal device 10B based on the terminal device ID of the requesting terminal device 10A and the terminal device ID of the destination terminal device 10B that have been included in start request information transmitted from the requesting terminal device 10A, and thereby the terminal device IP address extracting unit 56b extracts the IP address of the requesting terminal device 10A and the IP address of the destination terminal device 10B. The primary selecting unit 56c selects the relaying apparatuses 30 by selecting the relaying apparatus IDs of the relaying apparatuses 30 whose operating states are the online states, among the relaying apparatuses 30 managed by the relaying apparatus management table (cf. FIG. 8).

Further, the primary selecting unit 56c searches the relaying apparatus management table (cf. FIG. 8) for the IP addresses of the relaying apparatuses 30 based on the IP address of the requesting terminal device 10A and the IP address of the destination terminal device 10B that have been extracted by the terminal device IP address extracting unit 56b, and thereby the primary selecting unit 56c examines, for each of the selected relaying apparatuses 30, whether the value of each of the dot addresses included in the IP address of the relaying apparatus 30 is the same as the value of the corresponding dot address of the IP address of the requesting terminal device 10A and the value of the corresponding dot address of the IP address of the destination terminal device 10B. The primary selecting unit 56c further performs selection of the relaying apparatus 30 by selecting two of the relaying apparatuses 30 in a descending order of combined values. Here, the combined value is defined for each of the relaying apparatuses 30 to be a value obtained by adding the value indicating the priority of the data transmission rate and the greater value between the value indicating the priority of the IP address of the relaying apparatus 30 with respect to the requesting terminal device 10A and the value indicating the priority of the IP address of the relaying apparatus 30 with respect to the destination terminal device 10B.

In the embodiment, the two of the relaying apparatuses 30 are selected in the descending order of the combined values. However, the embodiment is not limited to this. For example, three or more of the relaying apparatuses 30 may be selected in the descending order of the combined values, provided that the number of the relaying apparatuses 30 can be narrowed down.

The priority determination unit 56d determines the value indicating the priority of the IP address for each of the relaying apparatuses 30 that have been examined by the primary selecting unit 56c by referring to the address priority management table (cf. FIG. 13). Further, the priority determination unit 56d determines the value indicating the priority of the data transmission rate for each of the relaying apparatuses 30 that have been selected by the primary selecting unit 56c by searching the transmission rate priority management table (cf. FIG. 14) for the values indicating the priority of the data transmission rate, based on the maximum transmission rates of the corresponding relaying apparatuses 30 managed by the relaying apparatus management table (cf. FIG. 8).

The session management unit 57 manages the session management table (cf. FIG. 12) included in the storing unit 5000. In the session management table, each of the selection session IDs generated by the selection session ID generating unit 56a is associated with the corresponding terminal device ID of the requesting terminal device 10A and the corresponding terminal device ID of the destination terminal device 10B. The selection session IDs, the corresponding terminal device IDs of the requesting terminal devices 10A, and the corresponding terminal device IDs of the destination terminal device 10B are stored in the session management table. Further, the session management unit 57 stores, for each of the selection session IDs, the relaying apparatus ID of the corresponding relaying apparatus 30, which has eventually been selected by the selecting unit 16c of the transmission terminal device 10, in the session management table (cf. FIG. 12), and thereby the session management unit 57 manages, for each of the selection session IDs, the relaying apparatus ID of the corresponding relaying apparatus 30.

The quality determination unit 58 searches the quality management table (cf. FIG. 15) for the image quality by using the delay time period as a search key, and the quality determination unit 58 extracts the image quality of the image data corresponding to the delay time period. In this manner, the quality determination unit 58 determines the image quality of the image data, which is to be relayed by the relaying unit 30. The storing and reading unit 59 is realized by the HDD 205 shown in FIG. 4. The storing and reading unit 59 stores various types of data into the storing unit 5000, and reads out various types of data stored in the storing unit 5000. The delay time management unit 60 searches the terminal management table (cf. FIG. 10) for the terminal device ID by using the IP address of the destination terminal device 10B as a search key, and thereby the delay time management unit 60 extracts the corresponding terminal device ID. Further, in the session management table (cf. FIG. 12), the delay time management unit 60 stores the delay time period indicated in the delay information into a field for the delay time period of a record which includes the extracted terminal device ID.

<<Processing and Operations>>
(Basic Processing and Operations)

Figure 16:
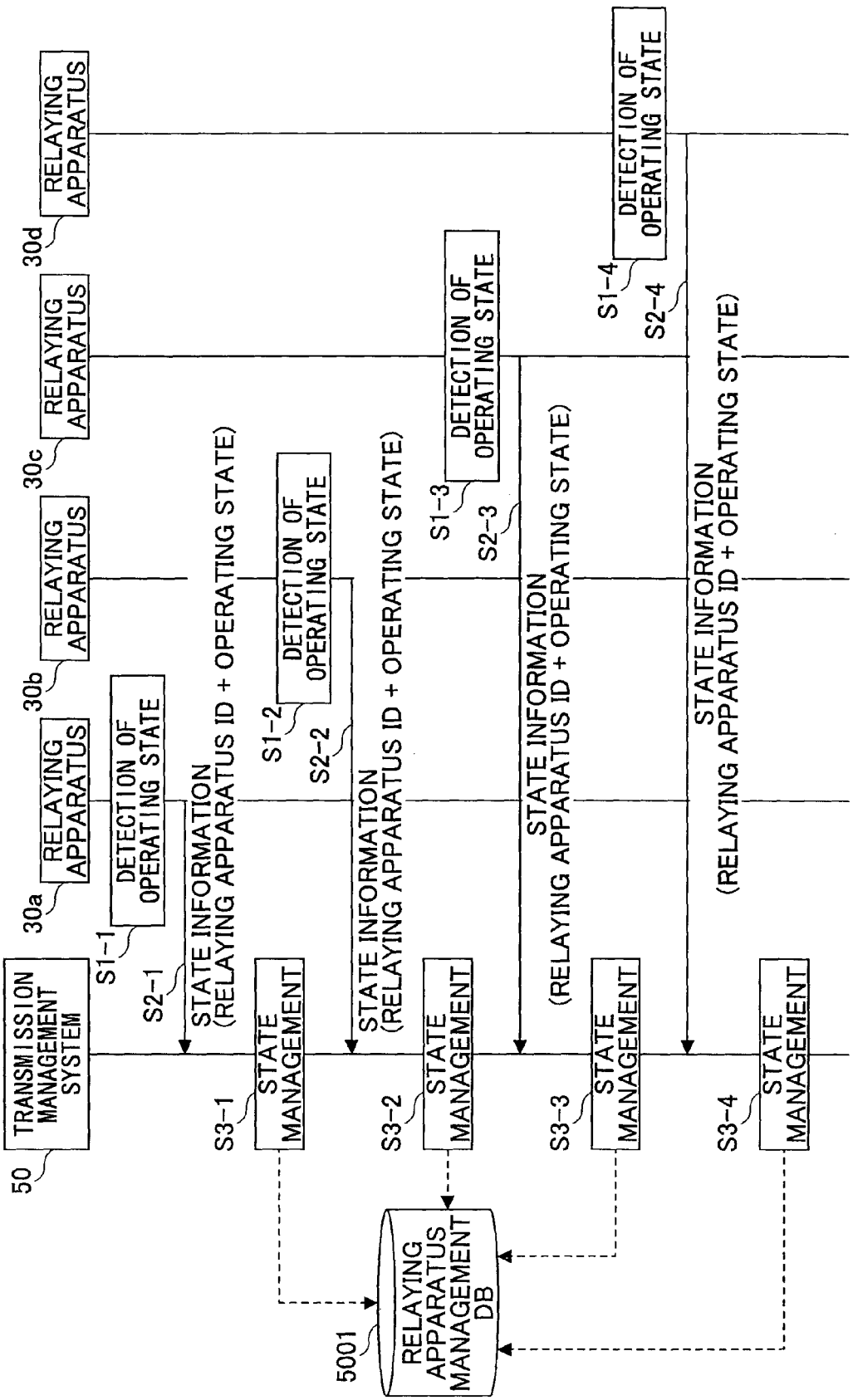
FIG. 16 is a sequence diagram showing a process of managing state information indicating operating states of the relay apparatuses.
Figure 17:
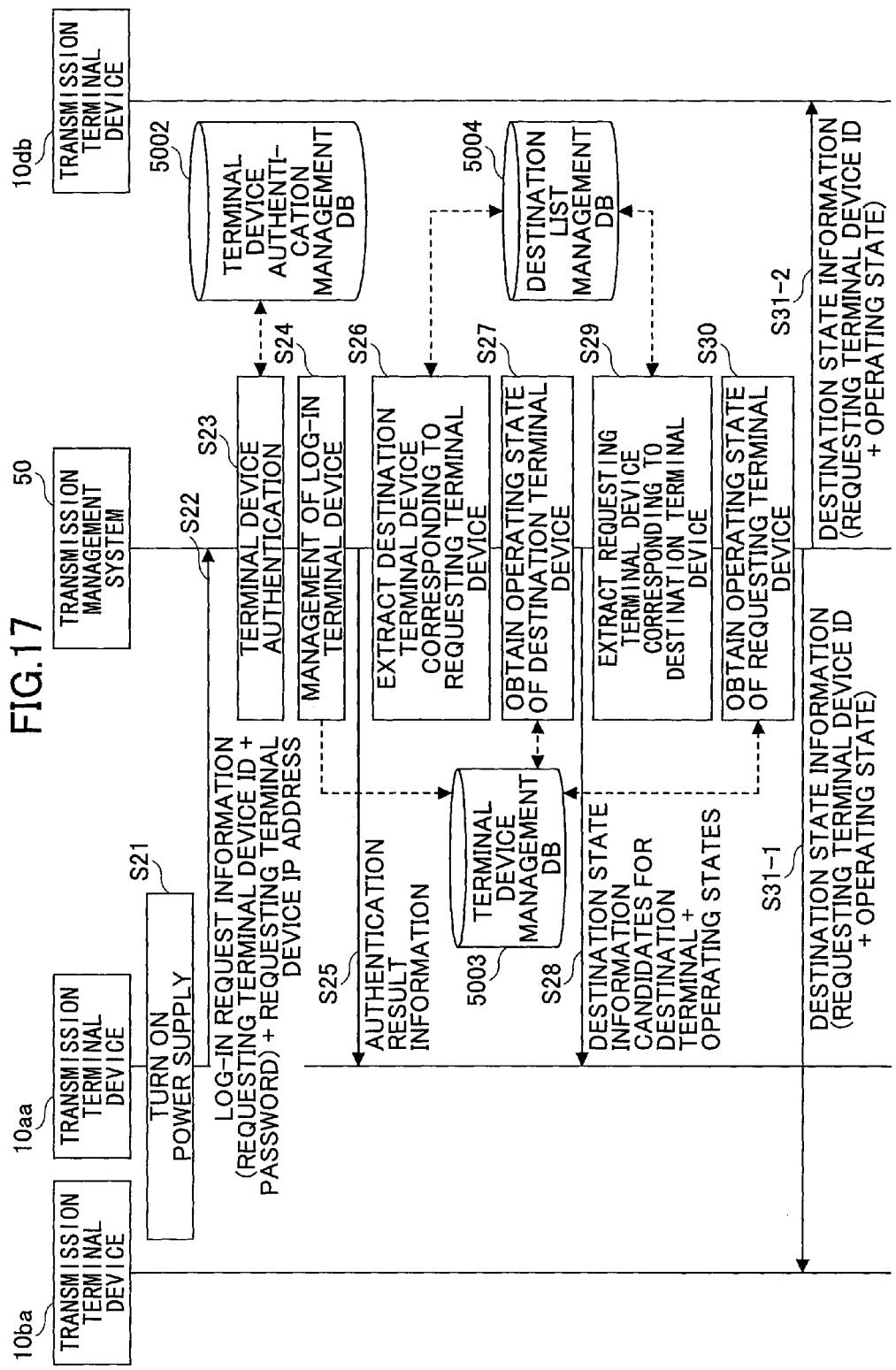
FIG. 17 is a sequence diagram showing a preparation process to start performing communications among the transmission terminal devices.
Figure 18:
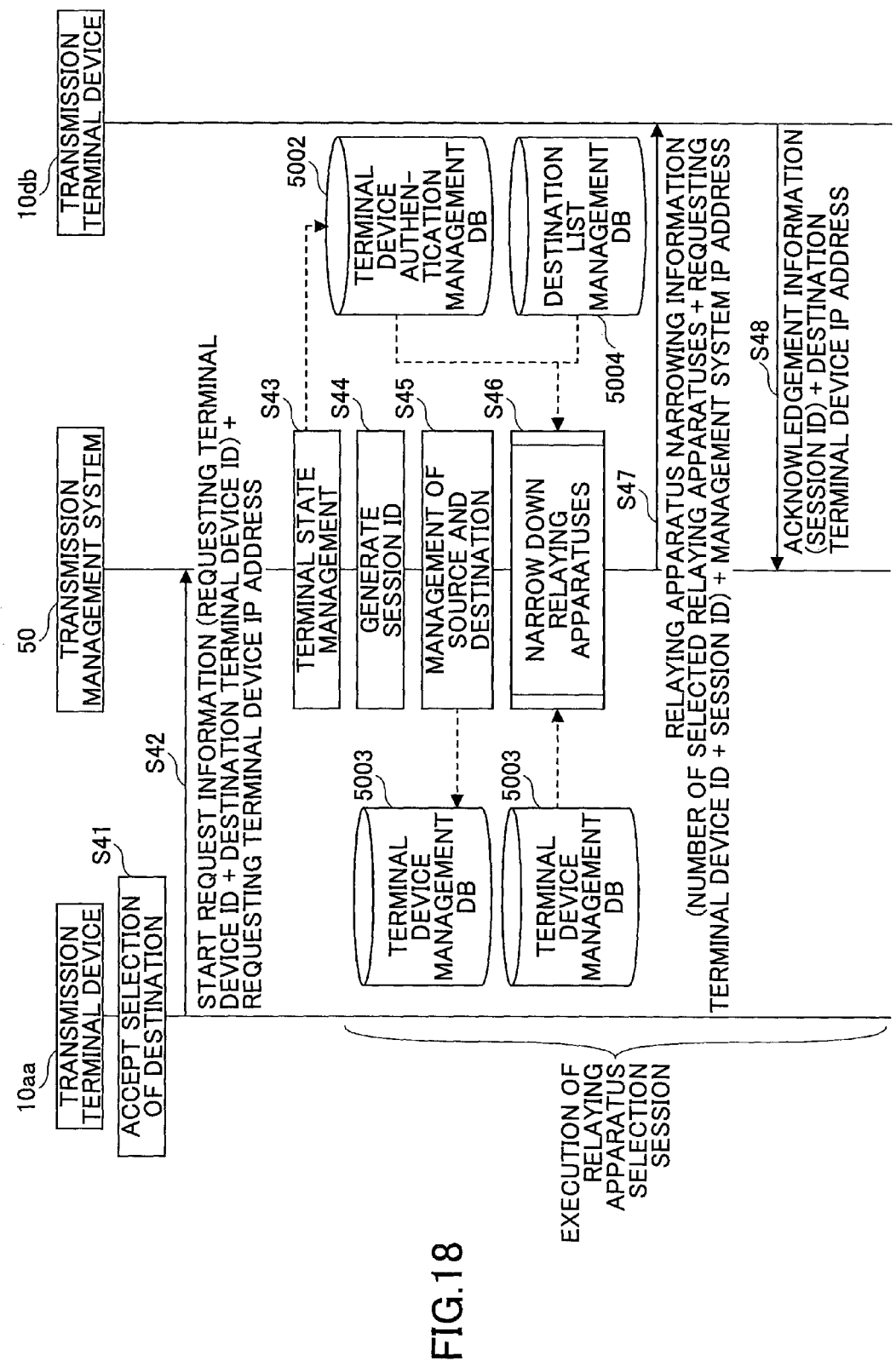
FIG. 18 is a sequence diagram showing a process of narrowing down the relay apparatuses.
Figure 19:
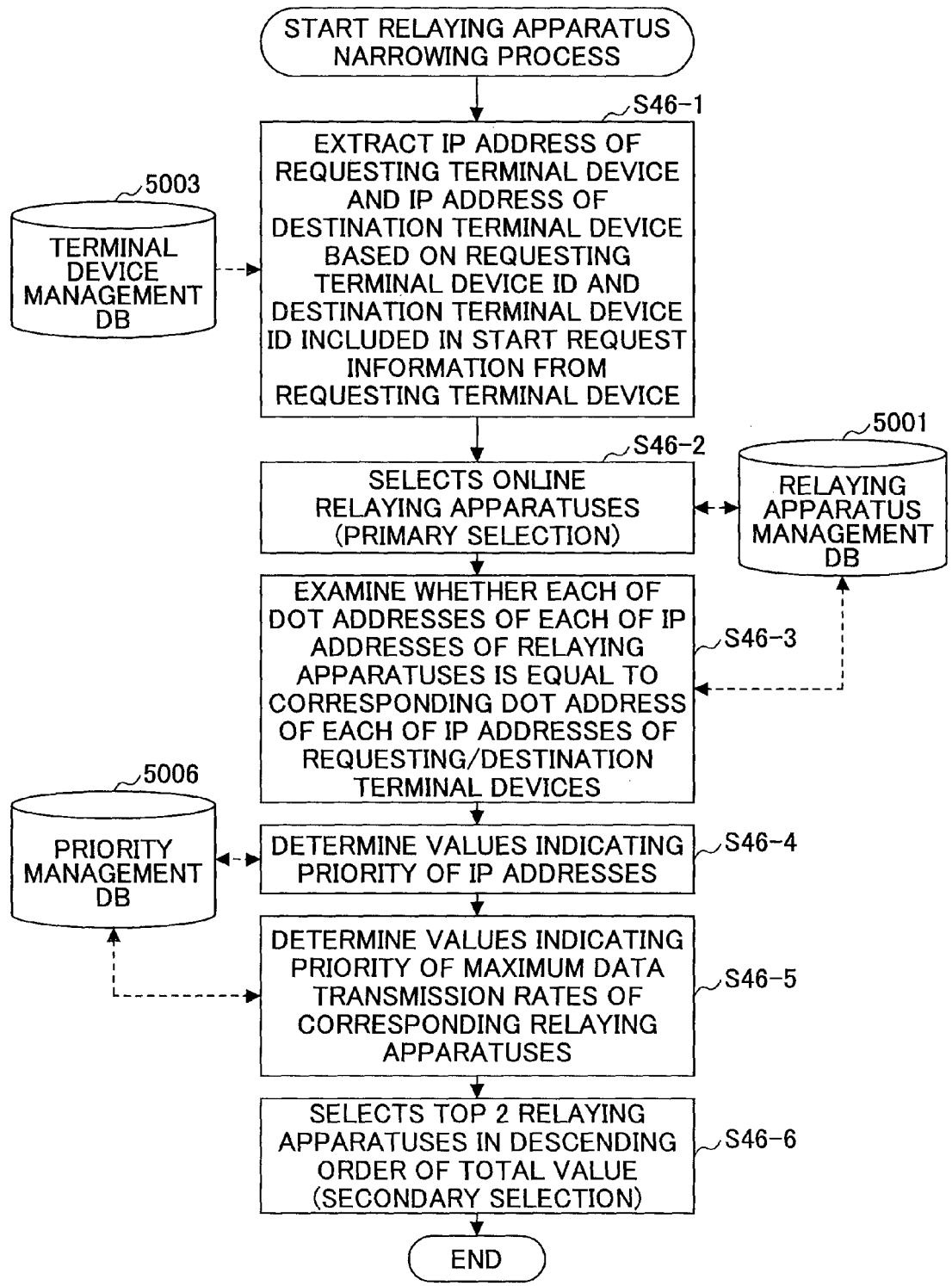
FIG. 19 is a flowchart showing the process of narrowing down the relay apparatuses.
Figure 21:
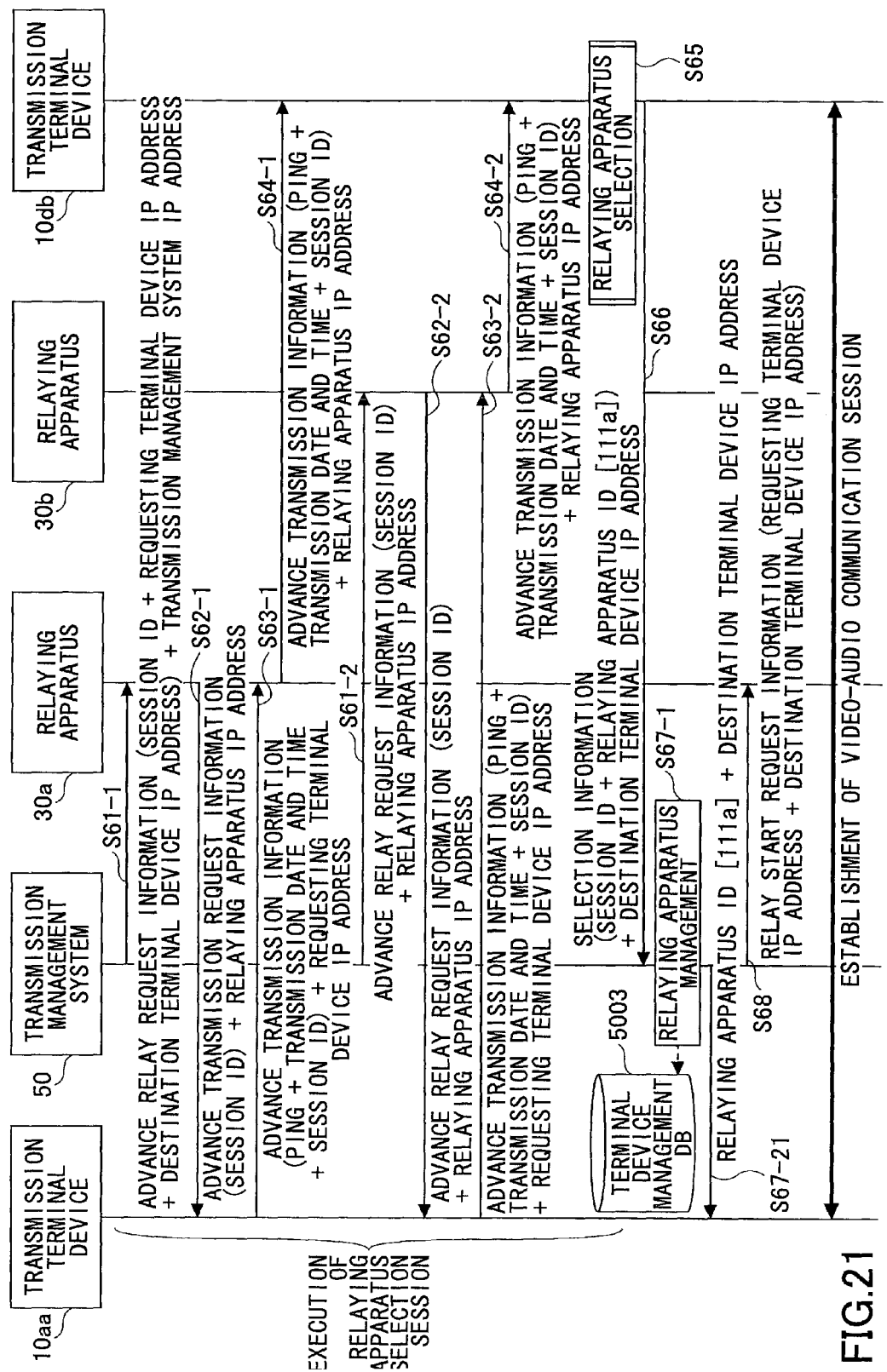
FIG. 21 is a sequence diagram showing a process by the transmission terminal device to select the relaying apparatus.
Figure 22:
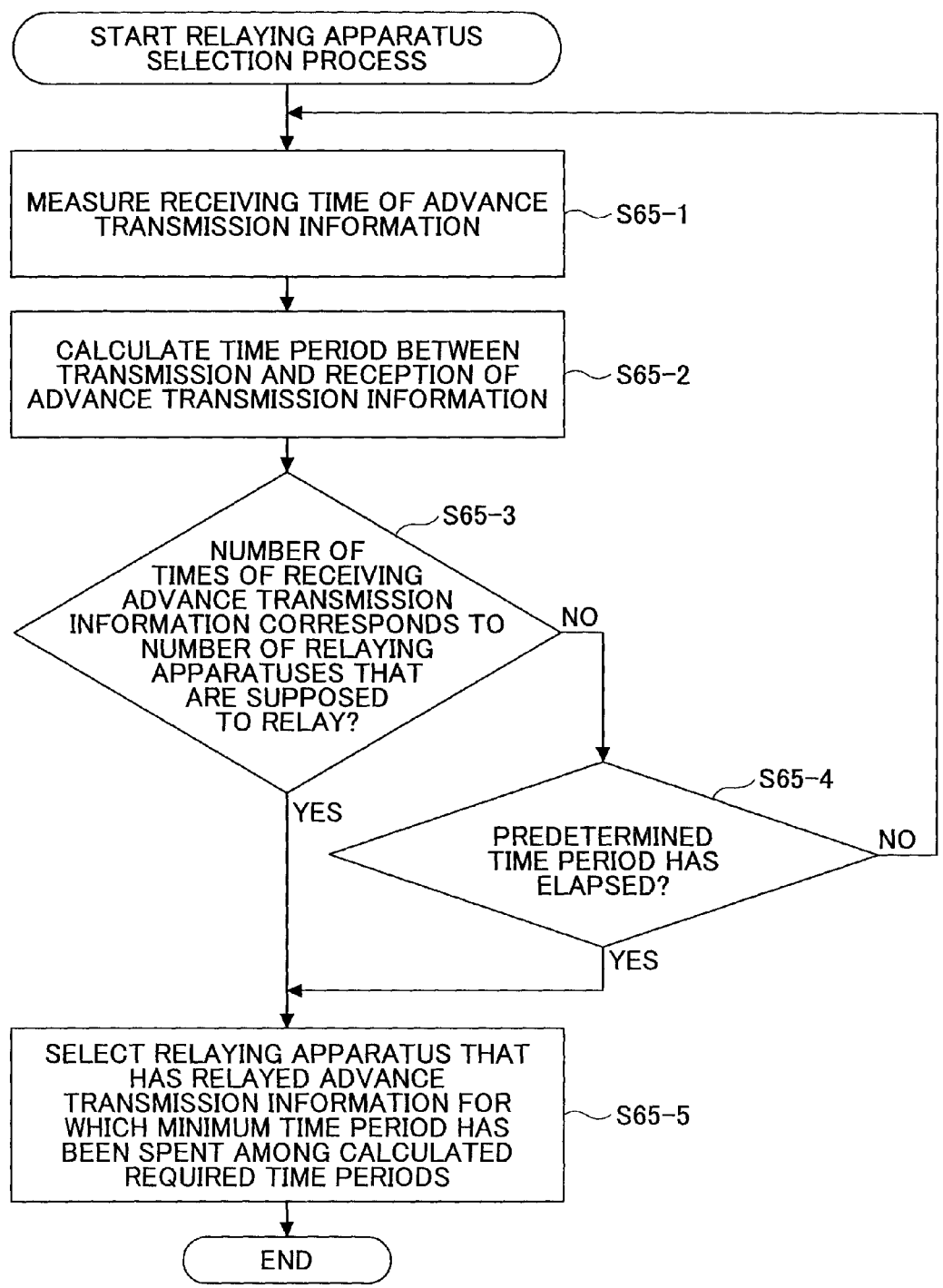
FIG. 22 is a flowchart showing a process of selecting the relaying apparatus in the transmission terminal device.
Figure 23:
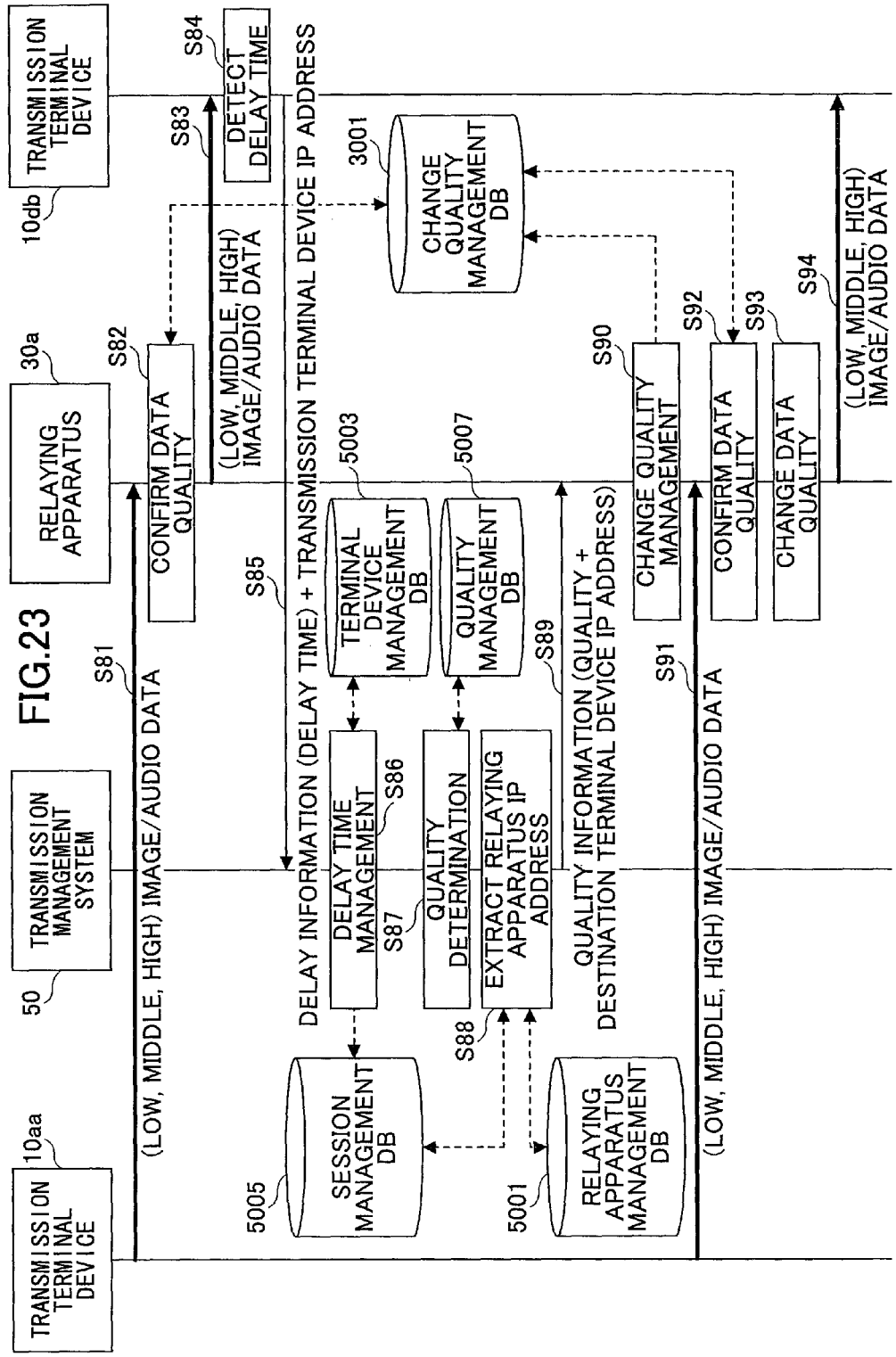
FIG. 23 is a sequence diagram showing a process of transmitting and receiving image data and audio data.
Figure 25:
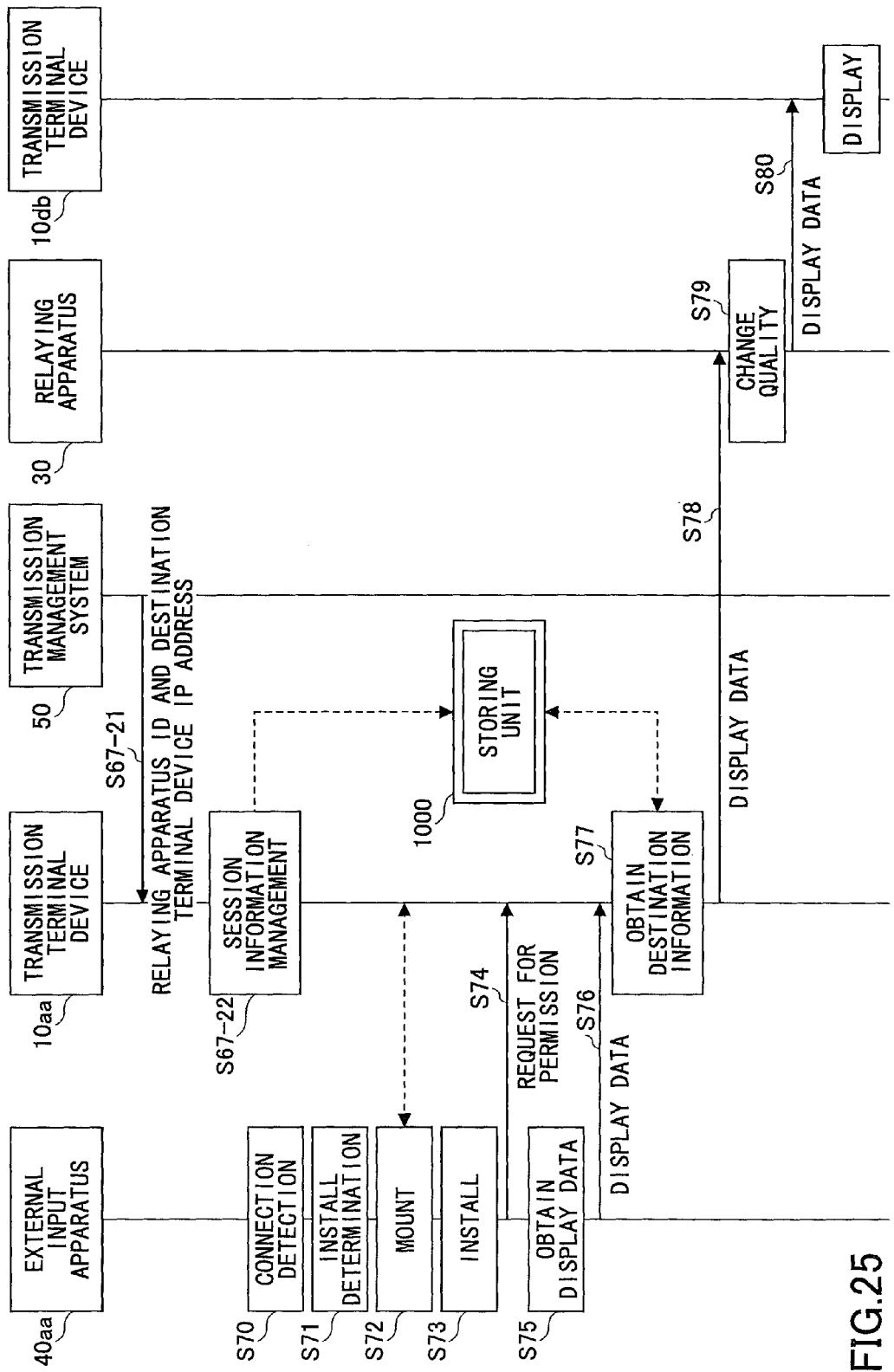
FIG. 25 is a sequence diagram showing a process of causing the transmission terminal device being a counterparty of a videoconference to indicate display data that has been displayed by the external input apparatus.
Figure 26:
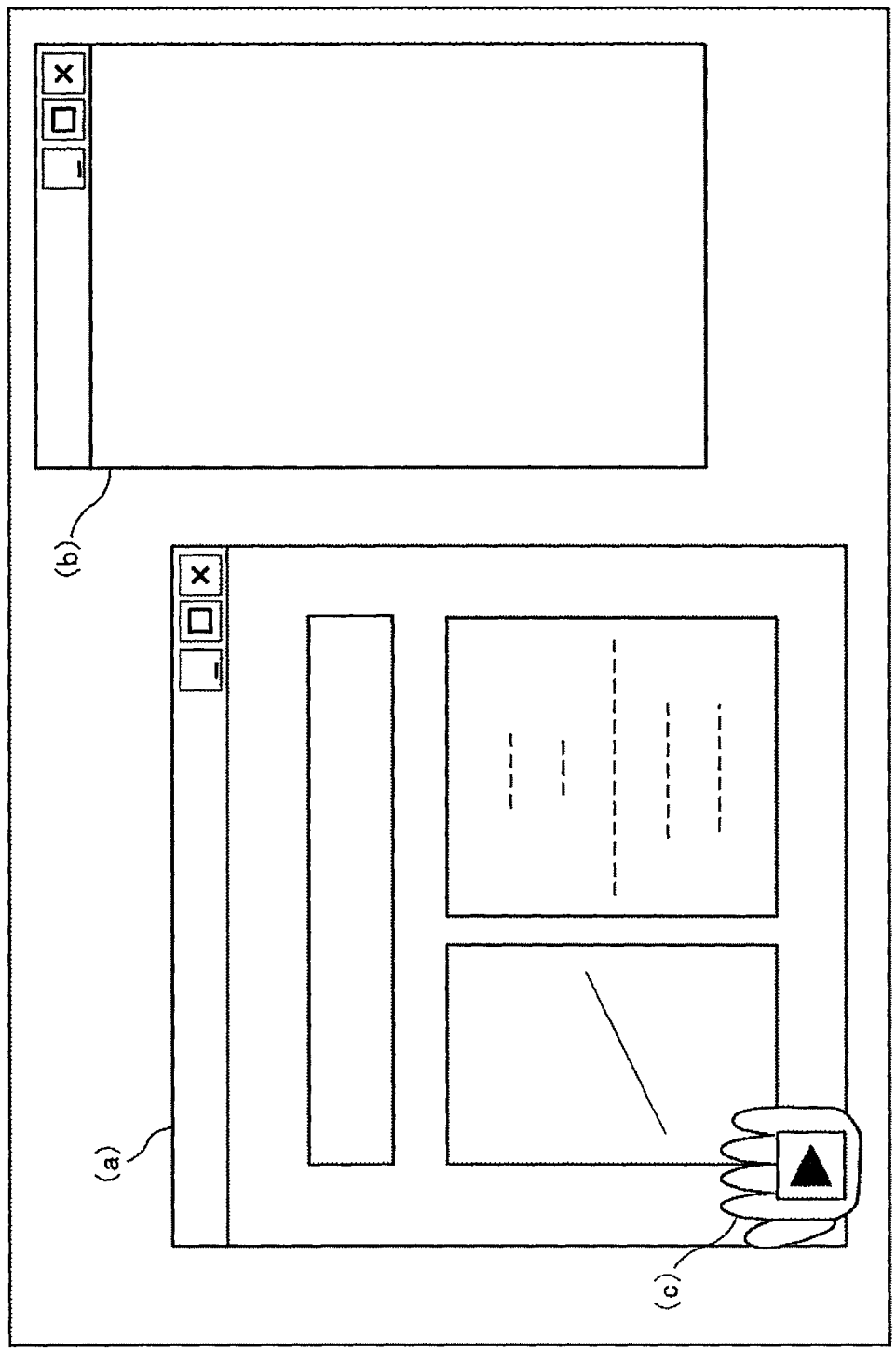
FIG. 26 is an example of a screen which is caused to be displayed on the transmission terminal device by the external input apparatus.
Figure 27:
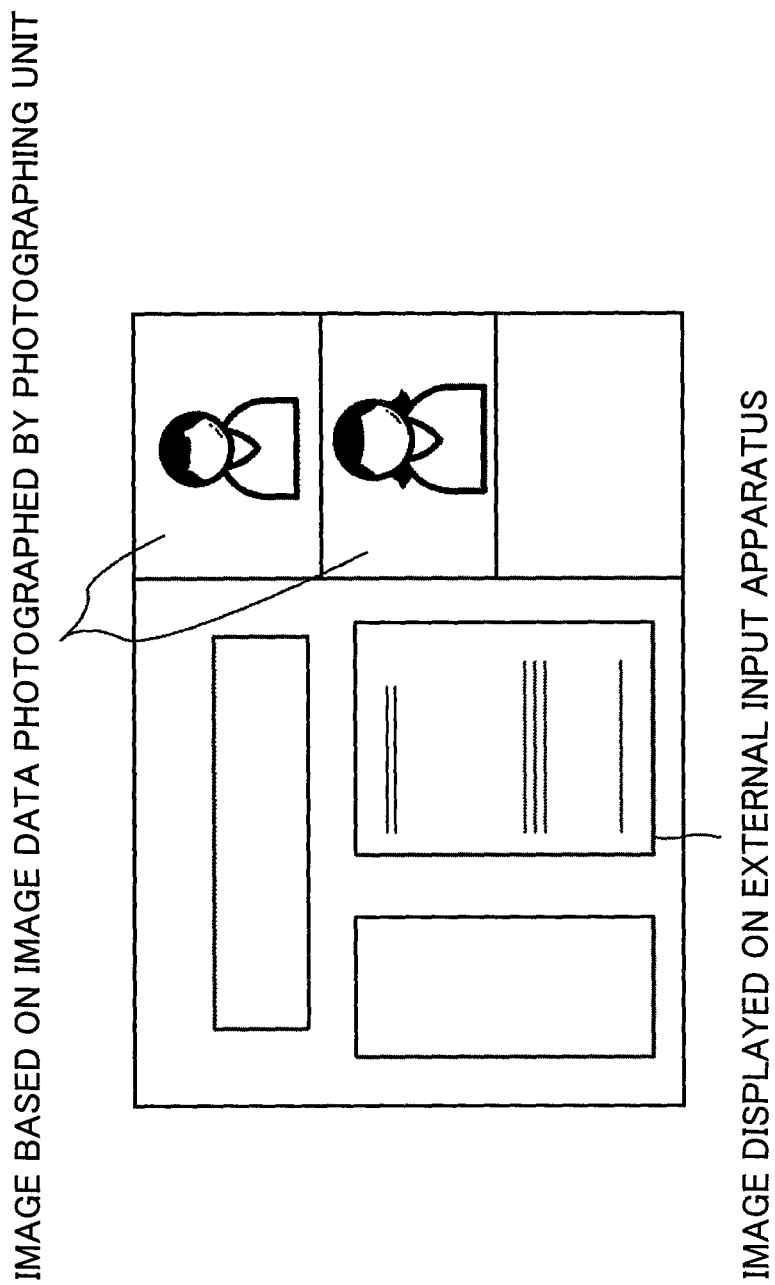
FIG. 27 shows an example of a screen on which image data and the display data are displayed by the transmission terminal device.
Figure 28:
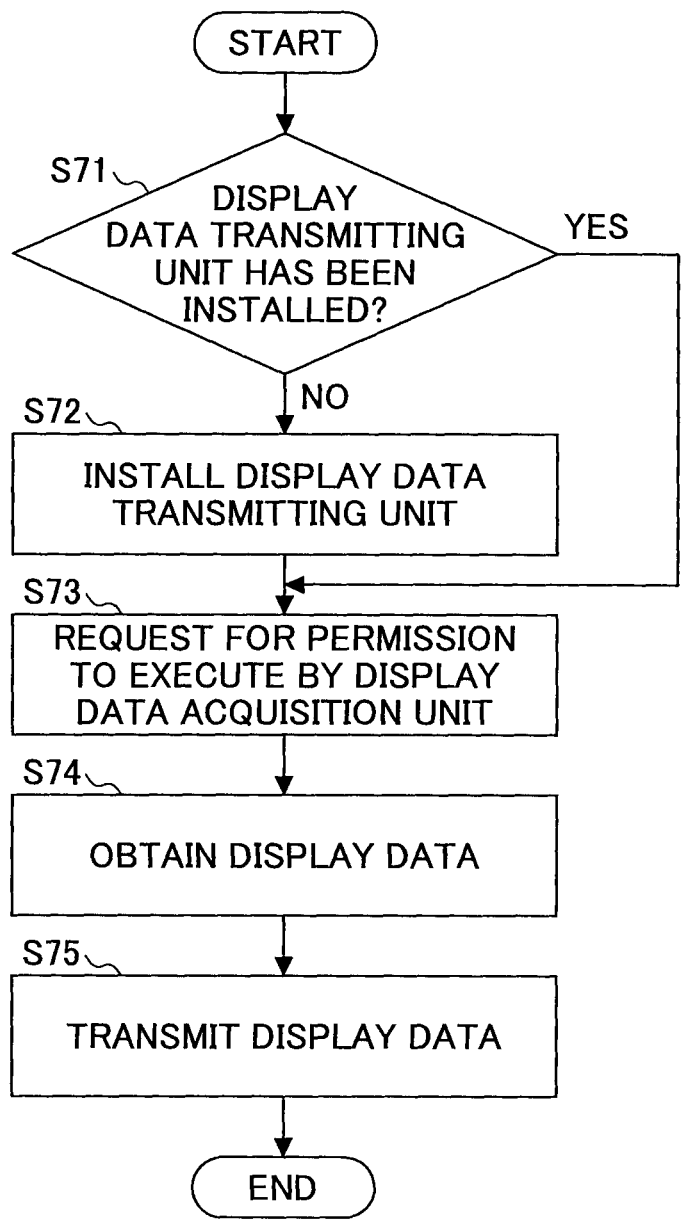
FIG. 28 is a flowchart showing a process of installing a display data acquisition unit by the external input apparatus.

The configuration and functions (or steps) of the transmission system 1 according to the embodiment have been described above. Hereinafter, there will be explained a processing method in the system 1 according to the embodiment by referring to FIGS. 16-23 and FIGS. 25-28. FIG. 16 is a sequence diagram showing a process of managing state information indicating states of the corresponding relaying apparatuses 30. The state information has been transmitted from the corresponding relaying apparatuses 30 to the transmission management system 1. FIG. 17 is a sequence diagram showing processes in a preparatory phase of starting communications among plural transmission terminal devices 10. FIG. 18 is a sequence diagram showing a process of narrowing down the relaying apparatuses 30. FIG. 19 is a flowchart showing the process of narrowing down the relaying apparatuses 30. FIG. 20 is a diagram showing a state of calculating the values for narrowing down the relaying apparatuses 30. FIG. 21 is a sequence diagram showing a process by the transmission terminal device 10 of selecting the relaying apparatus 30. FIG. 22 is a process flow diagram showing the process by the transmission terminal device 10 of selecting the relaying apparatus 30. FIG. 23 is a sequence diagram showing processes of sending and receiving image data and audio data among transmission terminal device 10. FIG. 25 is a sequence diagram showing a process of causing the transmission terminal device 10 being a counterparty of a videoconference to indicate display data that has been displayed by the external input apparatus 40. FIG. 26 is an example of a screen which is caused to be displayed on the transmission terminal device 10 by the external input apparatus 40. FIG. 27 shows an example of a screen on which image data and the display data are indicated by the transmission terminal device 10. FIG. 28 is a flowchart showing a process of installing the display data acquisition unit 451 by the external input apparatus 40.

First, there will be explained the process of managing the state information indicating the states of the corresponding relaying apparatuses 30 that have been transmitted from the corresponding relaying apparatuses 30 to the transmission management system 50 by referring to FIG. 16. In each of the relaying apparatuses 30, the state detection unit 32 shown in FIG. 5B regularly detects an operating state of the relaying apparatus 30 itself (S1-1-S1-4). In order for the transmission management system 50 to manage the operating states of the corresponding relaying apparatuses 30 in real time, the transmitting and receiving unit 31 of each of the relaying apparatuses 30 regularly transmits the state information to the transmission management system 50 through the communication network 2 (steps S2-1-S2-4). The state information includes the relaying apparatus IDs of the corresponding relaying apparatuses 30 and the operating states detected by the state detection units 32 of the corresponding relaying apparatuses 30. In the embodiment, it is assumed that the relaying apparatuses 30a, 30b, and 30d are operating normally and the operating states of the relaying apparatuses 30a, 30b, and 30d are the online states. On the other hand, it is assumed that relaying apparatus 30c is operating but some sort of failure has occurred in the program for executing relaying operation of the relaying apparatus 30c, and the operating state of the relaying apparatus 30c is the offline state.

Subsequently, in the transmission management system 50, the transmitting and receiving unit 51 receives the state information transmitted from the corresponding relaying apparatuses 30. Then, the transmission management system 50 stores and manages the state information for each of the relaying apparatus IDs in the relaying apparatus management table (cf. FIG. 8) included in the storing unit 5000 through the storing and reading unit 59 (steps S3-1-S3-4). In this manner, the operating state indicating one of the online state, the offline state, and the failure state is stored and managed for each of the relaying apparatus IDs in the relaying apparatus management table shown in FIG. 8. At this time, the date and time of receiving the state information by the transmission management system 50 is also stored and managed for each of the relaying apparatus IDs. When the state information is not transmitted from one of the relaying apparatus 30, the field for the operating state and the field for the date and time of receiving the state information in the corresponding record of the relaying apparatus management table shown in FIG. 8 become blank, or the field for the operating state and the field for the date and time of receiving the state information indicate the operating state for the last time and the data and time of receiving the state information for the last time, respectively.

Next, there will be explained the process in the preparatory step prior to starting the communications between the transmission terminal device 10aa and the transmission terminal device 10db by referring to FIG. 17. When an operator turns on the power switch 109 shown in FIG. 3, the operation input receiving unit 12 shown in FIG. 5B receives the input for turning on the power supply, and thereby the operating input receiving unit 12 turns on the power supply (step S21). Triggered by receiving the input for turning on the power supply, the log-in requesting unit 13 automatically transmits log-in request information indicating a request for logging in from the transmitting and receiving unit 11 to the transmission management system 50 through the communication network 2 (step S22). The log-in request information includes the terminal device ID for identifying the transmission terminal device 10aa itself as a source of the request and the password. The terminal device ID and the password are data that has been read out from the storing unit 1000 by the storing and reading unit 10 and that has been transmitted to the transmitting and receiving unit 11. Here, when the log-in request information is transmitted from the transmission terminal device 10aa to the transmission management system 50, the transmission management system 50 which receives the log-in request information can recognize the IP address of the transmission terminal device 10ab which has transmitted the log-in request information.

Subsequently, the terminal device authentication unit 52 of the transmission management system 50 searches the terminal device authentication table (cf. FIG. 9) for the terminal device ID and the password by using the terminal device ID and the password included in the log-in request information received through the transmitting and receiving unit 51 as a search key. The terminal device authentication unit 52 performs the terminal authentication by determining whether the terminal device ID and the password that are the same as the terminal device ID and the password included in the log-in request information are managed by the terminal device authentication management DB 5002 (step S23). When the terminal device authentication unit 52 determines that the terminal device ID and the password that are the same as the terminal device ID and the password included in the log-in request information are managed by the terminal device authentication management DB 5002, and thereby the terminal device authentication unit 52 determines that the log-in request is from the transmission terminal device 10 having a valid usage right, the state management unit 53 associates the terminal device ID of the transmission terminal device 10aa with the operating state, the data and time of receiving the log-in request information, and the IP address of the transmission terminal device 10*aa*, and stores the terminal device ID of the transmission terminal device 10*aa*, the operating state, the data and time of receiving the log-in request information, and the IP address of the transmission terminal device 10*aa* into the terminal device management table (cf. FIG. 10) (step S24). In this manner, in the terminal management table shown in FIG. 10, the terminal device ID of "01aa" is associated with the operating state of "the online state," the receiving date and time of "2009. 11. 10. 13:40," and the terminal device IP address of "1. 2. 1. 3," and thereby the terminal management table manages the terminal ID, the operating state, the receiving date and time, and the terminal device IP address.

The transmitting and receiving unit 51 of the transmission management system 50 transmits authentication result information indicating the result of the authentication that has been obtained by the terminal device authentication unit 52 to the requesting terminal device 10*aa* that has requested to log in through the communication network 2 (step S25). In the explanation of the embodiment, the explanation of the case will be continued below where the terminal device authentication unit 52 has determined that the transmission terminal device 10*aa* has been determined to be a terminal device having the valid usage right.

The terminal extracting unit 54 of the transmission management system 50 searches the destination list management table (cf. FIG. 11) for the terminal device IDs of the candidates of the destination terminal device 10B by using the terminal ID "01aa" of the requesting terminal device 10*aa* that has requested to log in as a search key. The terminal extracting unit 54 extracts the terminal device IDs of the candidates of the destination terminal device 10B that can communicate with the requesting terminal device 10*aa* by reading out the terminal IDs of the candidates (step S26). Here, there will be extracted the terminal device IDs "01ab," "01ba," and "01db" of the destination terminal devices 10*ab*, 10*ba*, and 10*db* corresponding to the terminal device ID "01aa" of the requesting terminal device 10*aa*.

Subsequently, the terminal state acquisition unit 55 searches the terminal device management table (cf. FIG. 10) for the operating states of the transmission terminal devices 10*ab*, 10*ba*, and 10*db* by using the terminal device IDs "01ab," "01ba," and "01db" of the candidates of the destination terminal device 10B as search keys. The terminal state acquisition unit 55 obtains the operating states of the transmission terminal devices 10*ab*, 10*ba*, and 10*db* by reading out the operating state ("the offline state," "the online state," or "the failure state") for each of the terminal device IDs that have been extracted by the terminal extracting unit 54 (step S27).

Subsequently, the transmitting and receiving unit 51 transmits destination state information including the terminal device IDs ("01ab," "01ba," and "01db") that have been used as the search keys at step S27 and the operating states ("offline state," "online state," or "failure state") of the corresponding destination terminal devices (10*ab*, 10*ba*, and 10*db*) to the requesting terminal device 10*aa* through the communication network 2 (step S28). In this manner, the requesting terminal device 10*aa* can recognize the current operating states ("offline state," "online state," or "failure state") of the corresponding transmission terminal devices 10*ab*, 10*ba*, and 10*db* that are the candidates for the destination terminal device 10B that can communicate with the requesting terminal device 10*aa*.

Further, the terminal extracting unit 54 of the transmission management system 50 searches the destination list management table (cf. FIG. 11) for the terminal device IDs of other requesting terminal devices 10A by using the terminal device ID "01aa" of the requesting terminal device 10*aa* that has requested to log in as a search key. The terminal extracting unit 54 extracts the terminal device IDs of the other requesting terminal devices 10A that have registered the terminal device ID "01aa" of the requesting terminal device 10*aa* as a candidate of the destination terminal device 10B (step S29). In the destination list management table shown in FIG. 11, the terminal IDs of the other requesting terminal devices 10A that will be extracted are "01ab," "01ba," and "01db."

Subsequently, the terminal state acquisition unit 55 of the transmission management system 50 searches the terminal device management table (cf. FIG. 10) for the operating state of the requesting terminal device 10*aa* by using the terminal device ID "01aa" of the requesting terminal device 10*aa* that has requested to log in as a search key, and thereby the terminal state acquisition unit 55 obtains the operating state of the requesting terminal device 10*aa* that has requested to log in (step S30).

Then, the transmitting and receiving unit 51 transmits destination state information including the terminal device ID "01aa" of the requesting terminal device 10*aa* and the operating state of "the online state" that have been obtained at step S30 to the transmission terminal devices 10*ba* and 10*db* whose operating states in the terminal device management table (cf. FIG. 10) are "the online states," among the transmission terminal devices 10*ab*, 10*ba*, and 10*db* whose terminal device IDs "01ab," "01ba," and "01db" have been extracted at step S29 (steps S31-1 and S31-2). Further, when the transmitting and receiving unit 51 transmits the destination state information to the transmission terminal devices 10*ba* and 10*db*, the transmitting and receiving unit 51 refers to the IP addresses of the transmission terminal devices 10*ba* and 10*db* managed in the terminal device management table shown in FIG. 10 based on the terminal device IDs of "01ba" and "01db." In this manner, the terminal device ID "01aa" and the operating state of "the online state" of the requesting terminal device 10*aa* that has requested to log in can be transmitted to the other destination terminal devices 10*db* and 10*ba* that can communicate with the requesting terminal device 10*aa* that has requested to log in as the destination.

Similarly, when an operator turns on the power switch 109 shown in FIG. 4 of another transmission terminal device 10, similar to step S21 described above, the operation input receiving unit 12 shown in FIG. 5B receives the input for turning on the power supply, and the processes similar to those of steps of S22-S31-1, and S31-2 are performed. Therefore, the explanation for this case is omitted.

Next, the process of narrowing down the relaying apparatuses 30 will be explained by referring to FIG. 18. In the embodiment, based on the destination state information that has been received at step S28, the requesting terminal device 10*aa* can communicate with at least one of the transmission devices 10*ba* and 10*db* whose operating states are the online states, among the transmission terminal devices 10 as the candidates of the destination. Therefore, hereinafter, a case will be explained where the operator of the requesting terminal device 10*aa* has selected to start performing communications with the destination terminal device 10*db*.

When the operator presses the operation button 108 shown in FIG. 3 and selects the transmission terminal device 10*db*, the operation input receiving unit 12 shown in FIG. 5B receives a request for starting communication with the transmission terminal device 10*db* (step S41). Then, the transmitting and receiving unit 11 of the transmission terminal device 10*aa* transmits start request information that includes the terminal device ID "01aa" of the requesting terminal device 10*aa* and the terminal device ID "01*db*" of the destination terminal device 10*db* and that indicates the desire to start the communication to the transmission management system 50 (step S42). In this manner, the transmitting and receiving unit 51 of the transmission management system 50 receives the start request information. At the same time, the transmitting and receiving unit 51 recognizes the IP address "1. 2. 1. 3" of the requesting terminal device 10*aa*, that is the source of the transmission. In the terminal device management table (cf. FIG. 10), the state management unit 53 changes the operating state field of the record that includes the terminal device ID of "01*aa*" and the operating state field of the record that includes the terminal device ID of "01*db*" to be "call in progress," based on the terminal device ID "01*aa*" of the requesting terminal device 10*aa* and the terminal device ID "01*db*" of the destination terminal device 10*db* included in the start request information (step S43). In this state, the requesting terminal device 10*aa* and the destination terminal device 10*db* have not started the communication (call). In a state where the requesting terminal device 10*aa* and the destination terminal device 10*db* have started the communication, when another transmission terminal device 10 tries to establish communication with the requesting terminal device 10*aa* or the destination terminal device 10*db*, sound or display indicating that the line is busy is output to the other transmission terminal device 10.

Next, there will be explained processes for executing the session for selecting the relaying apparatus 30 that are steps S44-S48 and steps S61-66. First, the selection session ID generating unit 56*a* generates the selection session ID that is used for executing the session for selecting the relaying apparatus 30 (step S44). Then, the session management unit 57 associates the selection session ID "se 1" with the terminal device ID "01*aa*" of the requesting terminal device 10*aa* and the terminal device ID "01*db*" of the destination terminal device 10*db*. The session management unit 57 stores the associated selection session ID "se 1," the terminal device ID "01*aa*," and the terminal device ID "01 db" in the session management table (cf. FIG. 12) included in the storing unit 5000, and thereby the session management unit 57 manages the selection session ID, the terminal device ID of the requesting terminal device 10*aa*, and the terminal device ID of the destination terminal device 10*db*.

Subsequently, the narrowing unit 56 of the transmission management system 50 performs the primary narrowing process for narrowing down the relaying apparatuses 30 that relay the communication between the requesting terminal device 10*aa* and the destination terminal device 10*db*, based on the relaying apparatus management DB 5001, the terminal device management DB 5003 and the priority management DB 5006 (step S46).

Hereinafter, the process at step S46 will be explained in detail by referring to FIG. 19. The terminal IP address extracting unit 56*b* searches the terminal device management table (cf. FIG. 10) for the IP addresses of the transmitting terminal device 10*aa* and the destination terminal device 10*db*, based on the terminal device ID "01*aa*" of the requesting terminal device 10*aa* and the terminal device ID "01*db*" of the destination terminal device 10*db* included in the start request information that has been transmitted from the requesting terminal device 10*aa*. In this manner, the terminal IP address extracting unit 56*b* extracts the IP address "1. 2. 1. 3" of the transmission terminal device 10*aa* and the IP address "1. 3. 2. 4" of the transmission terminal device 10*db* (step S46-1). Next, the primary selecting unit 56*c* selects the relaying apparatus IDs 111*a*, 111*b*, and 111*d* of the corresponding relaying apparatuses 30*a*, 30*b*, and 30*d* whose operating states are the online states, among the relaying apparatuses 30 that are managed by the relaying apparatus management table (cf. FIG. 8). The primary selecting unit 56*c* examines, for each of the dot addresses included in the IP address "1. 2. 1. 2" of the relaying apparatus 30*a* that has been selected at step S46-2, whether the dot address is the same as the corresponding dot address of the IP address "1. 2. 1. 3" of the requesting terminal device 10*aa* and whether the dot address is the same as the corresponding dot address of the IP address "1. 3. 2. 4" of the destination terminal device 10*db*, by searching the relaying apparatus management table (cf. FIG. 8) for the IP addresses of the relaying apparatus 30*a*, based on the IP address"1. 2. 1. 3" of the requesting terminal device 10*aa* and the IP address "1. 3. 2. 4" of the destination terminal device 10*db* that have been extracted at step S46-1 (step S46-3). Similarly, the primary selecting unit 56*c* examines, for each of the dot addresses included in the IP address "1. 2. 2. 2" of the relaying apparatus 30*b* that has been selected at step S46-2, whether the dot address is the same as the corresponding dot address of the IP address "1. 2. 1. 3" of the requesting terminal device 10*aa* and whether the dot address is the same as the corresponding dot address of the IP address "1. 3. 2. 4" of the destination terminal device 10*db*, by searching the relaying apparatus management table (cf. FIG. 8) for the IP addresses of the relaying apparatus 30*b*, based on the IP address"1. 2. 1. 3" of the requesting terminal device 10*aa* and the IP address "1. 3. 2. 4" of the destination terminal device 10*db* that have been extracted at step S46-1 (step S46-3). Similarly, the primary selecting unit 56*c* examines, for each of the dot addresses included in the IP address "1. 3. 2. 2" of the relaying apparatus 30*d* that has been selected at step S46-2, whether the dot address is the same as the corresponding dot address of the IP address "1. 2. 1. 3" of the requesting terminal device 10*aa* and whether the dot address is the same as the corresponding dot address of the IP address "1. 3. 2. 4" of the destination terminal device 10*db*, by searching the relaying apparatus management table (cf. FIG. 8) for the IP addresses of the relaying apparatus 30*d*, based on the IP address"1. 2. 1. 3" of the requesting terminal device 10*aa* and the IP address "1. 3. 2. 4" of the destination terminal device 10*db* that have been extracted at step S46-1 (step S46-3).

Subsequently, the priority determination unit 56*d* determines, for each of the relaying apparatuses 30*a*, 30*b*, and 30*d* that have been examined at step S46-3, the value indicating the priority of the IP address by referring to the address priority management table (cf. FIG. 13). The table shown in FIG. 20 indicates the result of the determination process. Here, FIG. 20 is a diagram showing a state where the values indicating the priority have been calculated, where the values indicating the priority are used for performing the process of narrowing down the relaying apparatuses 30. In FIG. 20, the values indicating the priority of the IP addresses, the values indicating the priority of the data transmission rates, and the combined values are indicated for each of the relaying apparatus IDs. Further, as the values indicating the priority of the IP addresses, there are indicated the values indicating the priority of the IP addresses of the corresponding relaying apparatuses 30 with respect to the requesting terminal device 10*aa* and the values indicating the priority of the IP addresses of the corresponding relaying apparatuses 30 with respect to the destination terminal device 10*db*. The combined value is a total value of the value indicating the priority of the data transmission rate and the greater value between the value indicating the priority of the IP address with respect to the requesting terminal device 10*aa* and the value indicating the priority of the IP address with respect to the destination terminal device.

In the embodiment, the dot addresses of the IP address "1. 2. 1. 2" of the relaying apparatus 30a are "same. same. same. different" with respect to the dot addresses of the IP address "1. 2. 1. 3" of the requesting terminal device 10aa. Therefore, as shown in FIG. 20, the value indicating the priority of the IP address of the relaying apparatus 30a with respect to the requesting terminal device 10aa is 5. Further, since the dot addresses of the IP address "1. 2. 1. 2" of the relaying apparatus 30a are "same. different. different. different" with respect to the dot addresses of the IP address "1. 3. 2. 4" of the destination terminal device 10db, the value indicating the priority of the IP address of the relaying apparatus 30a with respect to the destination terminal device 10db is 1. Further, since the dot addresses of the IP address "1. 2. 2. 2" of the relaying apparatus 30b are "same. same. different. different" with respect to dot addresses of the IP address "1. 2. 1. 3" the requesting terminal device 10aa, the value indicating the priority of the IP address of the relaying apparatus 30b with respect to the requesting terminal device 10aa is 3. Further, since the dot addresses of the IP address "1. 2. 2. 2" of the relaying apparatus 30b are "same. different. same. different" with respect to the dot addresses of the IP address "1. 3. 2. 4" of the destination terminal device 10db, the value indicating the priority of the IP address of the relaying apparatus 30b with respect to the destination terminal device 10db is 1. Further, since the dot addresses of the IP address "1. 3. 2. 2" of the relaying apparatus are "same. different. different. different" with respect to the dot addresses of the IP address "1. 2. 1. 3" of the requesting terminal device 10aa, the value indicating the priority of the IP address of the relaying apparatus 30d with respect to the requesting terminal device 10aa is 1. Further, since the dot addresses of the IP address "1. 3. 2. 2" of the relaying apparatus 30d are "same. same. same. different" with respect to the dot addresses of the IP address "1. 3. 2. 4" of the destination terminal device 10db, the value indicating the priority of the IP address of the relaying apparatus 30d with respect to the destination terminal device 10db is 5.

Referring to FIG. 19, the priority determination unit 56d searches the transmission rate priority management table (cf. FIG. 14) for the values indicating the priority of the data transmission rates based on the maximum data transmission rates of the corresponding relaying apparatuses 30 that have been managed in the relaying apparatus management table (cf. FIG. 8). In this manner, the priority determination unit 56d determines; for each of the relaying apparatuses 30a, 30b, and 30d that have been narrowed down by the primary narrowing process of step S46-2, the value indicating the priority of the data transmission rate (step S46-5). In the embodiment, as shown in FIG. 8, since the maximum data transmission rate of the relaying apparatus 30a is 100 Mbps, the value indicating the priority of the data transmission rate of the relaying apparatus 30a is determined to be 3, by referring to the transmission rate priority management table shown in FIG. 14. Similarly, since the maximum data transmission rate of the relaying apparatus 30b is 1000 Mbps (cf. FIG. 8), the value indicating the priority of the data transmission rate is 5 (cf. FIG. 14). Similarly, since the maximum data transmission rate of the relaying apparatus 30d is 10 Mbps (cf. FIG. 8), the value indicating the priority of the data transmission rate is 1 (cf. FIG. 14).

Subsequently, the primary selecting unit 56c calculates, for each of the relaying apparatuses 30a, 30b, and 30d, the combined value by adding the value indicating the priority of the data transmission rate and the greater value between the value indicating the priority of the IP address with respect to the transmission terminal device 10aa and the value indicating the priority of the IP address with respect to the transmission terminal device 10db. Then, the primary selecting unit 56c selects two relaying apparatuses 30 in the descending order of the combined values (step S46-6). In the embodiment, as shown in FIG. 20, the total values of the relaying apparatuses 111a, 111b, and 111d are 8, 8, and 6, respectively. Therefore, the relaying apparatus 30a corresponding to the relaying apparatus ID of "111a" and the relaying apparatus 30b corresponding to the relaying apparatus ID of "111b" are selected.

After completing the narrowing process of step S46, the transmitting and receiving unit 51 shown in FIG. 5A transmits relaying apparatus narrowing information to the destination terminal device 10db through the communication network 2, so as to report the number of the relaying apparatuses 30 that have been narrowed down (step S47). The relaying apparatus narrowing information includes the number of the relaying apparatuses 30 that have been narrowed down at step S46, i.e., "2," the terminal device ID "01aa" of the requesting terminal device 10aa, and the selection session ID of "se1." In this manner, when the session corresponding to the selection session ID of "se1" is executed, the transmission terminal device 10db can recognize the number of the relaying apparatuses 30 and the transmission terminal device 10 that has requested to start the video conference. At the same time, the transmission terminal device 10db can recognize the IP address "1. 1. 1. 2" of the transmission management system 50 that has transmitted the relaying apparatus narrowing information.

Then, the transmission terminal device 10db transmits acknowledgement information indicating that the reception of the relaying apparatus narrowing information has been completed from the transmitting and receiving unit 11 to the transmission management system 50 through the network 2 (step S48). The acknowledgement information includes the selection session ID of "se1." In this manner, the transmission management system 50 can recognize that the transmission of the number of the relaying apparatuses 30 has been completed in the session corresponding to the selection session ID of "se1." At the same time, the transmission management system 50 can recognize the IP address "1. 3. 2. 4" of the destination terminal device 10db that has transmitted the acknowledgement information.

Next, there will be explained the process by the requesting terminal device 10aa of selecting the relaying apparatus 30 by referring to FIG. 21. Prior to starting the video conference, the transmission management system 50 transmits advance relay request information that requests for relaying in advance to the relaying apparatuses 30a and 30b that have been narrowed down at step S46 (steps S61-1 and S61-2). The advance relay request information includes the session ID of "se1," the IP address "1. 2. 1. 3" of the requesting terminal device 10aa, and the IP address "1. 3. 2. 4" of the destination terminal 10db. In this manner, the relaying apparatus 30a and 30b can recognize that the session corresponds to the selection session ID of "se1," the IP address of the requesting terminal device 10A, and the IP address of the destination terminal device 10B. At the same time, the relaying apparatuses 30a and 30b can recognize the IP address "1. 1. 1. 2" of the transmission management system 50 that has transmitted the advance relay request information.

Next, the relaying apparatuses 30a and 30b transmit advance transmission request information from the corresponding transmitting and receiving units 31 to the requesting terminal device 10aa that has been recognized at step S61-1. The advance transmission request information is for causing the requesting terminal device 10aa to transmit advance transmission information including a packet internet groper (ping, described later) to the relaying apparatuses 30a and 30b, prior to starting the video conference (step S62-1 and step S62-2). The advance transmission information includes the selection session ID of "se1." In this manner, the requesting terminal device 10aa can recognize that, in the process of selecting the relaying apparatuses 30 that has been executed with the selection session ID of "se1," the requesting terminal device 10aa transmits the advance transmission information to the relaying apparatuses 30a and 30b. At the same time, the requesting terminal device 10aa can recognize the IP addresses "1. 2. 1. 2" and "1. 2. 2. 2" of the relaying apparatuses 30a and 30b, which have transmitted the advance transmission request information.

In the embodiment, the IP address of the destination terminal device 10db is not directly transmitted from the transmission management system 50 to the requesting terminal device 10aa. Alternatively, the IP address of the destination terminal device 10db is transmitted to the relaying apparatus 30a at step S61-1, and the relaying apparatus 30a causes the requesting terminal device 10aa to transmit the advance transmission information to the relaying apparatus 30a at step S62-1. In this manner, it is avoided that an IP address of one of the transmission terminal devices 10 is transmitted to another transmission terminal device 10, thereby ensuring security.

Subsequently, the requesting terminal device 10aa transmits the advance transmission information from the transmitting and receiving unit 11 to the relaying apparatuses 30a and 30b through the communication network 2 (steps S63-1 and S63-2). Prior to the transmission of the image data and the audio data, the advance transmission information is transmitted to the destination terminal device 10db through the relaying apparatus 30a, and the advance transmission information is also transmitted to the destination terminal device 10db through the relaying apparatus 30b, instead of the image data and the audio data. The advance transmission information is used for measuring a required time period for transmitting data from the requesting terminal device 10aa to the destination terminal device 10db. Further, the advance transmission information includes the ping for detecting that the requesting terminal device 10aa, the relaying apparatuses 30a and 30b, and the destination terminal device 10db are communicatively connected; date and time of transmitting the advance transmission information from the requesting terminal device 10aa; and the selection session ID of "se1." In this manner, the relaying apparatuses 30a and 30b can recognize that the advance transmission information has been received during execution of the session corresponding to the selection session ID of "se1." At the same time, the relaying apparatuses 30a and 30b can recognize the IP address "1. 2. 1. 3" of the requesting terminal device 10aa that has transmitted the advance transmission information.

Subsequently, the relaying apparatuses 30a and 30b relay the advance transmission information to the IP address "1. 3. 2. 4" of the destination terminal device 10db included in the advance relay request information that has been received at steps S61-1 and S61-2 (steps S64-1 and S64-2). In this manner, the destination terminal device 10db can recognize that the advance transmission information has been received during execution of the session corresponding to the selection session ID of "se1." At the same time, the destination terminal device 10db can recognize the IP addresses "1. 2. 1. 2" and "1. 2. 2. 2" of the corresponding relaying apparatuses 30a and 30b that have transmitted (relayed) the advance transmission information.

Next, the selection processing unit 16 of the destination terminal device 10db selects one of the relaying apparatuses 30a and 30b that finally relays the image data and audio data during the video conference, based on the advance transmission information (step S65).

Here, the process at step S65 will be explained in detail by referring to FIGS. 5 and 22. The measuring unit 16a of the selection processing unit 16 shown in FIG. 5B measures date and time of receiving the piece of advance transmission information that has been relayed by the relaying apparatus 30a by the transmitting and receiving unit 11 of the transmission terminal device 10db, and the measuring unit 16a also measures data and time of receiving the piece of advance transmission information that has been relayed by the relaying apparatus 30b by the transmitting and receiving unit 11 of the transmission terminal device 10db (step S65-1). Subsequently, the calculation unit 16b calculates, for each of the piece of advance transmission information that has been relayed by the relaying apparatus 30a and for which the date and time of the reception has been calculated and the piece of advance transmission information that has been relayed by the relaying apparatus 30b and for which the date and time of the reception has been calculated, the required time period between the transmission and the reception of the corresponding piece of advance transmission information based on the difference between the date and time of receiving the corresponding piece of advance transmission information and the date and time of transmitting the corresponding piece of advance transmission information which is included in the corresponding piece of advance transmission information (step S65-2). Next, during execution of the session corresponding to the selection session ID of "se1," the selection unit 16c determines whether all "2" pieces of the advance transmission information, which correspond to the number of the relaying apparatuses 30 that are supposed to relay the corresponding pieces of advance transmission information, have been received (step S65-3). When it is determined that not all pieces of the advance transmission information have been received (NO), the selection unit 16c determines whether a predetermined time period (e.g., 1 minute) has elapsed from the reception of the piece of advance transmission information at the transmission terminal device 10db (step S65-4). When the predetermined time period has not elapsed (NO), the process returns to step S65-1. On the other hand, when it is determined, at step S65-3, that all pieces of the advance transmission information have been received (YES), or when the predetermined time period has elapsed (YES) at step S65-4, the selection unit 16c selects one of the relaying apparatuses 30a and 30b which has relayed the piece of the advance transmission information for which the minimum time period has elapsed between the required time periods that have been calculated by the calculation unit 16b. In the embodiment, for example, the required time period between the transmission and the reception of the piece of advance transmission information that has been relayed by the relaying apparatus 30a is smaller than the required time period between the transmission and the reception of the piece of advance transmission information that has been relayed by the relaying apparatus 30b, and thereby the relaying apparatus 30a has been selected.

In the embodiment, the case has been explained where the destination terminal device 10db selects the relaying apparatus 30a. However, the embodiment is not limited to this. For example, the destination terminal device 10db may transmit information regarding required time indicating the required time periods between the transmission and the reception of the corresponding pieces of advance transmission information to the requesting terminal device 10aa or to the transmission management system 50, and thereby the requesting terminal device 10aa or the transmission management system 50 may eventually select the relaying apparatus 30a.

Next, the destination terminal device 10db transmits selection information indicating that the relaying apparatus 30a has been selected from the transmitting and receiving unit 11 to the transmission management system 50 through the communication network 2 (step S66). The selection information includes the session ID of "se1" and the relaying apparatus ID "111a" of the selected relaying apparatus 30a. In this manner, the transmission management system 50 can recognize that the relaying apparatus 30a has been selected during execution of the session corresponding to the selection session ID of "se1." At the same time, the transmission management system 50 can recognize the IP address "1. 3. 2. 4" of the transmission terminal device 10db that has transmitted the selection information.

Next, the session management unit 57 of the transmission management system 50 stores the relaying apparatus ID "111a" of the selected relaying apparatus 30a in the relaying apparatus ID field of the record that includes the selection session ID of "se1" in the session management table (cf. FIG. 12) included in the session management DB 5005, and thereby the session management unit 57 manages the relaying apparatus ID "111a" of the relaying apparatus 30a (step S67-1). The transmitting and receiving unit 51 transmits the relaying apparatus ID of "111a" and the IP address "1. 3. 2. 4" of the destination terminal device 10db to the requesting terminal device 10aa (step S67-21). The transmitting and receiving unit 51 of the transmission management system 50 transmits relay start request information indicating a request for starting relaying to the relaying apparatus 30a through the communication network 2 (step S68). The relay start request information includes the IP address "1. 2. 1. 3" of the requesting terminal device 10aa and the IP address "1. 3. 2. 4" of the destination terminal device 10db. In this manner, the relaying device 30a establishes a session for communicating low resolution image data, middle resolution image data, and high resolution image data, and audio data between the transmission terminal devices 10aa and 10db (step S69). With this, the transmission terminal devices 10aa and 10db can start a video conference.

In accordance with the transmission of the relaying apparatus narrowing information from transmission management system 50 to the destination terminal device 10db at step S47, the process of selecting the relaying apparatus 30 (step S65) has been performed by the destination terminal device 10db through steps S48-S64-1, and S64-2. However, the embodiment is not limited to this. At step S47, the transmission management system 50 may transmit the relaying apparatus narrowing information to the requesting terminal device 10aa. Subsequently, until steps S64-1 and S64-2, a source and a receiver of each information piece can be exchanged between the requesting terminal device 10aa and the destination terminal device 10db. In this manner, alternatively to step S65, the requesting terminal device 10aa may perform the process of selecting the relaying apparatus 30. Further, alternatively to step S66, the requesting terminal device 10aa may transmit the selection information.

Next, by referring to FIGS. 5 and 23, there will be explained a process of transmitting and receiving image data and audio data between the requesting terminal device 10aa and the destination terminal device 10db, so as to perform a video conference. First, the requesting terminal device 10aa transmits image data of an object that has been photographed by the photographing unit 14a and audio data of sound that has been input to the audio input unit 15a from the transmitting and receiving unit 11 to the relaying apparatus 30a through the communication network 2 (step S81). In the embodiment, high quality image data (shown in FIG. 6) including the low resolution image data, the middle resolution image data, and the high resolution image data and the audio data are transmitted. The transmitting and receiving unit 31 of the relaying apparatus 30a receives the image data including the low resolution image data, the middle resolution image data, and the high resolution image data, and the audio data. Then, the data quality confirming unit 33 searches the change quality management table (cf. FIG. 7) for the image quality of the image data to be relayed by using the IP address "1. 3. 2. 4" of the destination terminal device 10db as a search key, and thereby the data quality confirming unit 33 extracts and confirms the image quality of the image data to be relayed (step S82). In the embodiment, the image quality of the image data included in the confirmed image data is the high image quality. Since the image quality of the image data included in the confirmed image data is the same as the image quality of the image data that has been received by the transmitting and the receiving unit 31, the image data and the audio data are transmitted to the destination terminal device 10db without the image quality of the image data and the audio quality of the audio data being changed (step S82). In this manner, the transmitting and receiving unit 11 of the destination terminal device 10db can receive the image data and the audio data, and the image display control unit 14b can display the image based on the image data on the display 120. At the same time, the audio output unit 15b can output the sound based on the audio data.

Subsequently, the delay detection unit 17 of the transmission terminal device 10db detects delay time of receiving the image data that is received by the transmitting and receiving unit 11 at every constant time interval (e.g., every 1 second) (step S84). In the embodiment, a case will be explained where the delay time is 200 ms.

The transmitting and receiving unit 11 of the destination terminal device 10db transmits the delay information indicating the delay time of "200 ms" to the transmission management system 50 through the communication network 2 (step S85). In this manner, the transmission management system 50 can recognize the delay time. At the same time, the transmission management system 50 can recognize the IP address "1. 3. 2. 4" of the transmission terminal device 10db.

Subsequently, the delay time management unit 60 of the transmission management system 50 searches the terminal device management table (cf. FIG. 10) for the terminal device ID by using the IP address "1. 3. 2. 4" of the destination terminal device 10db as a search key, and the delay time management unit 60 extracts the corresponding terminal device ID of "01db." Further, the delay time management unit 60 stores the delay time of "200 ms" indicated in the delay information in the delay time field of the record that corresponds to the terminal device ID of "01db" in the session management table (cf. FIG. 12) included in the session management DB 5005 (step S86).

Subsequently, the quality determination unit 58 searches the quality management table (cf. FIG. 15) for the image quality by using the delay time of "200 ms" as a search key, and thereby the quality determination unit 58 extracts the "middle image quality" that is the quality of the corresponding image data. In this manner, the quality determination unit 58 determines the image quality of the corresponding image data to be the "middle image quality" (step S87).

Subsequently, the transmitting and receiving unit 51 searches the relaying apparatus management table (cf. FIG. 8) for the IP address of the relaying apparatus 30a by using the relaying apparatus ID of "111a" that is associated with the terminal device ID of "01db" in the session management table (cf. FIG. 12), and thereby the transmitting and receiving unit 51 extracts the IP address "1. 2. 1. 2" of the corresponding relaying apparatus 30a (step S88). Then, the transmitting and receiving unit 51 transmits the quality information indicating the "middle image quality" which is the image quality of the image data that has been determined at step S87 to the relaying apparatus 30a through the communication network 2 (step S89). The quality information includes the IP address "1. 3. 2. 4" of the destination terminal device 10db that has been used as the search key in step S86. In this manner, the change quality management unit 34 of the relaying apparatus 30a associates the IP address "1. 3. 2. 4" of the transmission terminal device 10 being the destination (here, the destination terminal device 10db) with the "middle image quality" which is the image quality of the image data to be relayed. The change quality management unit 34 stores and manages the IP address "1. 3. 2. 4" of the transmission terminal device 10 and the image quality of the image data to be relayed in the change quality management table (cf. FIG. 7) (step S90).

Similar to step S81, the transmission terminal device 10aa continues to transmit the high quality image data including the low quality image data, the middle quality image data, and the high quality image data, and the audio data to the relaying apparatus 30a (step S91). Similar to step S82, the data quality confirming unit 33 of the relaying apparatus 30a searches the change quality management table (cf. FIG. 7) for the image quality of the image data to be relayed by using the IP address "1. 3. 2. 4" of the destination terminal device 10db as a search key, and thereby the data quality confirming unit 33 extracts the "middle image quality" which is the image quality of the corresponding image data to be relayed. In this manner, the data quality confirming unit 33 confirms the quality of the image data included in the image data to be relayed (step S92). In the embodiment, the image quality of the confirmed image data is the "middle image quality," which is lower than the image quality of the image data (high image quality) that has been received by the transmitting and receiving unit 31. Therefore, the data quality changing unit 35 reduces the image quality of the image data from the "high image quality" to the "middle image quality," thereby the data quality changing unit 35 changes the quality of the image data included in the image data (step S93). Subsequently, the transmitting and receiving unit 31 transmits the image data whose image quality has been changed to the "middle image quality" and the audio data whose audio quality has not been changed to the transmission terminal device 10db through the communication network 2 (step S94). In this manner, when the delay occurs in receiving the image data with the destination terminal device 10db, the relaying apparatus 30a changes the quality of the image data. Therefore, it is possible to avoid giving an uncomfortable feeling to participants of the video conference.

Next, there will be explained the process of sharing the whole screen indicating the document data stored in the storing unit 4000 of the external input apparatus 40 by referring to FIG. 25. Here, the process of sharing the whole screen will be executed after the determination of the relaying apparatus 30. Hereinafter, there will be explained an example case where the transmission terminal device 10db as a destination terminal device is caused to display the information that has been displayed by the external input apparatus 40aa, which is connected to the transmission terminal device 10aa.

As described above, after the determination of the relaying apparatus 30, the transmitting and receiving unit 11 of the transmission terminal device 10aa receives the relaying apparatus ID of "111a," which has been transmitted by the transmission management system 50 at step S67-21, and the IP address "1. 3. 2. 4" of the destination terminal device 10db. The storing and reading unit 10 causes the storing unit 1000 to store the received relaying apparatus ID "111a" and the IP address "1. 3. 2. 4" (step S67-22).

When the external input apparatus 40aa and the transmission terminal device 10aa are mutually connected, the connection detection unit 42 of the external input apparatus 40aa detects the connection (step S70). When the connection detection unit 42 detects that the external input apparatus 40aa and the transmission terminal device 10aa have mutually been connected, the install determination unit 43 determines whether the display data transmitting unit 452 has already been installed (step S71), as shown in FIG. 28. When the install determination unit 43 determines that the display data transmitting unit 452 has not been installed, the program acquisition unit 44 obtains the display data transmitting unit 452 stored in the transmission terminal device 10aa and installs the display data transmitting unit 452 (step S72). When the display data transmitting unit 452 has been installed at step S72, the external input apparatus 40aa requests the transmission terminal device 10aa for permission for the display data acquisition unit 451 to execute the process (step S73). When the transmission terminal device 10aa allows the external input apparatus 40aa to execute the process of the display data acquisition unit 451, the display data acquisition unit 451 obtains the display data (step S74). Subsequently, the display data transmitting unit 452 transmits the display data obtained by the display data acquisition unit 451 to the transmission terminal device 10aa (step S75).

When it is determined, at step S71, that the display data transmitting unit 452 has been installed, the process proceeds to steps S73 and the following.

When the external information transmitting and receiving unit 18 of the transmission terminal device 10aa receives the display data, the storing and reading unit 19 obtains the relaying apparatus ID of "111a" and the IP address "1. 3. 2. 4" of the transmission terminal device 10db (which is to be the destination) that have been stored in the storing unit 1000 (step S77). Then, the transmitting and receiving unit 11 transmits the display data and the IP address "1. 3. 2. 4" of the transmission terminal device 10db (which is to be the destination) to the relaying apparatus 30 indicated by the relaying apparatus ID of "111a" which has been obtained at step S77 (step S78). After receiving the display data that has been transmitted from the transmission terminal device 10aa at step S78, the relaying apparatus 30 changes the quality of the display data based on the IP address "1. 3. 2. 4" of the transmission terminal device 10db (step S79), and the relaying apparatus 30 transmits the display data to the transmission terminal device 10db (step S80). Since the details of the process of step S77 are the same as the process of changing the quality of the audio data and image data (steps S81-S94), the explanation of the details of the process of step S77 is omitted. When the transmitting and receiving unit 11 of the transmission terminal device 10db receives the display data that has been transmitted from the relaying apparatus 30, the image display control unit 14b displays the display data. In the example shown in FIG. 27, the image that has been displayed by the external input apparatus 40aa is displayed at the left portion of the screen based on the display data, and the image data that has been photographed by the photographing unit 14b of the transmission terminal device 10aa and that has been transmitted by the transmitting and receiving unit 11 is displayed at the upper right portion of the screen. Further, the image data that has been photographed by the photographing unit 14b of the transmission terminal device 10db is displayed at the lower right portion of the screen.

(Processing and Operations of Display Control)

Figure 31:
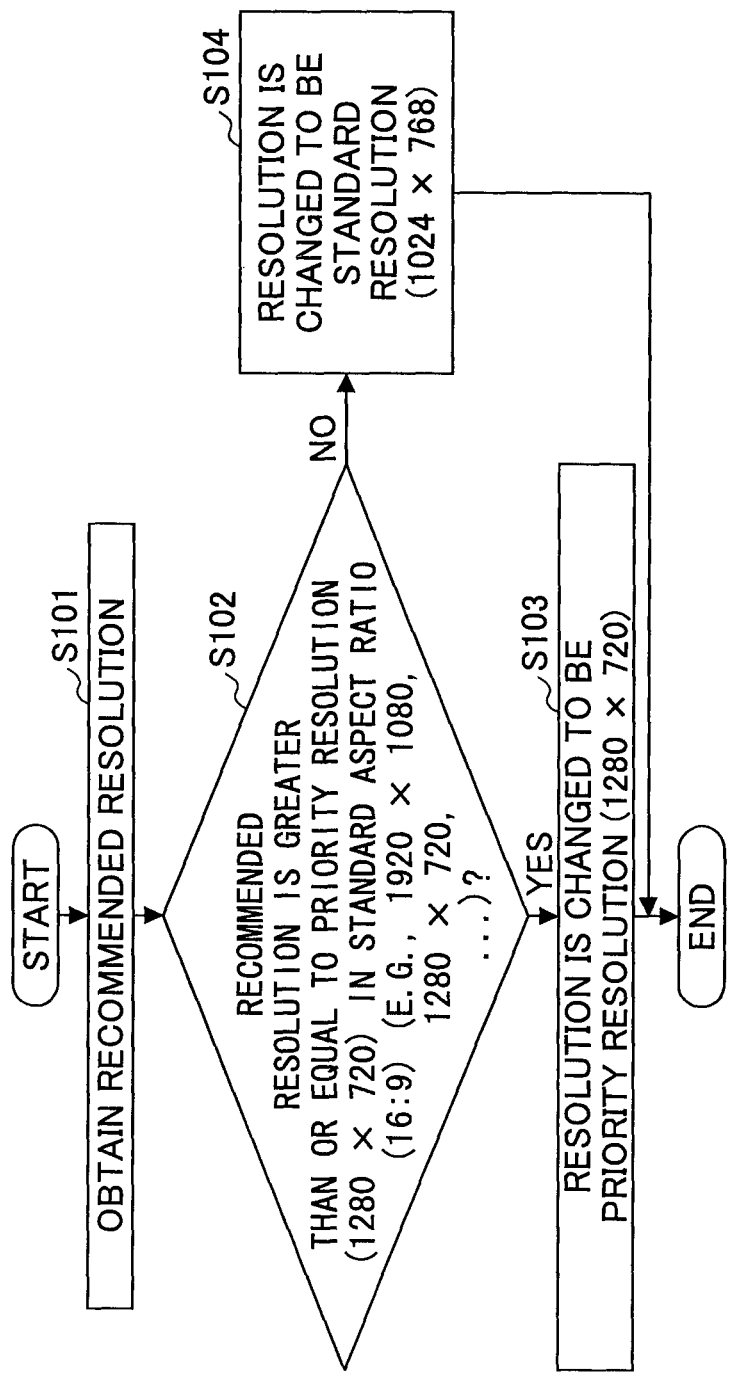
FIG. 31 is a flowchart showing an example of a process of resolution control.

FIG. 31 is a flowchart showing an example of processing of resolution control by the image display control unit 14b of the transmission terminal device 10. Hereinafter, there will be explained the processing after the power supply of the transmission terminal device 10 has been turned on and the data (the basic data fields) that is used for the display control has been transmitted from the display 120 to the storing unit 1000 of the transmission terminal device 10.

In FIG. 31, the resolution retrieval unit 14b10 of the image display control unit 14b accesses the basic data fields of the storing unit 1000, and obtains the recommended resolution (step S101).

Subsequently, the resolution determination unit 14b11 determines whether the retrieved recommended resolution is predetermined resolution (e.g., 1920×1080, 1280×720) that is greater than or equal to the priority resolution (e.g. 1280×720) in the reference aspect ratio (e.g. 16:9) (step S102).

When the resolution determination unit 14b11 determines that the retrieved recommended resolution is the predetermined resolution that is greater than or equal to the priority resolution in the reference aspect ratio (step S102: YES), the resolution selecting unit 14b12 selects the priority resolution (e.g., 1280×720), and the resolution changing unit 14b15 changes the resolution of the transmission terminal device 10 to be the resolution which has been selected by the resolution selecting unit 14b12 (step S103).

When the resolution determination unit 14b11 determines that the retrieved recommended resolution is not the predetermined resolution that is greater than or equal to the priority resolution in the reference aspect ratio (step S102: NO), the resolution selecting unit 14b12 selects the standard resolution (e.g., 1024×768), and the resolution changing unit 14b15 changes the resolution of the transmission terminal device 10 to be the resolution which has been selected by the resolution selecting unit 14b12 (step S104).

When the recommended resolution in a predetermined aspect ratio is high, the display 120 may adopt a resolution other than the recommended resolution which is lower than the recommended resolution in the predetermined aspect ratio. Therefore, it is possible to estimate displayable resolutions from the recommended resolution, and an image can be displayed with the resolution which is suitable for the display 120. Further, since the resolution can be set to be a lower resolution, even if the recommended resolution is a high resolution that is not supported by the transmission terminal device 10, an image can be displayed.

Figure 32:
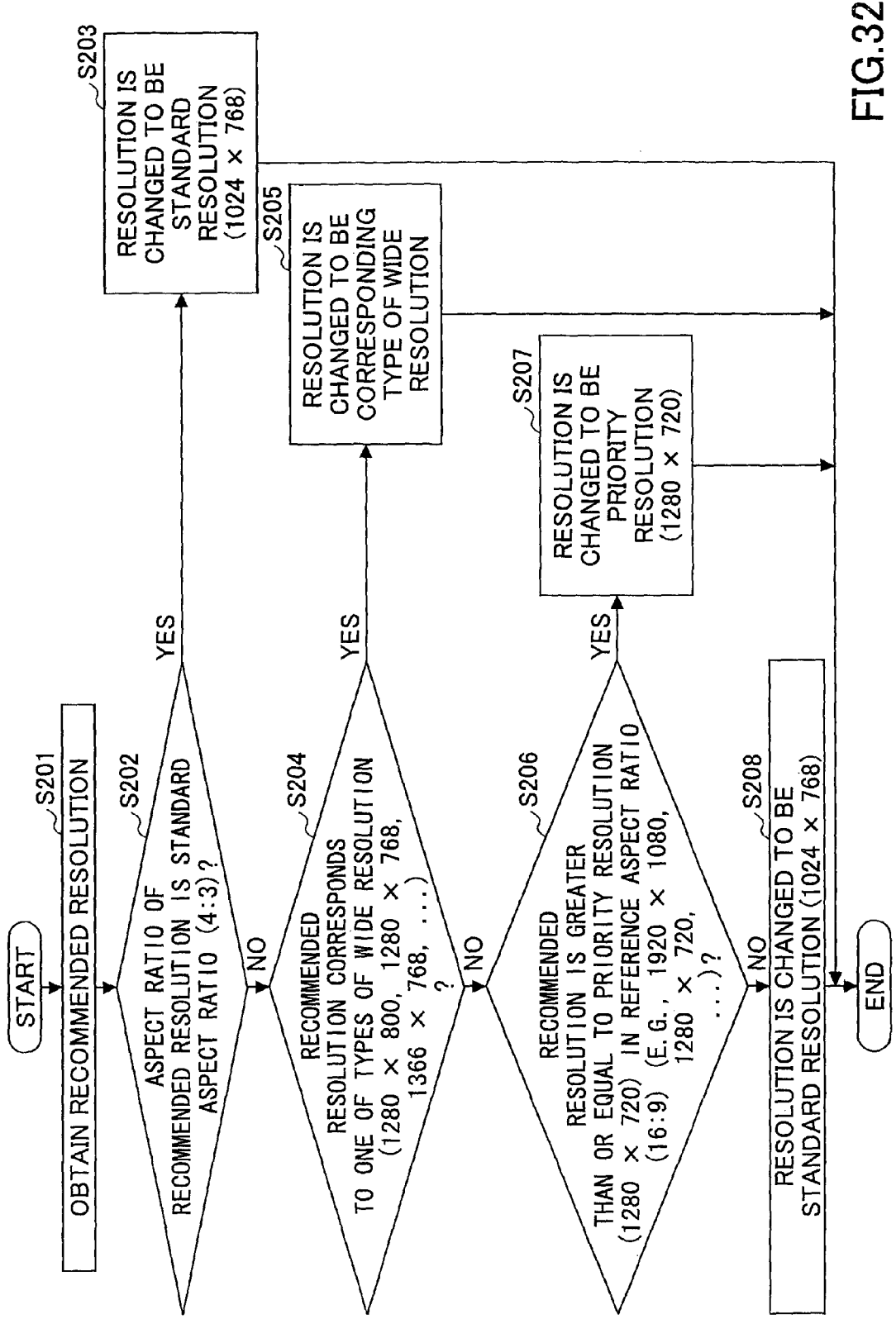
FIG. 32 is a flowchart showing another example of the process of the resolution control.

FIG. 32 is a flowchart showing another example of processing of resolution control by the image display control unit 14b of the transmission terminal device 10. In the process shown in FIG. 31, for a wide display 120 for which whether it supports the standard resolution (e.g., 1024×768) is unknown, the resolution is always set to be the standard resolution (e.g., 1024×768). Accordingly, it is possible that the resolution supported by the display 120 is not effectively utilized. Therefore, in FIG. 32, the process has been enhanced by adding the determination as to whether an aspect ratio of the recommended resolution is a standard aspect ratio (e.g., 4:3) and the determination as to whether the recommended resolution is a wide resolution other than a resolution in the standard aspect ratio (e.g., 1280×800, 1280×768, or 1366×768).

In FIG. 32, the resolution retrieval unit 14b10 accesses the basic data fields of the storing unit 1000 and obtains the recommended resolution (step S201).

Subsequently, the resolution determination unit 14b11 determines whether the aspect ratio of the recommended resolution is the standard aspect ratio (e.g., 4:3) (step S202).

When the resolution determination unit 14b11 determines that the aspect ratio of the recommended resolution is the standard aspect ratio (step S202: YES), the resolution selecting unit 14b12 selects the standard resolution (e.g., 1024×768), and the resolution changing unit 14b15 changes the resolution of the transmission terminal device 10 to be the resolution that has been selected by the resolution selecting unit 14b12 (step S203).

When the resolution determination unit 14b11 determines that the aspect ratio of the recommended resolution is not the standard aspect ratio (step S202: NO), the resolution determination unit 14b11 determines whether the recommended resolution is the wide resolution other than resolution in the standard aspect ratio (e.g., 1280×800, 1280×768, or 1366×768)(step S204).

When the resolution determination unit 14b11 determines that the recommended resolution is the wide resolution (step S204: YES), the resolution selecting unit 14b12 selects the wide resolution, and the resolution changing unit 14b15 changes the resolution of the transmission terminal device 10 to be the resolution that has been selected by the resolution selecting unit 14b12 (step S205).

When the resolution determination unit 14b11 determines that the recommended resolution is not the wide resolution (step S204: NO), the resolution determination unit 14b11 determines whether the recommended resolution is predetermined resolution (e.g., 1920×1080 or 1280×720) that is greater than or equal to the priority resolution (e.g., 1280×720) in the reference aspect ratio (e.g., 16:9) (step S206).

When the resolution determination unit 14b11 determines that the recommended resolution is the predetermined resolution that is greater than or equal to the priority resolution in the reference aspect ratio (step S206: YES), the resolution selecting unit 14b12 selects the priority resolution (e.g., 1280×720), and the resolution changing unit 14b15 changes the resolution of the transmission terminal device 10 to be the resolution that has been selected by the resolution selecting unit 14b12 (step S207).

When the resolution determination unit 14b11 determines that the recommended resolution is not the predetermined resolution that is greater than or equal to the priority resolution in the reference aspect ratio (step S206: NO), the resolution selecting unit 14b12 selects the standard resolution (e.g., 1024×768), and the resolution changing unit 14b15 changes the resolution of the transmission terminal device 10 to be the resolution that has been selected by the resolution selecting unit 14b12 (step S208).

With this processing, an image can be displayed on the wide display 120 for which whether it supports the standard resolution (e.g., 1024×768) is unknown, while an aspect ratio of the image is adjusted in accordance with the aspect ratio of the wide display. Further, when the aspect ratio of the recommended resolution is the standard aspect ration (e.g., 4:3), the standard resolution (e.g., 1024×768) is designated. Recently, there are many displays which support a zoom mode. By using the zoom mode, an image can be enlarged and displayed on a display that supports such high resolution as 1600×1200, while preserving the aspect ratio of 1024×768. Therefore, an image can be displayed on a large screen, while the size of the image is adjusted in accordance with the size of the large screen. In this case, it is not necessary to prepare a large display memory in accordance with the resolution of the display. Therefore, such a system is advantageous in the cost.

In FIG. 32, the determination as to whether the aspect ratio of the recommended resolution is the standard aspect ratio (step S202) is used together with the determination as to whether the recommended resolution is the wide resolution other than resolution in the standard aspect ratio (step S204). However, only one of the above-described two types of determination may be used.

Figure 34:
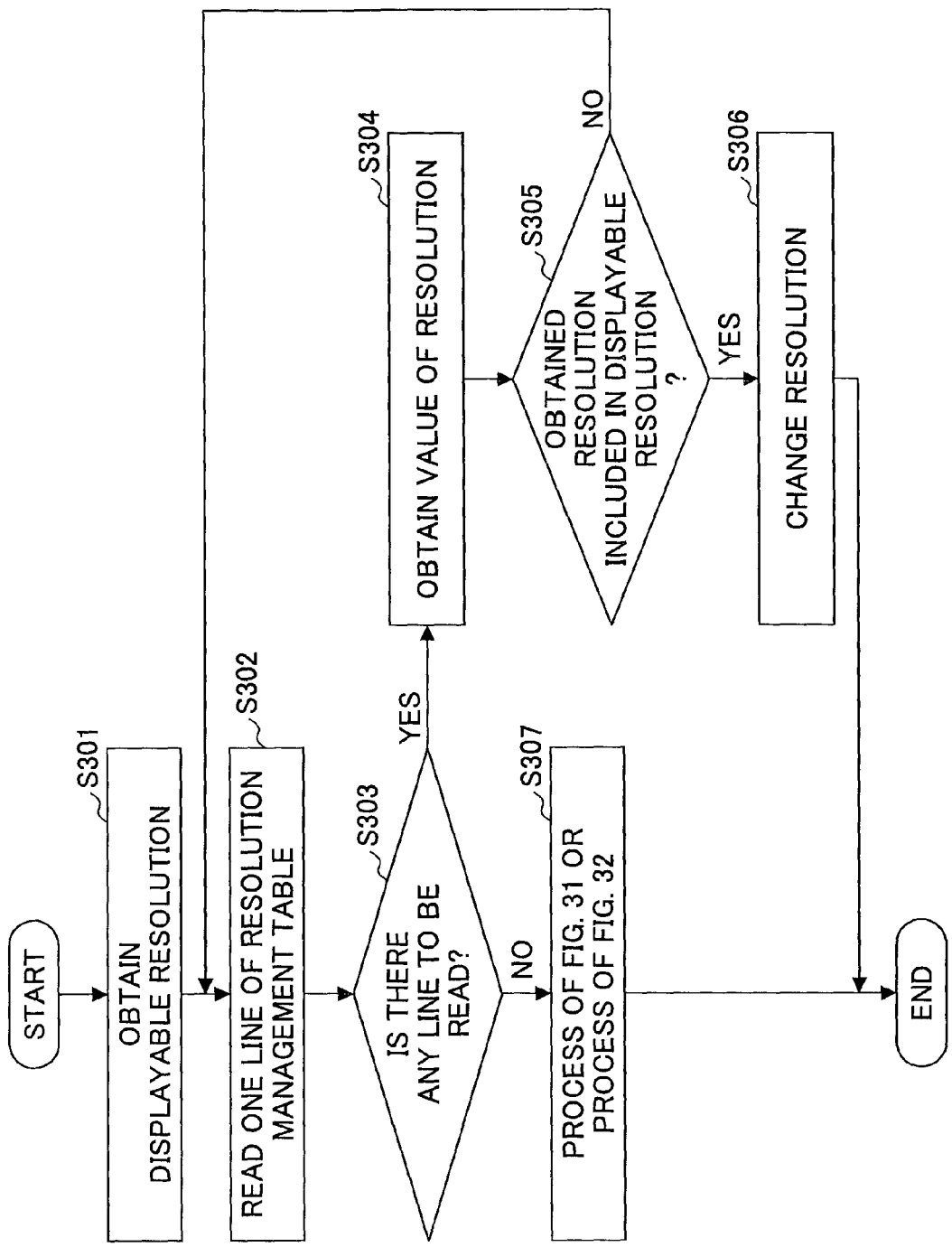
FIG. 34 is a diagram showing another example of the process of the resolution control.

Further, FIGS. 33 and 34 show another example of the processing. The processing shown in FIGS. 33 and 34 is such that a resolution management table has been introduced to the example of the processing shown in FIGS. 31 and 32. The processing shown in FIGS. 33 and 34 enables fine setting (customizing) of the priority on the resolution and to perform display control in accordance with a design principle or convenience of a delivery destination.

FIG. 33 shows an example of the resolution management table. The resolution management table includes items of "item name" and "resolution." The "item name" is a symbol that identifies data corresponding to one line (line data). The "resolution" is resolution defined by the line data. The "resolution" includes a width value and a height value. The width value indicates the number of pixels in the width direction, and the height value indicates the number of pixels in the height direction.

FIG. 34 is a flowchart showing the example of the processing of the resolution control by the image display control unit 14b of the transmission terminal device 10.

Referring to FIG. 34, the resolution retrieval unit 14b10 of the image display control unit 14b accesses the basic data fields of the storing unit 1000 and obtains displayable resolution (step S301).

Subsequently, the resolution management table reading unit 14b16 reads the line data corresponding to one line in the resolution management table (step S302), and determines whether the resolution management table includes a line to be read (step S303).

When the resolution management table reading unit 14b16 determines that the resolution management table includes the line to be read (step S303: YES), the resolution retrieval unit 14b10 obtains the values of the resolution (the width value and the height value) from the line data that has been read by the resolution management table reading unit (step S304).

Subsequently, the resolution determination unit 14b11 determines whether the resolution obtained from the resolution management table is included in the displayable resolution (step S305).

When the resolution determination unit 14b11 determines that the resolution is not included in the displayable resolution (step S305: NO), the process returns to the process of reading the next line data in the resolution management table (step S302).

When the resolution determination unit 14b11 determines that the resolution is included in the displayable resolution (step S305: YES), the resolution selecting unit 14b12 selects the resolution that has been obtained from the resolution management table, and the resolution changing unit 14b12 changes the resolution of the transmission terminal device 10 to the resolution that has been selected by the resolution selecting unit 14b12 (step S306).

When the resolution management table reading unit 14b16 determines that the resolution management table does not include the line to be read (step S303: NO), the process proceeds to a process where the resolution management table is not utilized, namely, the process similar to that of FIG. 31 or FIG. 32 is performed.

By introducing such processing, the fine setting of the resolution may be made in accordance with the design principle or the convenience of the delivery destination.

The examples shown in FIGS. 31, 32, and 33 are examples of the process after the power supply of the transmission terminal device 10 has been turned on. However, the embodiment is not limited to this. For example, it may be monitored whether the transmission terminal device 10 is reconnected to another display 120, and a process similar to those of FIGS. 31, 32, and 34 may be performed when the transmission terminal device 10 is reconnected to the other display 120. This monitoring may be realized by introducing an event (message loop) mechanism, which is well-known in the program (operating system) of Windows. With such event mechanism, when the display 120 is switched to the other display 120, while the power supply of the transmission terminal device 10 is turned on, the image is displayed on the other display 120 with the resolution which is suitable for the other display 120.

<<Major Effects of the Embodiment>>

As explained above, according to the embodiment, by storing the relaying apparatus ID of the relaying apparatus 30 that relays the audio data and the image data in the storing unit 1000 of the transmission terminal device 10aa, the display data of the document data stored in the storing unit 4000 of the external input apparatus 40 which is not managed by the transmission management system 50 can be transmitted to the transmission terminal device 10db which is to be the counter party of the conference. Since it is not necessary for the transmission management system 50 to authenticate the external input apparatus 40, a management load may be reduced.

Further, when the screen displayed by the external input apparatus 40, which does not include the display data acquisition unit 451 and the display data transmitting unit 452, is to be shared, the display data acquisition unit 451 and the display data transmitting unit 452 are installed on the external input apparatus 40, triggered by the establishment of the connection between the transmission terminal device 10 and the external input apparatus 40. Therefore, the screen can be shared.

In the communication network 2, even if it is possible to obtain information regarding the environments of the LANs 2a-2d such as the IP addresses of the relaying apparatus 30, it is difficult to obtain information regarding the environment of the Internet 2i. Therefore, first, two relaying apparatuses 30 are selected among the plural relaying apparatuses 30 that relay the image data and the audio data, based on the available information regarding the environments. Then, prior to actually transmitting and receiving the image data and the audio data among the plural transmission terminal devices 10, the advance transmission information is transmitted and received, instead of the image data and the audio data. In this manner, it is possible to select one of the relaying apparatuses 30 that can relay the advance transmission information most quickly.

Namely, by selecting the relaying apparatuses 30 to which top two or more IP addresses close to one of the IP addresses of the transmission terminal devices 10 have been assigned, two or more candidates for the relaying apparatus 30, which is to be eventually utilized, can be reserved. Thus, it is possible to select, among the two or more candidates for the relaying apparatus 30, the relaying apparatus 30 that has relayed the advance transmission information for which the required time period between the transmission and the reception is the smallest, by actually transmitting and receiving the advance transmission information between the requesting terminal device 10A and the destination terminal device 10B through each of the relaying apparatuses 30 as the candidates. Therefore, the highest quality image data or audio data under the current environment of the communication network 2 can be transmitted and received.

Further, in the embodiment, for narrowing down the relaying apparatuses 30, two or more relaying apparatuses 30 are selected by considering the maximum data transmission rates of the relaying apparatuses 30, in addition to preferentially selecting the relaying apparatuses 30 having the corresponding IP addresses which are close to the IP addresses of the transmission terminal devices 10 which perform the video conference. In this manner, it is possible to narrow down the candidates of the relaying apparatus 30 which are suitable for the actual environment of the communication network 2.

Further, in the embodiment, for narrowing down the relaying apparatuses 30, the relaying apparatuses 30 whose operating states are the online states are selected, and the selected relaying apparatuses 30 are narrowed down. Therefore, it is possible to narrow down the candidates of the relaying apparatus 30 which are more suitable for the actual environment of the communication network.

Further, in the embodiment, even if the transmission terminal device 10 can obtain only a portion of the EDID information of the display 120 which is connected to the transmission terminal device 10, the transmission terminal device 10 can display an image at suitable resolution corresponding to the display 120.

<<Supplement of the Embodiment>>

A mirror driver may be utilized for the process of obtaining the display data. The mirror driver can directly transmit the generated display data to a USB driver, without passing the display data through the program. In this case, the mirror driver generates the display data, and the USB driver transmits the generated display data to the transmission terminal device 10 through the external device connecting I/F 118. Since it is not necessary for the program to obtain the display data, resources for executing the program can be reduced.

In the above embodiment, an example has been described where the program obtains the image data generated by the display driver, and the program transmits the image data to the transmission terminal device 10. However, the program may obtain drawing commands generated by GDI, and the program may transmit the drawing commands. Since an amount of data included in the drawing commands is smaller than the amount of the image data, it is possible to reduce the load on the network. Further, the display data acquisition unit 451 may only obtain display data that has been displayed on a predetermined screen among plural screens on a virtual display, and the display data transmitting unit 452 may transmit the display data. Since the image data displayed on a screen other than the predetermined screen is not shared with the counter party of the conference, it is possible to prevent showing a highly confidential document, for example, and thereby the security can be improved.

Further, the transmission management system 50, the program providing system 90, and the maintenance system 100 in the embodiment may be realized by a single computer. Alternatively, portions (functions and/or steps) of the transmission management system 50, the program providing system 90, and the maintenance system 100 may be divided, and the transmission management system 50, the program providing system 90, and the maintenance system 100 may be realized by plural computers to which the divided portions are arbitrary assigned. Further, when the program providing system 90 is realized by a single computer, a program that is transmitted by the program providing system 90 may be divided into plural modules and transmitted. Alternatively, the program providing system 90 may transmit the program without dividing it. Further, when the program providing system 90 is realized by plural computers, the divided plural modules may be transmitted from the corresponding computers.

Further, a recording medium, a non-transitory computer readable recording medium, and the HD 204 storing the transmission terminal program, the relaying apparatus program, and/or the transmission management program, and the program providing system including the HD 204 may be utilized as program products, when the transmission terminal program, the relaying apparatus program, and/or the transmission management program are distributed, for example, to domestic users and/or users in other countries.

In the embodiment, the resolution of the image included in the image data is managed as an example of the quality of the image included in the image data to be relayed by the relaying apparatus 30 by the change quality management table shown in FIG. 7 and the quality management table shown in FIG. 15. However, the embodiment is not limited to this. As another example of the quality, depth of an image included in image data, a sampling frequency of sound included in audio data, and/or bit length of sound included in audio data may be focused on and managed.

Further, in FIGS. 8, 10, and 12, the reception data and time are managed. However, the embodiment is not limited to this. For example, among the date and time of the reception, only the reception time may be managed.

Further, in the above embodiment, the IP addresses of the relaying apparatuses 30 are managed by the relaying apparatus management table shown in FIG. 8, and the IP addresses of the transmission terminal devices are managed by the terminal management table shown in FIG. 10. However, the embodiment is not limited to this. For example, as relaying apparatus identifying information for identifying the relaying apparatus 30 on the communication network 2 and as transmission terminal device identifying information for identifying the transmission terminal device 10 on the communication network 2, a fully qualified domain name (FQDN) of the relaying apparatus 30 and a fully qualified domain name (FQDN) of the transmission terminal device 10 may be managed. In this case, the IP addresses corresponding to the FQDNs are obtained by the well-known domain name system (DNS) server. Here, "the relaying apparatus identifying information for identifying the relaying apparatus 30 on the communication network 2" may be expressed as "the relaying apparatus connection destination information indicating a destination for establishing a connection to the relaying apparatus 30 on the communication network 2," or "the relaying apparatus destination information indicating a destination to the relaying apparatus 30 on the communication network 2." Similarly, "the transmission terminal device identifying information for identifying the transmission terminal device 10 on the communication network 2" may be expressed as "the transmission terminal device connection destination information indicating a destination for establishing a connection to the transmission terminal device 10 on the communication network 2" or "the transmission terminal device destination information indicating a destination to the transmission terminal device 10 on the communication network 2."

In the above embodiment, the video conference system has been explained as an example of the transmission system 1. However, the embodiment is not limited to this. The transmission system 1 may be an Internet Protocol (IP) telephone system or a telephone system for Internet telephones. Further, the transmission system 1 may be a car navigation system. In this case, for example, one of the transmission terminal devices 10 may correspond to a car navigation device installed in a car, and the other transmission terminal device 10 may correspond to a management terminal or a management server of a management center that manages the car navigation system, or a car navigation terminal installed in another car.

Further, in the process of obtaining the display data, instead of the whole screen, only a portion that is displayed in an area (window) included in the screen may be obtained, as explained below. FIG. 26 shows an example of a screen displayed by the external input apparatus 40*aa*. In this example, an area (window) (a) and an area (b) have been displayed on the screen. In the screen, an area to be shared with the transmission terminal device 10*db* is pointed by operating a pointer shown by (c) in FIG. 27 through operating the mouse 212. At this time, display data corresponding to the pointed area (a) is obtained by the display data acquisition unit 451.

Further, the display data acquisition unit 451 and the display data transmitting unit 452, which have been stored in the storing unit 1000 of the transmission terminal device 10 and which are to be utilized by the external input apparatus 40, may be included in the external input apparatus 40 in advance. In this manner, the process of transmitting and receiving the display data acquisition unit 451 and the display data transmitting unit 452 can be omitted, and thereby the processing loads on the transmission terminal device 10 and on the external input apparatus 40 can be reduced.

Further, the case has been explained where the external input apparatus 40 causes the display device 400 to display data. Here, the display device 400 may be a device that is separated from the external input apparatus 40, or the display device 400 may be included in the external input apparatus 40.

Further, in the process at step S71, the install determination unit 43 may determine whether the display data acquisition unit 451 and the display data transmitting unit 452 have already been installed. In this case, when the install determination unit 43 determines that the display data transmitting unit 452 has not been installed at step S71, the program acquisition unit 44 obtains the display data acquisition unit 451 and the display data transmitting unit 452 stored in the transmission terminal device 10*aa*, and the program acquisition unit 44 installs the display data acquisition unit 451 and the display data transmitting unit 452 (step S73).

Further, the process performed by the install determination unit 43 may be omitted by including the display data acquisition unit 451 in the external input apparatus 40*aa* in advance. The display data transmitting unit 452 may be omitted by writing the display data that has been obtained by the display data acquisition unit 451 in the storing unit 1000, which has been available and which is included in the transmission terminal device 10*aa*.

Hereinabove, the electronic device and the program for controlling the electronic device have been explained by the embodiments. However, the present invention is not limited to the above-described embodiments, and various modifications and improvements may be made within the scope of the present invention.

The present application is based on Japanese Priority Application No. 2011-281949 filed on Dec. 22, 2011, the entire contents of which are hereby incorporated herein by, reference.

The invention claimed is:

1. An electronic device configured to be connected to a display device, the electronic device being configured to output image data to the display device, the electronic device comprising:
    circuitry configured to
    retrieve a recommended resolution of the display device from the display device;
    determine whether the retrieved recommended resolution is greater than or equal to a priority resolution of the electronic device, the priority resolution being a reference aspect ratio of the electronic device;
    select a first resolution; and
    change a resolution of the display device to be the selected first resolution,
    wherein, when the circuitry determines that the retrieved recommended resolution is greater than or equal to the priority resolution, the circuitry selects the priority resolution as the first resolution, and
    wherein, when the circuitry determines that the retrieved recommended resolution is less than the priority resolution, the circuitry selects a predetermined resolution as the first resolution.

2. The electronic device according to claim 1,
    wherein the circuitry is configured to determine whether an aspect ratio of the recommended resolution is a predetermined aspect ratio of the predetermined resolution, prior to determining whether the recommended resolution is greater than or equal to the priority resolution, and
    wherein, when the circuitry determines that the aspect ratio of the recommended resolution is the predetermined aspect ratio, the circuitry selects the predetermined resolution as the first resolution.

3. The electronic device according to claim 1,
    wherein the circuitry is configured to determine whether the recommended resolution is a wide resolution, the wide resolution being different from the reference aspect ratio, prior to determining whether the recommended resolution is greater than or equal to the priority resolution, and
    wherein, when the circuitry determines that the recommended resolution is the wide resolution, the circuitry selects the wide resolution as the first resolution.

4. The electronic device according to claim 1,
    wherein the circuitry is configured to determine whether an aspect ratio of the recommended resolution is a predetermined aspect ratio of the predetermined resolution, prior to determining whether the recommended resolution is greater than or equal to the priority resolution,
    wherein, when the circuitry determines that the aspect ratio of the recommended resolution is the predetermined aspect ratio, the circuitry selects the predetermined resolution as the first resolution,
    wherein, when the circuitry determines that the aspect ratio of the recommended resolution is not the predetermined aspect ratio, the circuitry is configured to determine whether the recommended resolution is a wide resolution, the wide resolution being different from the reference aspect ratio, and
    wherein, when the circuitry determines that the recommended resolution is the wide resolution, the circuitry selects the wide resolution as the first resolution.

5. The electronic device according to claim 1,
    wherein the electronic device is a transmission terminal device configured to transmit and receive data of a screen to be shared with a counterpart electronic device during a video communication session, and wherein the electronic device is configured to output the image data to the display device, and configured to cause the display device to display the image data.

6. An electronic device configured to be connected to a display device, the electronic device being configured to output image data to the display device, the electronic device comprising:

circuitry configured to retrieve a displayable resolution, the displayable resolution being displayable by the display device;

sequentially read one or more data lines included in a resolution management table, wherein each of the data lines includes a second resolution as an element;

obtain the second resolution from the read data line;

determine whether the obtained displayable resolution includes the obtained second resolution;

change, when the circuitry determines that the displayable resolution includes the second resolution, a resolution of the display device to be the obtained second resolution;

retrieve a recommended resolution of the display device when the circuitry determines that the displayable resolution does not include the second resolution obtained from each of the read data lines;

determine whether the retrieved recommended resolution is greater than or equal to a priority resolution of the electronic device, the priority resolution being a reference aspect ratio of the electronic device;

select a first resolution; and change the resolution of the display device to be the selected first resolution, wherein, when the circuitry determines that the recommended resolution is greater than or equal to the priority resolution, circuitry selects the priority resolution as the first resolution, and wherein, when the circuitry determines that the recommended resolution is less than the priority resolution, the circuitry selects a predetermined resolution as the first resolution.

7. The electronic device according to claim 6, wherein the circuitry is configured to determine whether an aspect ratio of the recommended resolution is a predetermined aspect ratio of the predetermined resolution, prior to determining whether the recommended resolution is greater than or equal to the priority resolution, and wherein, when the circuitry determines that the aspect ratio of the recommended resolution is the predetermined aspect ratio, circuitry selects the predetermined resolution as the first resolution.

8. The electronic device according to claim 6, wherein the circuitry is configured to determine whether the recommended resolution is a wide resolution, the wide resolution being different from the reference aspect ratio, prior to determining whether the recommended resolution is greater than or equal to the priority resolution, and wherein, when the circuitry determines that the recommended resolution is the wide resolution, the circuitry selects the wide resolution as the first resolution.

9. The electronic device according to claim 6, wherein the circuitry is configured to determine whether an aspect ratio of the recommended resolution is a predetermined aspect ratio of the predetermined resolution, prior to determining whether the recommended resolution is greater than or equal to the priority resolution, wherein, when the circuitry determines that the aspect ratio of the recommended resolution is the predetermined aspect ratio, the circuitry selects the predetermined resolution as the first resolution, wherein, when the circuitry determines that the aspect ratio of the recommended resolution is not the predetermined aspect ratio, the circuitry is configured to determine whether the recommended resolution is a wide resolution, the wide resolution being different from the predetermined aspect ratio, and wherein, when the circuitry determines that the recommended resolution is the wide resolution, the circuitry selects the wide resolution as the first resolution.

10. A non-transitory computer readable recording medium storing a program for controlling an electronic device, the electronic device being configured to be connected to a display device and configured to output image data to the display device, the program causing a computer included in the electronic device to perform a method comprising:

retrieving a recommended resolution of the display device from the display device;

determining whether the retrieved recommended resolution is greater than or equal to a priority resolution of the electronic device, the priority resolution being a reference aspect ratio of the electronic device;

selecting a first resolution;

changing a resolution of the display device to be the selected first resolution;

when the electronic device determines that the retrieved recommended resolution is greater than or equal to the priority resolution, selecting the priority resolution as the first resolution; and when the electronic device determines that the retrieved recommended resolution is less than the priority resolution, selecting a predetermined resolution as the first resolution.

* * * * *